(12) United States Patent
Kim et al.

(10) Patent No.: US 11,716,761 B2
(45) Date of Patent: Aug. 1, 2023

(54) UPLINK TRANSMISSION METHOD FOR ULTRA-RELIABILITY AND LOW-LATENCY COMMUNICATION, AND APPARATUS THEREFOR

(71) Applicant: ELECTRONICS AND TELECOMMUNICATIONS RESEARCH INSTITUTE, Daejeon (KR)

(72) Inventors: Cheol Soon Kim, Daejeon (KR); Sung Hyun Moon, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/212,087

(22) Filed: Mar. 25, 2021

(65) Prior Publication Data

US 2021/0307070 A1    Sep. 30, 2021

(30) Foreign Application Priority Data

Mar. 26, 2020   (KR) .................. 10-2020-0037136
Mar. 31, 2020   (KR) .................. 10-2020-0039469
(Continued)

(51) Int. Cl.
*H04W 74/08*   (2009.01)
*H04L 25/02*   (2006.01)
*H04W 74/00*   (2009.01)

(52) U.S. Cl.
CPC ...... *H04W 74/0816* (2013.01); *H04L 25/0226* (2013.01); *H04W 74/006* (2013.01); *H04W 74/008* (2013.01)

(58) Field of Classification Search
CPC .......... H04W 74/0816; H04W 74/006; H04W 74/008; H04W 72/1289; H04W 74/0808;
(Continued)

(56) References Cited

U.S. PATENT DOCUMENTS 11,582,077 B2 *   2/2023   Salem ................. H04L 27/2607
2017/0280476 A1 *   9/2017   Yerramalli ........ H04W 74/0808
(Continued)

FOREIGN PATENT DOCUMENTS

WO     2020/027535 A1    2/2020
WO     2020/032523 A1    2/2020
(Continued)

*Primary Examiner* — Ivan O Latorre
(74) *Attorney, Agent, or Firm* — LRK Patent Law Firm

(57) ABSTRACT

An uplink transmission method performed by a terminal includes: receiving, from a base station, at least one DCI for allocating first uplink transmission and second uplink transmission; performing a first LBT procedure for the first uplink transmission, and performing the first uplink transmission when the first LBT procedure is successful; and performing a second LBT procedure for the second uplink transmission, and performing the second uplink transmission when the second LBT procedure is successful, wherein the first uplink transmission and the second uplink transmission are consecutively performed with a time interval longer than a predetermined time.

7 Claims, 44 Drawing Sheets

(30) Foreign Application Priority Data

| Apr. 9, 2020 | (KR) | ......................... | 10-2020-0043624 |
| Apr. 17, 2020 | (KR) | ......................... | 10-2020-0047018 |
| May 8, 2020 | (KR) | ......................... | 10-2020-0055459 |
| May 15, 2020 | (KR) | ......................... | 10-2020-0058625 |
| May 28, 2020 | (KR) | ......................... | 10-2020-0064568 |
| Jul. 10, 2020 | (KR) | ......................... | 10-2020-0085631 |
| Aug. 6, 2020 | (KR) | ......................... | 10-2020-0098746 |
| Aug. 14, 2020 | (KR) | ......................... | 10-2020-0102780 |
| Oct. 16, 2020 | (KR) | ......................... | 10-2020-0134661 |
| Jan. 18, 2021 | (KR) | ......................... | 10-2021-0007101 |
| Feb. 16, 2021 | (KR) | ......................... | 10-2021-0020716 |
| Mar. 24, 2021 | (KR) | ......................... | 10-2021-0037839 |

(58) Field of Classification Search
CPC . H04L 25/0226; H04L 1/1664; H04L 1/1854; H04L 25/0224
See application file for complete search history.

(56) References Cited

U.S. PATENT DOCUMENTS

| 2018/0092128 | A1* | 3/2018 | Um | .................. | H04W 74/0825 |
| 2018/0132271 | A1 | 5/2018 | Jung et al. | | |
| 2018/0317244 | A1* | 11/2018 | Um | .................. | H04W 72/1215 |
| 2018/0323917 | A1* | 11/2018 | Um | .................. | H04W 72/0446 |
| 2018/0343090 | A1 | 11/2018 | Yan et al. | | |
| 2019/0013909 | A1* | 1/2019 | Li | .................. | H04L 5/0048 |
| 2019/0021102 | A1 | 1/2019 | Wang et al. | | |
| 2019/0045544 | A1* | 2/2019 | Wang | .................. | H04W 72/14 |
| 2019/0124687 | A1* | 4/2019 | Yang | .................. | H04L 27/26 |
| 2019/0132103 | A1* | 5/2019 | Yang | .................. | H04W 72/042 |
| 2019/0159266 | A1* | 5/2019 | Kim | .................. | H04W 74/004 |
| 2019/0215110 | A1* | 7/2019 | Yang | .................. | H04W 74/0816 |
| 2020/0053778 | A1* | 2/2020 | Babaei | .................. | H04W 16/04 |
| 2020/0068511 | A1 | 2/2020 | Yang et al. | | |
| 2020/0077438 | A1 | 3/2020 | Kim et al. | | |
| 2020/0120683 | A1* | 4/2020 | Kakishima | .................. | H04L 5/0048 |
| 2020/0245353 | A1* | 7/2020 | Tsai | .................. | H04W 72/042 |
| 2020/0313816 | A1* | 10/2020 | Sun | .................. | H04W 74/0808 |
| 2021/0022006 | A1* | 1/2021 | Sun | .................. | H04L 5/005 |
| 2022/0377813 | A1* | 11/2022 | Wang | .................. | H04W 74/0841 |
| 2022/0394762 | A1* | 12/2022 | Bhattad | .................. | H04W 74/0808 |

FOREIGN PATENT DOCUMENTS

| WO | WO-2020027533 A1 * | 2/2020 | ............ | H04L 5/001 |
| WO | WO-2021011192 A1 * | 1/2021 | ............ | H04L 1/0068 |

\* cited by examiner

FIG. 6
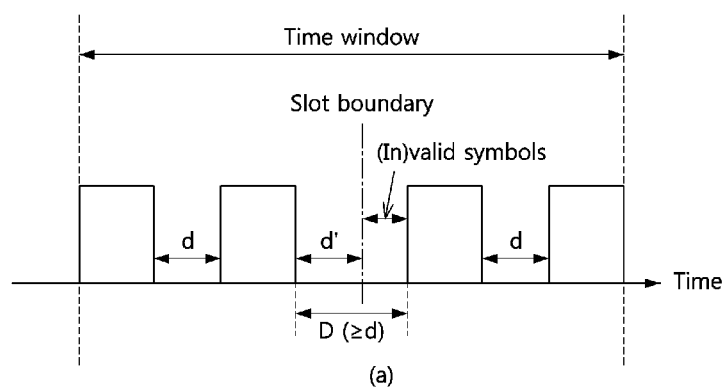
(a)
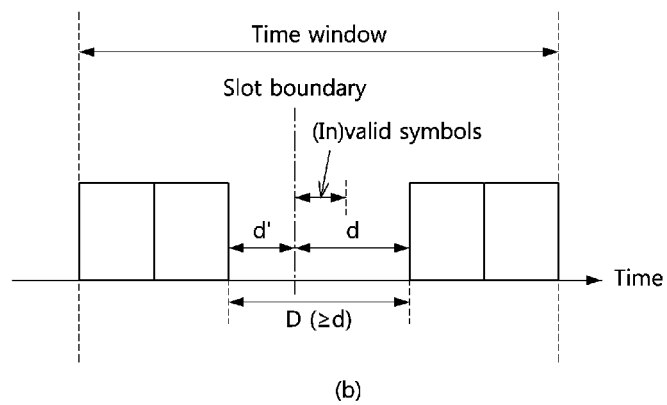
(b)

FIG. 7
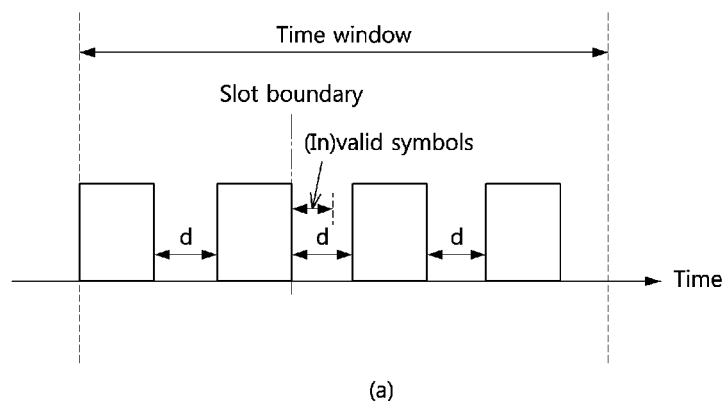
(a)
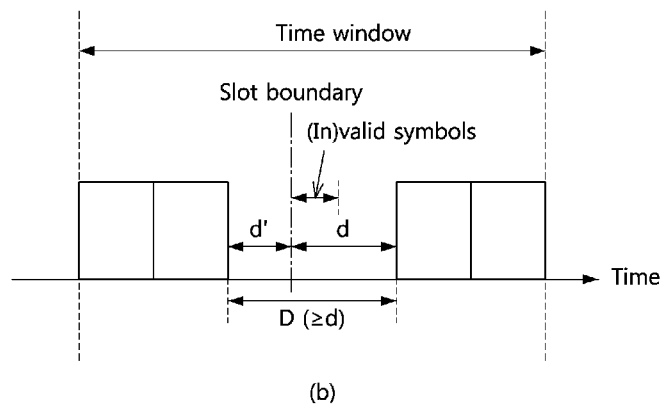
(b)

FIG. 8
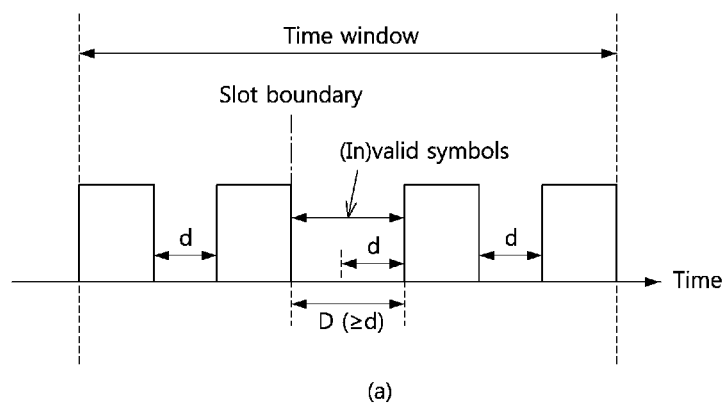
(a)
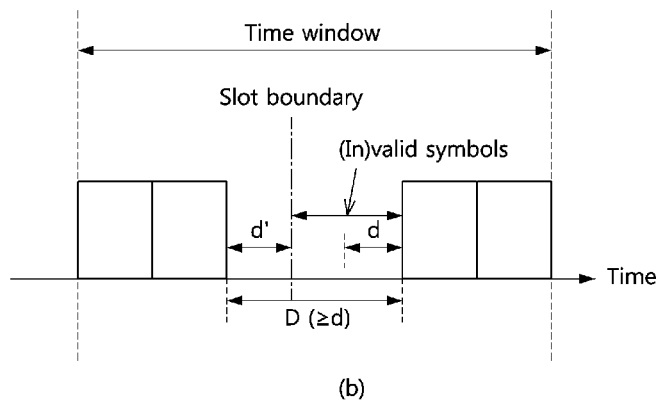
(b)

FIG. 9
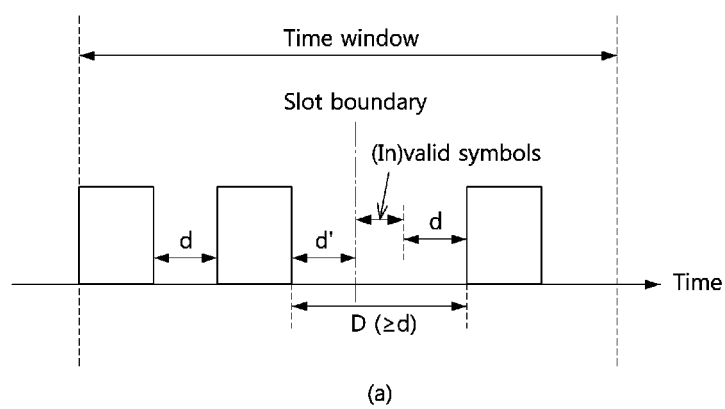
(a)
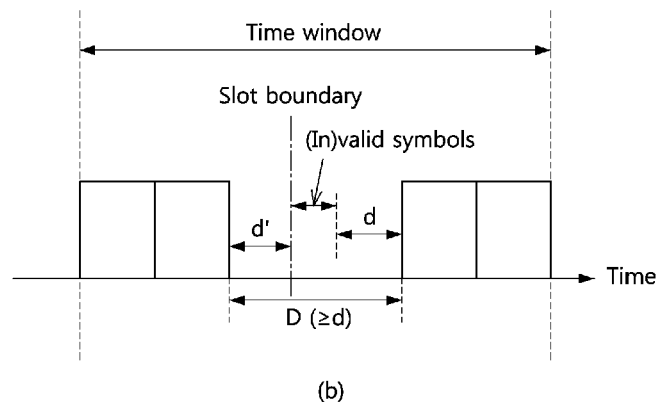
(b)

FIG. 10
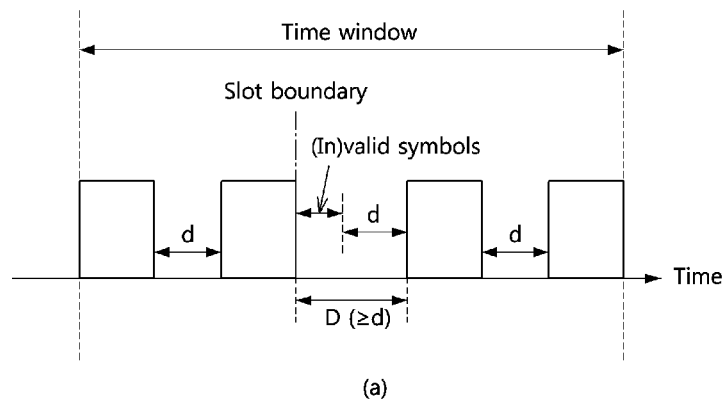
(a)
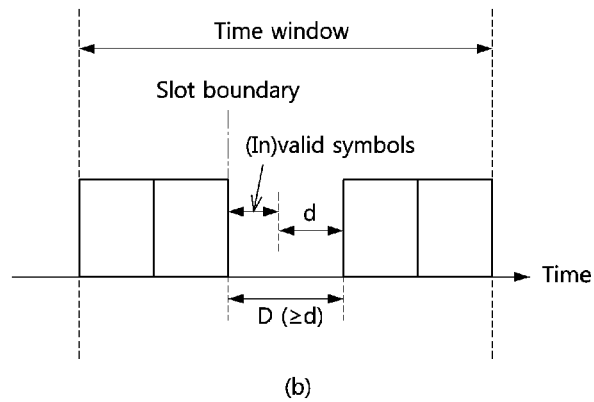
(b)

FIG. 14
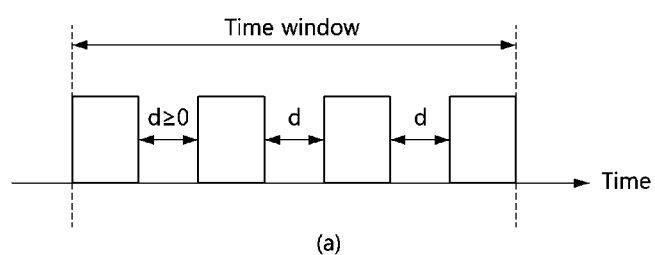
(a)
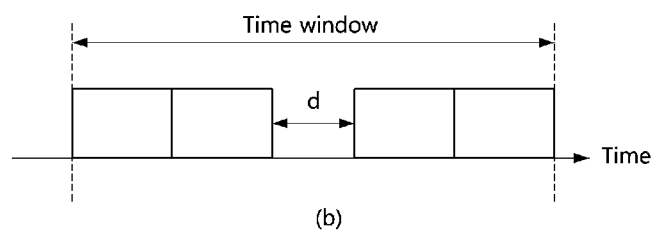
(b)

FIG. 15
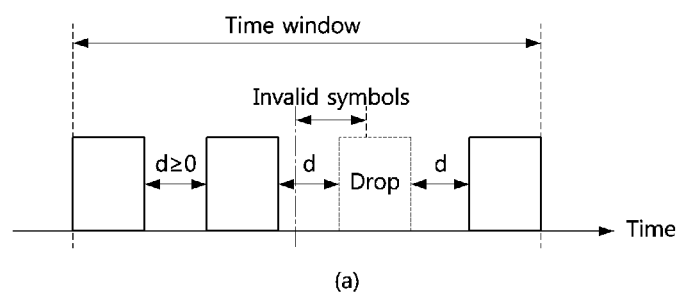
(a)
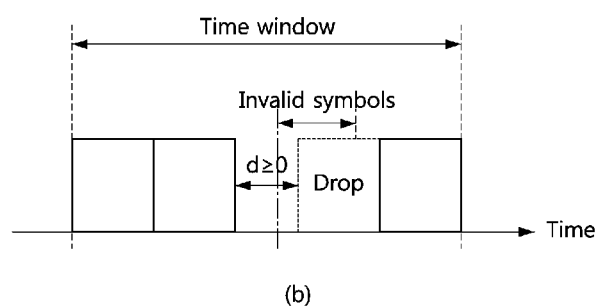
(b)

FIG. 16
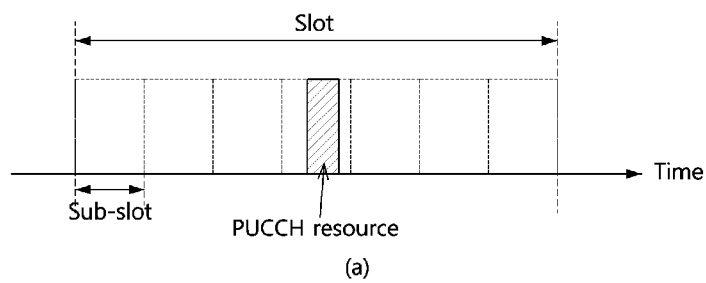
(a)
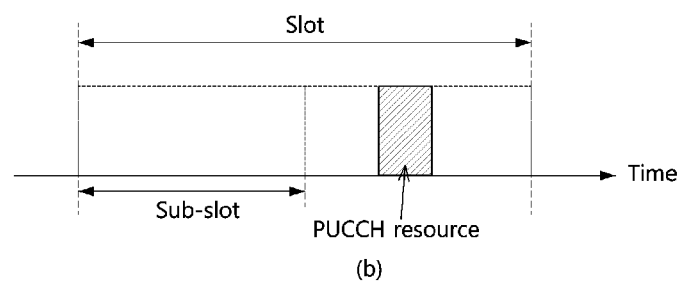
(b)
FIG. 17
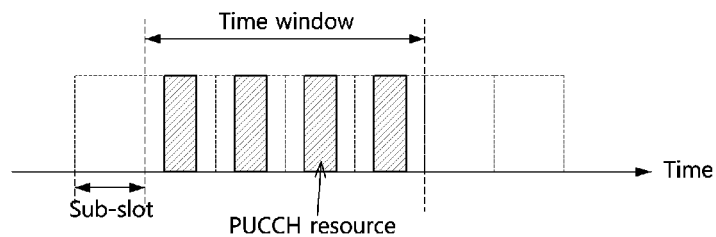

FIG. 23
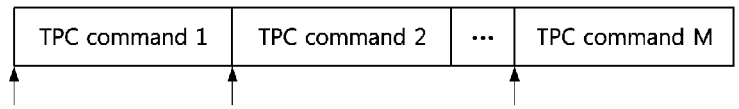
FIG. 24
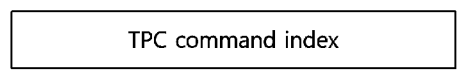
FIG. 25
| | | | | | | | | |
|---|---|---|---|---|---|---|---|---|
| R | \multicolumn{5}{c}{Serving cell ID} | | BWP ID | | Oct x |
| R | \multicolumn{7}{c}{PUCCH Resource ID} | Oct x+1 |
| R | R | \multicolumn{6}{c}{Spatial Relation Info ID} | Oct x+2 |
FIG. 26
| | | | | | | | | |
|---|---|---|---|---|---|---|---|---|
| R | Serving cell ID | | | | | BWP ID | | Oct x |
| R | PUCCH Resource ID | | | | | | | Oct x+1 |
| R | R | Spatial Relation Info ID$_{n,1}$ | | | | | | Oct x+2 |
| R | R | Spatial Relation Info ID$_{n,2}$ | | | | | | Oct x+3 |

FIG. 27

| | | | | | | | | |
|---|---|---|---|---|---|---|---|---|
| | | | | | | | | |
| R | \multicolumn{5}{c}{Serving cell ID} | \multicolumn{3}{c}{BWP ID} | Oct x |
| R | \multicolumn{8}{c}{PUCCH Resource ID} | Oct x+1 |
| R | $C_0$ | \multicolumn{7}{c}{Spatial Relation Info $ID_{n,1}$} | Oct x+2 |
| R | R | \multicolumn{7}{c}{Spatial Relation Info $ID_{n,2}$} | Oct x+3 (optional) |

FIG. 28

| | | | | | | | | |
|---|---|---|---|---|---|---|---|---|
| R | Serving cell ID | | | | | BWP ID | | Oct x |
| R | PUCCH Resource ID | | | | | | | Oct x+1 |
| R | $C_i$ | Spatial Relation Info $ID_{n,i}$ | | | | | | Oct x+2 |

FIG. 29

| | | | | | | | | |
|---|---|---|---|---|---|---|---|---|
| R | Serving cell ID | | | | | BWP ID | | Oct x |
| R | PUCCH Resource ID | | | | | | | Oct x+1 |
| k | $C_0$ | Spatial Relation Info $ID_{n,k}$ | | | | | | Oct x+2 |
| R | R | Spatial Relation Info $ID_{n,2}$ | | | | | | Oct x+3 (optional) |

FIG. 42
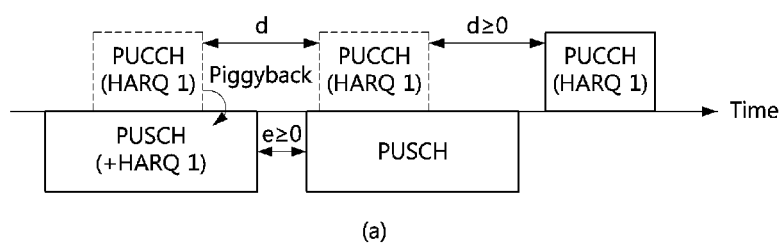
(a)
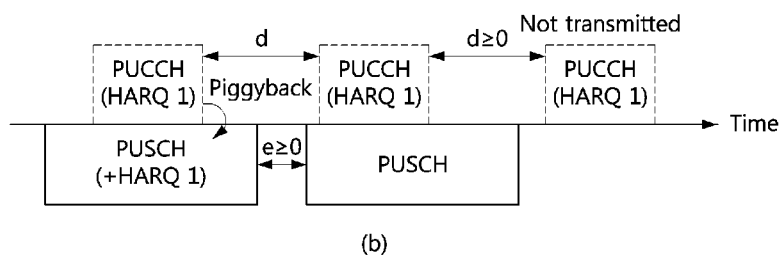
(b)

FIG. 55
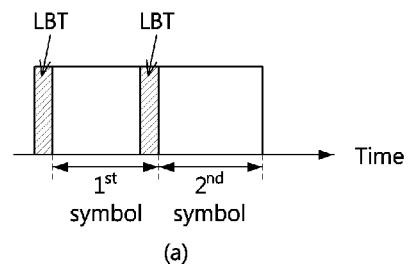
(a)
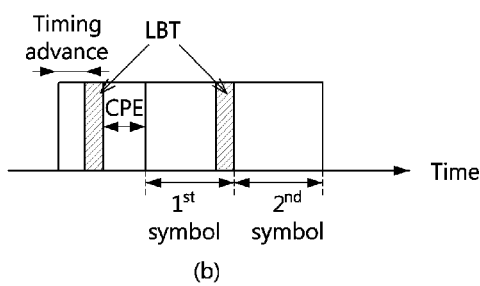
(b)
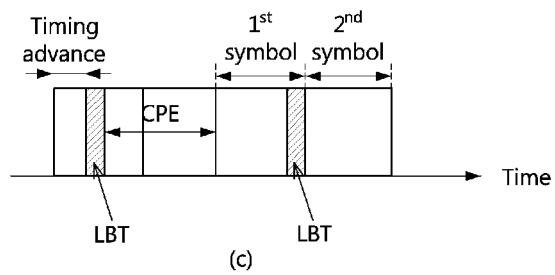
(c)
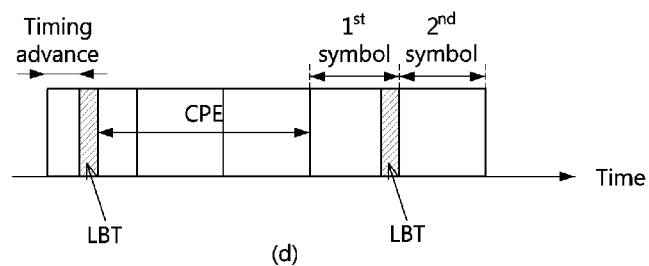
(d)

# UPLINK TRANSMISSION METHOD FOR ULTRA-RELIABILITY AND LOW-LATENCY COMMUNICATION, AND APPARATUS THEREFOR

CROSS-REFERENCE TO RELATED APPLICATIONS

This application claims priority to Korean Patent Applications No. 10-2020-0037136 filed on Mar. 26, 2020, No. 10-2020-0039469 filed on Mar. 31, 2020, No. 10-2020-0043624 filed on Apr. 9, 2020, No. 10-2020-0047018 filed on Apr. 17, 2020, No. 10-2020-0055459 filed on May 8, 2020, No. 10-2020-0058625 filed on May 15, 2020, No. 10-2020-0064568 filed on May 28, 2020, No. 10-2020-0085631 filed on Jul. 10, 2020, No. 10-2020-0098746 filed on Aug. 6, 2020, No. 10-2020-0102780 filed on Aug. 14, 2020, No. 10-2020-0134661 filed on Oct. 16, 2020, No. 10-2021-0007101 filed on Jan. 18, 2021, No. 10-2021-0020716 filed on Feb. 16, 2021, and No. 10-2021-0037839 filed on Mar. 24, 2021 with the Korean Intellectual Property Office (KIPO), the entire contents of which are hereby incorporated by reference.

BACKGROUND

1. Technical Field

The present disclosure relates to uplink transmission methods and apparatuses for ultra-reliability and low-latency communication.

2. Description of Related Art

In order to reduce the error rate of data, a lower modulation and coding scheme (MCS) may be applied. However, in order not to increase the size of the field indicating the MCS in DCI, frequently-used MCSs are selectively used. When it is necessary to apply a further lower MCS, repetitive transmission is used. When a QPSK scheme, which is the lowest modulation order, is used in the repetitive transmission, the effect of further lowering the code rate may be achieved. In particular, since a transmission power is limited in case of uplink, repetitive transmission in the time domain is utilized rather than repetitive transmission in the frequency domain.

For eMBB traffic and URLL traffic supported by the 5G system, the MCS needs to be lowered for different purposes. The eMBB traffic requires a lower MCS to extend a reach, while the URLL traffic requires a lower MCS to reduce a latency and obtain a lower error rate. Since the required requirements are different as described above, the eMBB traffic may be transmitted using repetitive transmission despite a relatively long delay time. On the other hand, in case of the URLLC traffic, new MCSs may be introduced rather than the repetitive transmission, and the new MCS may be indicated by DCI/RRC signaling.

SUMMARY

Accordingly, exemplary embodiments of the present disclosure are directed to providing various uplink transmission methods for ultra-reliability and low-latency communication.

Accordingly, exemplary embodiments of the present disclosure are further directed to providing various uplink transmission apparatuses for ultra-reliability and low-latency communication.

An exemplary embodiment of the present disclosure for achieving the above-described objective, as an uplink transmission method performed by a terminal, may comprise: receiving, from a base station, at least one downlink control information (DCI) for allocating first uplink transmission and second uplink transmission; performing a first listen-before-talk (LBT) procedure for the first uplink transmission, and performing the first uplink transmission when the first LBT procedure is successful; and performing a second LBT procedure for the second uplink transmission, and performing the second uplink transmission when the second LBT procedure is successful, wherein the first uplink transmission and the second uplink transmission are consecutively performed with a time interval longer than a predetermined time.

The at least one DCI may be one DCI for allocating both the first uplink transmission and the second uplink transmission, or DCIs for respectively allocating the first uplink transmission and the second uplink transmission.

The at least one DCI may indicate a scheme of the first LBT procedure.

The first uplink transmission may be transmission of a PUCCH or PUCCH, and the second uplink transmission may be transmission of an SRS.

When the second uplink transmission is present within a channel occupancy time (COT) secured by the base station, the second LBT procedure may be performed by a type 2 channel access scheme, and when the second uplink transmission is present outside the COT secured by the base station, the second LBT procedure may be performed by a type 1 channel access scheme.

The second LBT procedure may be performed by a type 1 channel access scheme.

The second LBT procedure may be performed only on a first symbol of a resource for transmitting the SRS.

Another exemplary embodiment of the present disclosure for achieving the above-described objective, as an uplink transmission method performed by a terminal, may comprise: receiving, from a base station, at least one downlink control information (DCI) for allocating first uplink transmission and second uplink transmission; performing a first listen-before-talk (LBT) procedure for the first uplink transmission, and not performing the first uplink transmission when the first LBT procedure fails; and performing a second LBT procedure for the second uplink transmission, performing the second uplink transmission when the second LBT procedure is successful, and not performing the second uplink transmission when the second LBT procedure fails, wherein the first uplink transmission and the second uplink transmission are consecutively performed with a time interval shorter than a predetermined time.

The at least one DCI may be one DCI for allocating both the first uplink transmission and the second uplink transmission, or DCIs for respectively allocating the first uplink transmission and the second uplink transmission.

The at least one DCI may indicate a scheme of the first LBT procedure.

The first uplink transmission may be transmission of a PUSCH or PUCCH, and the second uplink transmission may be transmission of an SRS.

The second LBT procedure may be performed by a type 1, type 2, type 2A, type 2B, or type 2C channel access scheme.

The second LBT procedure may be performed only on a first symbol of a resource for transmitting the SRS.

When the second LBT procedure fails, the entire SRS may not be transmitted.

Yet another exemplary embodiment of the present disclosure for achieving the above-described objective, as an uplink transmission method performed by a terminal, may comprise: receiving, from a base station, at least one downlink control information (DCI) for allocating first uplink transmission and second uplink transmission; performing a first listen-before-talk (LBT) procedure for the first uplink transmission according to a scheme of the first LBT procedure indicated by the at least one DCI, and performing the first uplink transmission when the first LBT procedure is successful; and determining whether the second uplink transmission is present within a channel occupancy time (COT) secured by the base station; and performing a second LBT procedure in a channel access scheme varying according to whether the second uplink transmission is present within the COT secured by the base station, and performing the second uplink transmission when the second LBT procedure is successful, wherein the first uplink transmission and the second uplink transmission are consecutively performed with a time interval longer than a predetermined time.

The scheme of the first LBT procedure may be a type 1 channel access scheme or a type 2/2A/2B/2C channel access scheme.

The at least one DCI may further include information on whether to apply a cyclic prefix (CP) extension to the first uplink transmission, information on a length value of the CP extension, and/or a channel access priority class of the first uplink transmission.

The at least one DCI may not indicate a scheme of the second LBT procedure for the second uplink transmission.

CP extension may not be applied to the second uplink transmission.

When the second uplink transmission is present within a channel occupancy time (COT) secured by the base station, the second LBT procedure may be performed by a type 2/2A channel access scheme, and when the second uplink transmission is present outside the COT secured by the base station, the second LBT procedure may be performed by a type 1 channel access scheme.

Using the exemplary embodiments of the present disclosure, efficient uplink transmission can be performed. In particular, the use of the exemplary embodiments of the present disclosure enables high-reliability low-latency communication in an unlicensed band. Therefore, the performance of the communication system can be improved.

BRIEF DESCRIPTION OF DRAWINGS

FIG. 6 is a conceptual diagram illustrating an example of a method of considering a slot boundary when a processing time is reflected for each PUSCH instance(s) according to an exemplary embodiment of the present disclosure.

FIGS. 7 to 10 are conceptual diagrams for describing other examples of a method of considering a slot boundary when a processing time is reflected for each PUSCH instance(s) according to an exemplary embodiment of the present disclosure.

FIG. 14 is a conceptual diagram illustrating a case in which a PUCCH is repeatedly transmitted according to an exemplary embodiment of the present disclosure.

FIG. 15 is a conceptual diagram illustrating an example of a method of considering a slot boundary when a time interval is provided for each PUCCH instance(s) according to an exemplary embodiment of the present disclosure.

FIG. 16 is a conceptual diagram illustrating a case of a sub-slot-based PUCCH occasion according to an exemplary embodiment of the present disclosure.

FIG. 17 is a conceptual diagram illustrating a case in which a PUCCH occasion is composed of 4 PUCCH instances according to an exemplary embodiment of the present disclosure.

FIG. 23 is a conceptual diagram illustrating an example of a DCI field in which TPC commands are concatenated according to an exemplary embodiment of the present disclosure.

FIG. 24 is a conceptual diagram illustrating an example of configuring a TPC field with a TPC index indicating a combination of TPC commands according to an exemplary embodiment of the present disclosure.

FIGS. 25 to 29 are conceptual diagrams illustrating configuration examples of a MAC CE for changing spatial relation information applied to a PUCCH according to an exemplary embodiment of the present disclosure.

FIGS. 40 to 43 are conceptual diagrams for describing operation methods when a PUCCH instance and a full/split PUSCH instance overlap each other according to an exemplary embodiment of the present disclosure.

FIG. 55 is another conceptual diagram illustrating SRS symbols to which CP extension is applied according to an exemplary embodiment of the present disclosure.

DETAILED DESCRIPTION OF THE EMBODIMENTS

Figure 1:
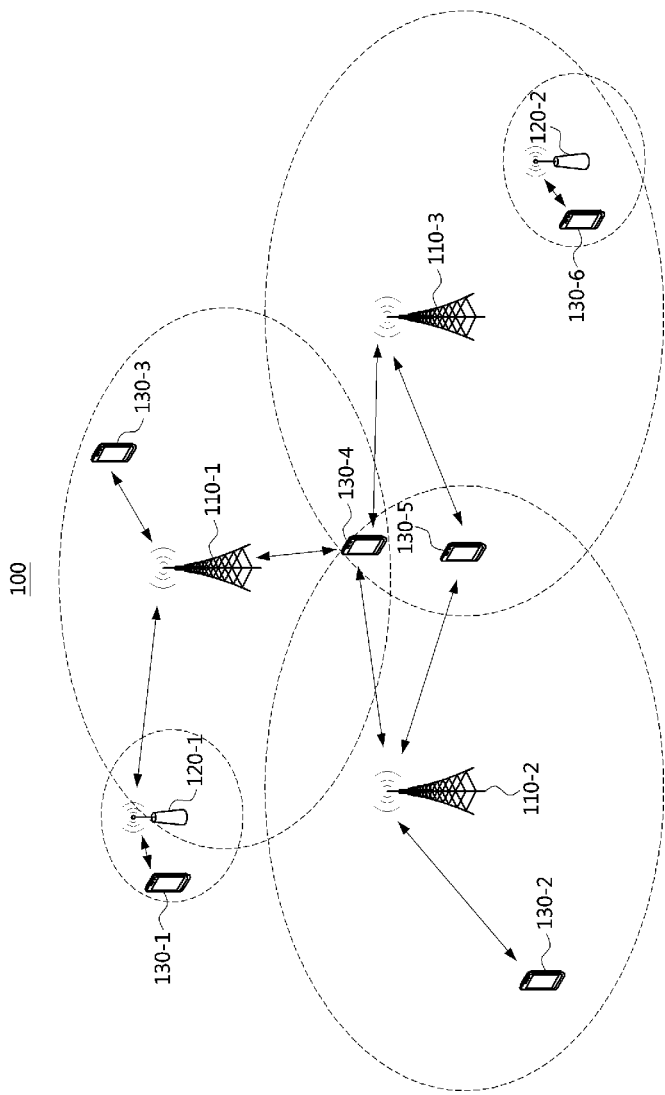
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE) or LTE-advanced (LTE-A)), 5G communication (e.g., new radio (NR)), or the like specified in the 3rd generation partnership project (3GPP) standards. The 4G communication may be performed in a frequency band of 6 GHz or below, and the 5G communication may be performed in a frequency band of 6 GHz or above as well as a frequency band of 6 GHz or below.

For example, for the 4G communication and 5G communication, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may include a serving-gateway (S-GW), packet data network (PDN)-gateway (P-GW), and mobility management entity (MME)). When the communication system 100 supports the 5G communication system (e.g., NR system), the core network may include an access and mobility management function (AMF), a user plane function (UPF), a session management function (SMF), and the like.

Meanwhile, each of the plurality of communication nodes 110-1, 110-2, 110-3, 120-1, 120-2, 130-1, 130-2, 130-3, 130-4, 130-5, and 13-6 constituting the communication system 100 may have the following structure.

Figure 2:
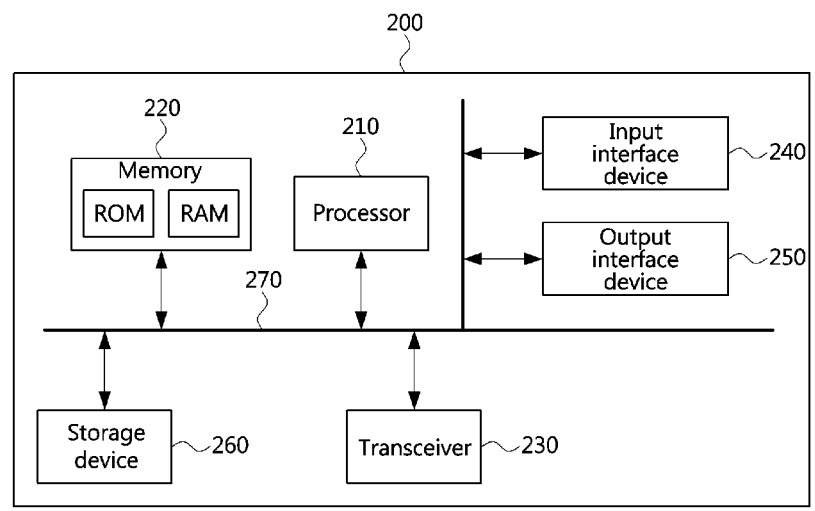
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may be connected with the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a radio base station, a radio transceiver, an access point, an access node, a roadside unit (RSU), a radio remote head (RRH), a transmission point (TP), a transmission and reception point (TRP), an eNB, a gNB, or the like.

Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of Thing (IoT) device, a mounted apparatus (i.e., mounted module/device/terminal, on-board device/terminal, etc.), or the like.

Hereinafter, various uplink transmission methods will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

A terminal may communicate with a base station in a wide range of frequency bands ranging from several hundred MHz to several tens of GHz. In general, since the diffraction or reflection characteristics of radio waves are not good in a communication system operating in a high frequency band, the coverage of radio waves may be extended through beamforming or pre-processing. In order to transmit a control channel and a data channel, including a synchronization signal, the base station may transmit them to the terminal by performing beamforming, and the terminal may also receive them through beamforming. In addition, the terminal may perform beamforming to transmit a control channel and a data channel, and the base station may also receive them through beamforming.

A terminal accessing a system may receive a synchronization signal and a broadcast channel (e.g., synchronization signal/physical broadcast channel, SS/PBCH block), acquire downlink frequency synchronization and time synchronization, and identify cell identification information. The terminal may identify control channel resources or a region (e.g., control resource set, CORESET) and a search space set of control channels from the PBCH. Information required for initial access of the terminal may be indicated to the terminal in the corresponding CORESET (or CORESET 0) and search space set. In this case, a search space set in which system information or remaining minimum system information is scheduled may be referred to as a Type0-PDCCH CSS set.

Depending on a bandwidth of the system in which the terminal performs initial access, the SS/PBCH and CORESET 0 may not be multiplexed in the frequency domain. Accordingly, the SS/PBCH and CORESET 0 may be received by the terminal in the manner of frequency domain multiplexing (FDM) and time domain multiplexing.

In order to support time-domain repetitive transmission for eMBB traffic, PUSCH repetition (or PUSCH repetition type A) has been introduced. In this case, a PUSCH (or PUSCH mapping type A) allocated on a slot basis may be repeatedly transmitted. That is, the PUSCH repetition type A is a scheme in which time resources are allocated over several slots in order to extend a reach distance. DCI (in case of a type 2 configured grant and a dynamic grant) or RRC signaling (in case of a type 1 configured grant) may indicate only a time resource used for transmission in a first slot, and RRC signaling may indicates the number of repetitions, so that time resources for the PUSCH repetition type A may be determined.

Repetitive transmission for URLL traffic is not appropriate because it consumes a delay time, but it is possible to utilize the advantage of lowering a delay for decoding that occurs while applying a sufficiently low MCS. Specifically, if a sufficiently low MCS is applied, the number of resource elements (REs) increases, and a delay time may occur because the base station (a decoder of the base station) has to wait until all REs are received. However, if a PUSCH to which a somewhat higher MCS is applied is repeatedly transmitted, the base station may operate the decoder with only some of the REs, and a first successful decoding when the somewhat higher MCS is applied may be faster rather than a successful decoding when a lower MCS is applied to a single transmission scheme. Since unnecessary delay occurs when the PUSCH repetition type A is applied, in order to reduce the delay time due to repetitive transmission, a PUSCH repetition type B, in which a PUSCH (PUSCH mapping type B) allocated on a mini-slot basis is repeatedly transmitted, has been introduced. DCI (in case of a type 2 configured grant and a dynamic grant) or RRC signaling (in case of a type 1 configured grant) may indicate a combination of a reference time resource that one PUSCH instance has and the number of repetitions, so that time resources for the PUSCH repetition type B may be determined.

For convenience of description, in the PUSCH repetition type B, two or more PUSCH instances may be expressed as constituting one PUSCH occasion.

A. Methods of Configuring a Time Resource in UL Repetition (1) Methods of Interpreting a Time Window in a Licensed Band A slot pattern may be indicated (or configured) to the terminal through RRC signaling or a combination of RRC signaling and DCI. A semi-static UL/DL pattern of slots may be commonly given to a plurality of unspecified terminals through RRC signaling. Alternatively, a semi-static UL/DL pattern of slots may be given to a specific terminal through RRC signaling. Alternatively, DCI-20 (i.e., DCI format 2_0) may be indicated (or configured) to a specific terminal through RRC signaling, so that a UL/DL pattern of slots may be dynamically given to the specific terminal using DCI-20.

In the PUSCH repetition type B, a time resource of a PUSCH occasion may be indicated using DCI (using RRC signaling in case of a type 1 configured grant), both a reference time resource of a PUSCH instance and the number of repetitions may be indicated (or configured). The time resource of the PUSCH occasion may be indicated (or configured) as crossing a slot boundary. According to dynamic activation of a slot format (e.g., DL/FL symbols), occupancy time (e.g., a COT end symbol or fixed frame period of a COT according to SFI or MCOT), or invalid resource, the terminal may or may not transmit a PUSCH instance(s) crossing a slot boundary.

For convenience of description, invalid symbol(s) may refer to symbol(s) to which a PUSCH is not mapped by DCI or RRC signaling, and valid symbol(s) may refer to symbol(s) that are not the invalid symbol(s) within a nominal time window. That is, the valid symbol(s) may refer to symbol(s) to which a PUSCH is mapped. In addition, the invalid symbol(s) may include symbol(s) indicated (or configured) by RRC signaling as symbol(s) in which a synchronization signal/physical broadcast channel (SS/PBCH) block (or SSB) is transmitted and symbol(s) indicated (or configured) by RRC signaling as symbol(s) in which a Type0-PDCCH CSS set is transmitted. In addition, according to a number indicated (or configured) by RRC signaling, the terminal may assume that symbol(s) after semi-static DL symbol(s) as many as the indicated number are invalid symbol(s).

Hereinafter, a nominal time window is not directly indicated to the terminal, but for convenience of description, it may be described that a PUSCH or PUCCH is transmitted within the time window. As an example of a signaling scheme, the number of symbol(s) of one full PUSCH instance and the number of PUSCH instance(s) constituting a PUSCH occasion may be signaled to the terminal. The length of the nominal time window interpreted by the terminal may be a product of these. Here, the nominal time window may be longer than a time for which a PUCCH occasion is actually transmitted, or may have the same length as the time for which a PUCCH occasion is actually transmitted.

Figure 3:
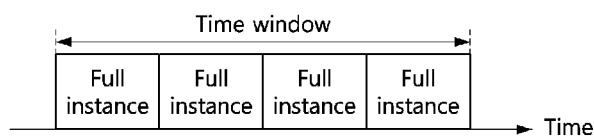
FIGS. 3 and 4 are conceptual diagrams for describing configuration of time resources of a PUSCH repetition type B according to an exemplary embodiment of the present disclosure.
Figure 4:
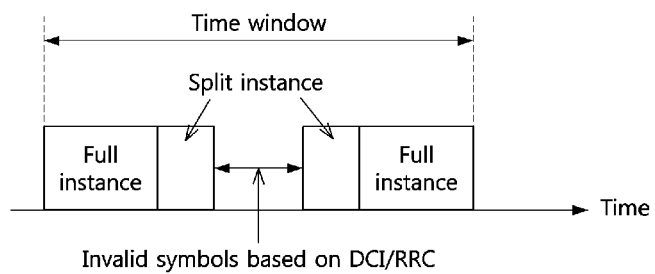

FIGS. 3 and 4 are conceptual diagrams for describing configuration of time resources of a PUSCH repetition type B according to an exemplary embodiment of the present disclosure.

Referring to FIG. 3, a PUSCH is repeatedly transmitted 4 times in all symbols belonging to a nominal time window. Referring to FIG. 4, a PUSCH is repeatedly transmitted 3 times within a nominal time window, but the PUSCH is not transmitted in some symbol(s) (i.e., invalid symbol(s)) belonging to the nominal time window. For example, the second PUSCH instance may be transmitted as being divided in time due to invalid symbols. In the following description, PUSCH instances that are divided in time and transmitted as described above may be defined as spit PUSCH instances. In the split PUSCH instances, a DM-RS for each of them is transmitted and TB is mapped to them. If a split PUSCH instance is composed of only a few symbol(s) and the TB cannot be mapped even when the DM-RS is mapped, the corresponding split PUSCH instance may not be transmitted.

When base station(s) are deployed as a plurality of transmission and reception points (TRPs) (i.e., mTRP or mTRP scenario), the terminal may transmit PUSCH instances included in a PUSCH occasion to different TRPs. For example, in case of the 3GPP NR system, if the terminal operates in a frequency range 1 (FR1), even when the terminal applies the same transmit precoding matrix indicator (TPMI)/transmit rank indicator (TRI) or SRS resource indicator (SRI) to all the PUSCH instances, reception at the plurality of TRPs is not difficult. However, if the terminal operates in an FR2, it is preferable to apply a different TPMI/TRI or SRI to each TRP.

Accordingly, in order for the terminal to apply a different spatial pre-processing (precoding or spatial filter) to each TRP or allocate a different transmission power to each TRP, an operation of changing a TPMI/TRI or SRI for each PUSCH instance is required. In the following description, a UL transmission configuration indicator (TCI) state may refer to a pre-processing applied by the terminal. In case of a codebook-based PUSCH transmission, a UL TCI state may be interpreted as a TPMI or TPMI and SRI, and in case of a non-codebook-based PUSCH transmission, a UL TCI state may be interpreted as SRI or DL RS (e.g., SS/PBCH block, CSI-RS for tracking).

The operation of changing a TCI state includes an operation in which the terminal changes a spatial pre-processing (TPMI, SRI, or spatial filter) and/or allocates a transmission power and/or timing advance differently. Therefore, a predetermined processing time is required to apply different TCI states depending on capability of the terminal. Hereinafter, a processing time is expressed as the number (d) of symbols corresponding to the processing time for convenience of description.

(2) Methods for Interpreting a Time Window in Consideration of Additional RRC Signaling Hereinafter, examples in which a processing time is considered for each PUSCH instance or a group of two or more PUSCH instances will be described.

Figure 5:
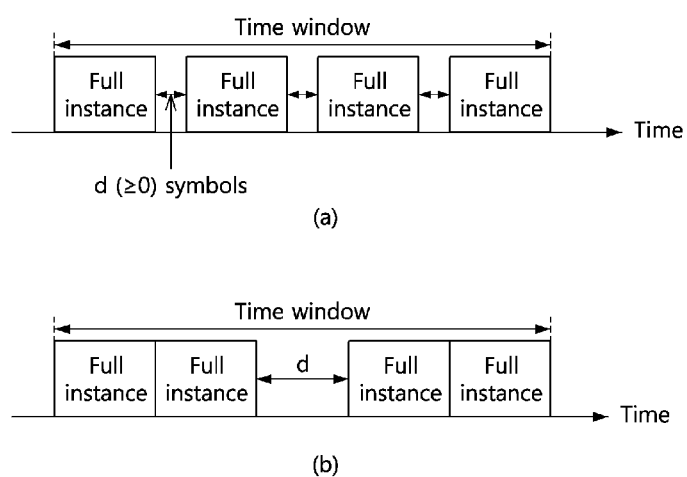
FIG. 5 is a conceptual diagram illustrating examples in which a processing time is reflected for each PUSCH instance(s) according to an exemplary embodiment of the present disclosure.

FIG. 5 is a conceptual diagram illustrating examples in which a processing time is reflected for each PUSCH instance(s) according to an exemplary embodiment of the present disclosure.

Referring to FIG. 5, an example of the PUSCH repetition type B in the mTRP scenario is shown. In case of a PUSCH occasion indicated by a dynamic UL grant, a nominal time window is derived from DCI. In case of a PUSCH occasion indicated by a type 1 configured grant (T1 CG), a length of a nominal time window is derived from RRC signaling, and in case of a PUSH occasion indicated by a type 2 configured grant (T2 CG), a length of a nominal time window is derived from activation DCI. The terminal may map a PUSCH instance(s) to time resources excluding invalid symbol(s). Accordingly, in the method of indicating a nominal time window, a predetermined processing time may be considered.

When the same transmission power is allocated to PUSCH instances, a time required for the operation of changing a pre-processing for each PUSCH instance may not be large. For example, the length of the time required for the operation of changing a pre-processing for each PUSCH instance may be less than a length of a CP period. In case that all of a plurality of antenna panels included in the terminal are activated, the operation of the terminal for changing a pre-processing may be interpreted as an operation in which the terminal selects antenna panel(s) to perform transmission. In this case, an additional interval may not be necessary between the PUSCH instances (i.e., d=0). In addition, also when the PUSCH instances have TAs of similar values, an additional interval may not be necessary between the PUSCH instances. In this case, in order to determine a transmission power to be allocated to each PUSCH instance, one PUSCH instance belonging to the PUSCH occasion may be a reference for deriving the transmission power.

The same UL TCI state may be indicated to the terminal for one or more PUSCH instance(s). In this case, it may be assumed that PUSCH instance(s) for which the same UL TCI state is indicated will be received by the same TRP. When a UL TCI state is changed, a processing time is required to apply a different pre-processing or allocated a different power.

For convenience of description, in the following methods, a case where a time interval is provided for each PUSCH instance is considered. However, even when a time interval is provided for each group of PUSCH instances, the following methods may be easily extended and applied.

(Method A.2-1) A nominal time window is derived from DCI/RRC.

The terminal may transmit a PUSCH occasion using only valid symbol(s) belonging to a nominal time window. In case of a dynamic UL grant, the terminal may receive a time window indication by scheduling DCI. In case of a T1 CG, a time window may be indicated (or configured) to the terminal through RRC signaling. In case of a T2 CG, a time window may be indicated (or configured) to the terminal through activation DCI.

(Method A.2-2) A nominal time window is determined by at least a reference length L and the number K of repetitions of a PUSCH instance According to a proposed method, the terminal determines a nominal time window by using at least a reference length (L) and the number of repetitions (K) of a PUSCH instance. In an example, a nominal time window may be given as consecutive L·K symbols. The terminal maps a PUSCH excluding invalid symbols. Since a processing time is required for the terminal for each PUSCH instance, L or more symbols are required to transmit one PUSCH instance. For example, if K PUSCH instances are successively transmitted, ((K−1)d+K·L) symbols are required. Therefore, when L·K symbols are indicated to the terminal, the terminal may identify valid symbol(s) and invalid symbol(s) among the L·K symbols, and may map the PUSCH instance(s) by using only the valid symbol(s). According to (Method A.2-2), the terminal may not transmit all K PUSCH instances even when all symbols belonging to the nominal time window are valid symbols.

(Method A.2-3) A Nominal time window may be determined by at least a reference length L, the number K of repetitions, and a processing time d of a PUSCH instance.

According to a proposed method, when the terminal is allocated a PUSCH occasion according to (Method A.2-2), a processing time may be additionally considered. Here, the processing time may be given by RRC signaling. The processing time may be indicated to the terminal as a value determined by the base station in consideration of the capability of the terminal. Alternatively, a value predetermined in the technical specification may be applied as the processing time. Alternatively, the predetermined value may vary according to a frequency region (FR1 or FR2). In an example, a nominal time window may be derived as a function of (L, K, d), and may be given as consecutive ((K−1)d+K·L) symbols. The terminal maps a PUSCH excluding invalid symbols. According to (Method A.2-3), the terminal may transmit all K PUSCH instances when all symbols belonging to the nominal time window are valid symbols.

Hereinafter, a system operating in a licensed band is considered. When the terminal transmits a PUSCH occasion to the base station, if the PUSCH occasion crosses a slot boundary, the base station may indicate to the terminal a pattern of symbols in which a PUSCH instance cannot be transmitted among FL symbols through RRC signaling. The base station may indicate (or configure) to the terminal whether the corresponding symbols can be used or not by using scheduling/activation DCI or RRC signaling indicating the terminal to transmit the PUSCH occasion. That is, these symbol(s) may be used for transmission of a PUSCH instance according to the indication of the base station. Hereinafter, these symbol(s) are referred to as (in)valid symbol(s). The (in)valid symbol(s) may be indicated by RRC signaling. While the terminal is allocated a PUSCH occasion from the base station, the terminal may determine the (in)valid symbol as a valid symbol or invalid symbol by using additional information (e.g., capability of the terminal, slot pattern in case of TDD, a message configured by RRC signaling of the base station, SS/PBCH block pattern, and/or Type0-PDCCH CSS set/CORESET 0).

If the base stations are configured with a plurality of TRPs (i.e., mTRP scenario), the terminal may consider a predetermined processing time in order to transmit PUSCH instance(s) belonging to a PUSCH occasion.

(Method A.2-4) When (in)valid symbol(s) are composed of d or more symbols, even if the (in)valid symbol(s) are determined as invalid symbol(s), the terminal may not additionally allocate a processing time. When (in)valid symbol(s) are composed of less than d (i.e., d−1 or less) symbols, if the (in)valid symbol(s) are determined as invalid symbol(s), the terminal should allocate a processing time additionally.

Depending on the capability of the terminal, a post-processing for downlink reception and a pre-processing for uplink transmission may be separately operated. When (in)valid symbol(s) are determined as invalid symbol(s), since a PUSCH instance is not mapped to the corresponding (in)valid symbol(s), the terminal may utilize a period corresponding to the (in)valid symbol(s) as a time for changing the pre-processing. For example, based on a slot boundary, an immediately preceding PUSCH instance and an immediately following PUSCH instance may have an interval of d symbols or more.

FIG. 6 is a conceptual diagram illustrating an example of a method of considering a slot boundary when a processing time is reflected for each PUSCH instance(s) according to an exemplary embodiment of the present disclosure.

Referring to FIG. 6, since a processing time for a PUSCH instance transmitted before a slot boundary is not sufficiently secured, a subsequent PUSCH instance may be transmitted after the slot boundary. This is because a time represented by d' symbols is not long enough, and thus a split PUSCH instance cannot be mapped. When the (in)valid symbol(s) are determined as invalid symbol(s), the terminal may interpret symbol(s) located thereafter as valid symbol(s).

FIGS. 7 to 10 are conceptual diagrams for describing other examples of a method of considering a slot boundary when a processing time is reflected for each PUSCH instance(s) according to an exemplary embodiment of the present disclosure.

Referring to FIG. 7, a case in which the length of (in)valid symbol(s) is shorter than a processing time is shown. When the (in)valid symbol(s) are determined as invalid symbol(s), the terminal may map a PUSCH instance after d' symbols to secure a processing time.

On the other hand, referring to FIG. 8, a case in which the length of (in)valid symbol(s) is longer than a processing time is shown. When the (in)valid symbol(s) are determined as invalid symbol(s), the terminal may not need to additionally secure a processing time because a period of the (in)valid symbol(s) can be used as a processing time by applying (Method A.2-4).

Meanwhile, according to the capability of the terminal, a post-processing for downlink reception and a pre-processing for uplink transmission may not be distinguished. In this case, if (in)valid symbol(s) are determined as invalid symbol(s), the terminal may not arbitrarily utilize a period of the (in)valid symbol(s) for downlink reception from the base station. Therefore, (Method A.2-4) may not be applied.

(Method A.2-5): When (in)valid symbol(s) are determined as invalid symbol(s), the terminal may additionally allocate a processing time after the (in)valid symbol(s), and transmit a PUSCH instance thereafter.

Referring to FIGS. 9 and 10, the terminal may additionally allocate a processing time regardless of the length of the (in)valid symbol(s).

(3) Methods of Interpreting a Time Window in Consideration of Additional DCI

Hereinafter, a system operating in an unlicensed band is considered. In order to perform high-reliability low-latency communication in an unlicensed band, the base station may indicate (or configure) the PUSCH repetition type B to the terminal. In an unlicensed band, channel sensing (or listenbefore-talk (LBT) procedure) should be performed before the base station or the terminal performs transmission. When the terminal operates as a load based equipment (LBE), the terminal may secure a channel occupancy time (COT) starting at an arbitrary time through an LBT procedure. When the terminal operates as a frame based equipment (FBE), the terminal may secure a COT (or Fixed Frame Period, FFP) starting at a predetermined time through an LBT procedure. In order for the terminal to operate as an FBE, the terminal may be indicated (or configured) by higher layer signaling. For example, the base station may explicitly indicate that the terminal operates as an FBE in a corresponding band by using a specific parameter of SIB1 or RRC signaling. Alternatively, when an unlicensed band is determined, it may be determined that the terminal operates as an LBE or FBE without additional signaling.

When operating as an LBE, if the terminal fails in an LBT procedure, an LBT procedure may not be performed again for a predetermined time. In order to impart fairness to times occupied by a plurality of terminals and/or base stations in an unlicensed band, the time for which the LBT procedure is prohibited may increase or decrease according to a success or failure of the LBT procedure. A maximum occupancy time (i.e., maximum COT, MCOT) when the terminal succeeds in an LBT procedure and transmits an uplink signal and/or channel may be determined. In this case, a value of MCOT may be derived from the characteristics of the LBT procedure performed by the terminal or the length of the sensing time of the LBT procedure.

When operating as an FBE, the terminal may periodically perform an LBT procedure. Even when the terminal fails in an LBT procedure, a time to perform an LBT procedure again may not be affected. The LBT procedure may be performed only for a sensing time that is a predetermined amount of time. When the LBT procedure is successful, the terminal may transmit an uplink signal and/or channel within a MCOT. Alternatively, if the LBT procedure is successful by performing the LBT procedure before the terminal transmits an uplink signal and/or channel, the terminal may transmit the uplink signal and/or channel. In this case, a maximum time secured by the terminal as a time corresponding to the MCOT may be derived from a periodicity at which the terminal performs an LBT procedure. A time at which the terminal can perform the LBT procedure is determined in the technical specification. For example, the periodic LBT procedure may start only in even-numbered radio frames, and the LBT procedure may be started only when a time becomes an integer multiple of a value (e.g., one of {1, 2, 4, 5, 10, 20}ms). That is, the terminal may start the LBT procedure at one or more predetermined time positions among them, and when the LBT procedure is successful, the terminal may occupy 95% or less of the period. In this case, a time that the terminal cannot occupy or a time that the terminal does not occupy may be referred to as an idle time (or an idle period).

An example of the PUSCH repetition type B in an unlicensed band scenario is related to a time that the serving base station or the terminal secures by performing the LBT procedure. The terminal may transmit a PUSCH only after the LBT procedure is successful. As an example, it may be assumed that a nominal time window fully belongs to a resource (i.e., COT) already secured by the base station or the terminal.

Figure 11:
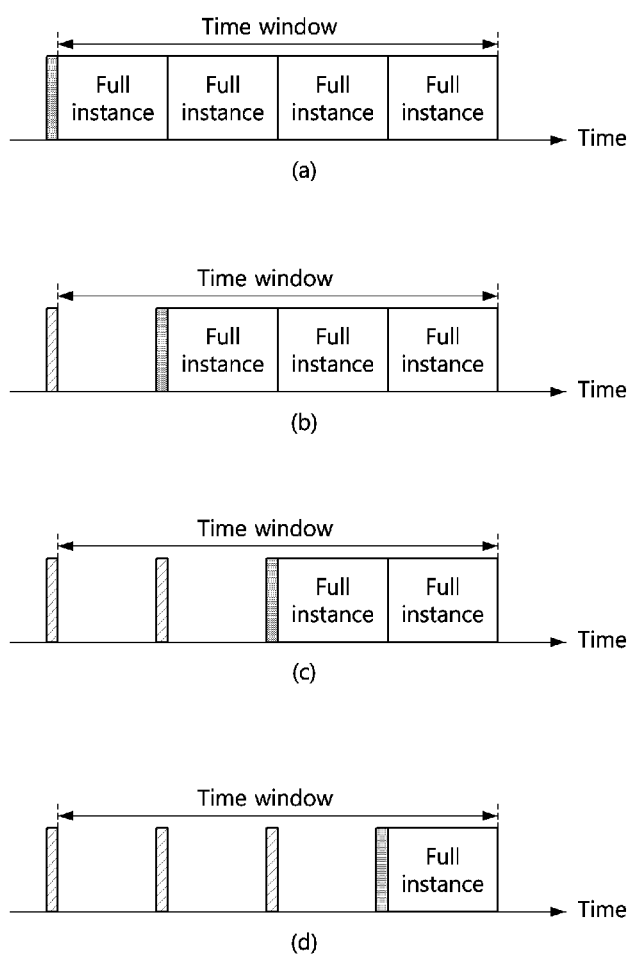
FIG. 11 is a conceptual diagram illustrating a relationship between a PUSCH repetition type B and a time secured by an LBT procedure according to an exemplary embodiment of the present disclosure.

FIG. 11 is a conceptual diagram illustrating a relationship between a PUSCH repetition type B and a time secured by an LBT procedure according to an exemplary embodiment of the present disclosure.

Referring to FIG. 11, a PUSCH occasion may be composed of 4 PUSCH instances. According to a result of an LBT procedure, the terminal may transmit 4 or less PUSCH instance(s). In FIG. 11, a case (a) is a case in which a first LBT procedure is successful so that transmission from the first PUSCH instance of the PUSCH occasion is possible, a case (b) is a case in which the first LBT procedure fails and a second LBT procedure succeeds so that transmission from the second PUSCH is possible, a case (c) is a case in which the first and second LBT procedures fail and a third LBT procedure is successful so that transmission from the third PUSCH instance is possible, and a case (d) is a case in which the first, second, and third LBT procedures fail and a fourth LBT procedure is successful so that transmission from the last PUSCH instance is possible. Here, the terminal may perform the LBT procedures up to 4 times, and may operate as an LBE or FBE according to characteristics of an unlicensed band. A specific method of the LBT procedure may vary depending on whether the terminal operates as an LBE or FBE, and there may be cases where the LBT procedure is unnecessary.

Meanwhile, a nominal time window may be interpreted as crossing one COT. For example, a nominal time window of a PUSCH occasion may be interpreted so that the nominal time window starts in a time secured by the base station or terminal and exceeds an MCOT (or idle time). Here, the LBT procedure performed by the base station and the LBT procedure performed by the terminal may have the same length of sensing times (i.e., sensing time or LBT category), but may have different sensing times.

(Method A.3-1) The terminal may regard some symbol(s) among symbols belonging to both a nominal time window and a COT as valid symbol(s).

The terminal may know symbol(s) in which a PUSCH instance can be transmitted within a COT. For example, the terminal may receive a COT indicator from the base station through DCI. In this case, the COT indicator may classify characteristics of symbols of a time resource secured by the base station into DL, FL, and UL. The terminal may transmit a PUSCH instance in symbols (i.e., FL symbol(s) or UL symbol(s)) other than DL symbols. Therefore, the terminal may know a nominal time window from scheduling DCI and/or activation DCI, and the terminal may derive valid symbol(s) for transmitting a PUSCH occasion by combining the nominal time window and additional DCI (i.e., COT indicator). Here, the COT indicator may indicate a structure of the time resource secured by the base station and shared with the terminal, and the terminal may be indicated the characteristic of symbols and/or valid symbol(s) belonging to the same time resource by one or more COT indicators.

Figure 12:
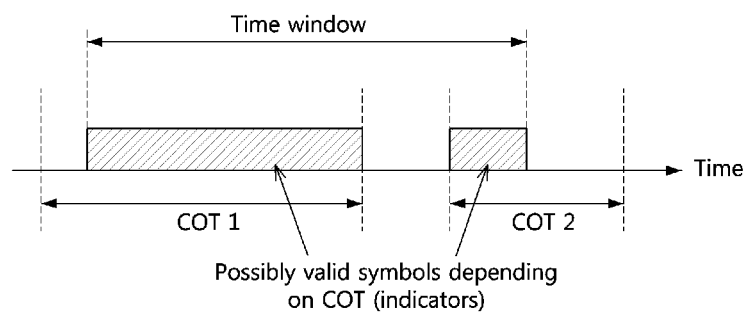
FIG. 12 is a conceptual diagram illustrating a method of determining valid symbols by combining a nominal time window and COT indicators according to an exemplary embodiment of the present disclosure.

FIG. 12 is a conceptual diagram illustrating a method of determining valid symbols by combining a nominal time window and COT indicators according to an exemplary embodiment of the present disclosure.

Referring to FIG. 12, a COT1 and COT2 refer to COTs secured by the base station. The terminal may derive a nominal time window and determine valid symbol(s) from among symbols belonging to the nominal time window and the COT1 or COT2. To this end, the terminal may determine the valid symbol(s) by decoding COT indicators. The terminal may determine the valid symbol(s) in consideration of both a COT indicator for the COT1 and a COT indicator for the COT2.

Meanwhile, the valid symbol(s) may be determined not in the COT secured by the base station, but also in a COT secured by the terminal. For example, in FIG. 12, the COT2 may be a COT secured by the terminal. In this case, the COT indicator for the COT2 may not be separately signaled to the terminal. Alternatively, even when the terminal receives a COT indicator from the base station and the COT indicator includes information on symbols belonging to the COT2, if the COT2 is a COT secured by the terminal, the information of the COT indicator for the COT2 received from the base station may not be used.

Meanwhile, the base station may not signal the COT indicator(s) to the terminal. In this case, the terminal may regard a symbol in which the terminal succeeds in the LBT procedure among symbols belonging to the nominal time window and symbols thereafter as valid symbols within MCOT.

Meanwhile, when the terminal operates as an FBE, the terminal may not be able to receive or transmit in an idle time. Accordingly, symbols belonging to the idle time may be regarded as invalid symbols.

(Method A.3-2) The terminal may attempt a plurality of LBT procedures to transmit a PUSCH occasion in symbol(s) belonging to a nominal time window.

The terminal may perform an LBT procedure immediately before a nominal time window or in a symbol belonging to the nominal time window, and may transmit a PUSCH occasion when the LBT procedure is successful. Since a PUSCH occasion is composed of two or more PUSCH instances, the terminal may perform the LBT procedures at least as many as the number of (split) PUSCH instances.

Figure 13:
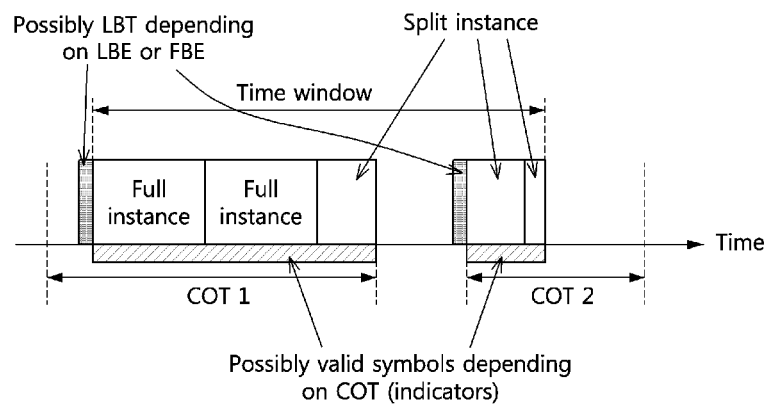
FIG. 13 is a conceptual diagram illustrating a case in which a terminal attempts an LBT procedure within a nominal time window according to an exemplary embodiment of the present disclosure.

FIG. 13 is a conceptual diagram illustrating a case in which a terminal attempts an LBT procedure within a nominal time window according to an exemplary embodiment of the present disclosure.

Referring to FIG. 13, the terminal may derive a nominal time window, and perform an LBT procedure. When the LBT procedure is successful, the terminal may map a PUSCH instance. Depending on whether the terminal operates as an LBE or FBE, the terminal may or may not perform the LBT procedure. For example, when operating as an LBE, the terminal may attempt a C2 LBT (e.g., category 2 LBT or type 2/2A/2B/2C channel access) procedure to secure a COT1, and attempt a C4 LBT (e.g., category 4 LBT or type 1 channel access) procedure to secure a COT2. For example, in case of operating as an FBE, the terminal may secure the COT1 without an LBT procedure or by performing a C2 LBT procedure, and may secure the COT2 by attempting an LBT procedure again.

The terminal may determine some symbols among symbols belonging to the nominal time window and the COT1 or COT2 as valid symbol(s). In this case, a full PUSCH instance may be split into two or more split PUSCH instances by invalid symbol(s).

(4) Methods of Determining a Time Resource for UCI Transmission

Hereinafter, a method of allocating a PUCCH occasion will be described. In order to transmit uplink control information (UCI), the terminal may receive an indication of a resource of a PUCCH by RRC signaling. The resource of the PUCCH transmitted by the terminal may be indicated using information included in DL-DCI or using information indicated by a MAC layer. Here, the DL-DCI may mean scheduling DCI, but is not limited thereto. The DL-DCI may also include activation DCI for a SPS PDSCH. A CRC of the scheduling DCI may be scrambled by at least a C-RNTI, MCS-C-RNTI, or CS-RNTI, and a CRC of the activation DCI may be scrambled by a CS-RNTI.

Considering a scenario in which one or more TRPs are deployed, a PUCCH may be repeatedly transmitted for each TRP. That is, UCI is repeatedly transmitted, and a pre-processing considering each TRP may be applied to a PUCCH instance. Here, the pre-processing applied to the PUCCH instance may be indicated (or configured) to the terminal through higher layer signaling. For example, the pre-processings applied to the PUCCH instances may be indicated (or configured) to the terminal by using one index included in a message indicated by the MAC layer.

A nominal time window may not be indicated to the terminal and may be derived based on information received by the terminal. For example, through DL-DCI or RRC signaling, a first symbol of a PUCCH occasion may be indicated to the terminal. In addition, the number of PUCCH instance(s) constituting the PUCCH occasion should be indicated (or configured) to the terminal.

(Method A.4-1) In an RRC parameter representing a resource of a PUCCH, the number of repetitions is additionally expressed.

When a PDSCH is allocated by DL-DCI or RRC signaling, the terminal may also receive an indication of a PUCCH resource therefor. In this case, the PUCCH resource is represented by an index, and a set of at least one PUCCH resource and at least one PUCCH resource belonging to the set may be indicated (or configured) to the terminal through RRC signaling. The PUCCH resource may include at least a time resource (i.e., the number of symbols that a PUCCH has) and a format of the PUCCH. Here, when transmitted as a PUCCH occasion, the number of repetitions may be further included.

When the amount of UCI is 2 bits or less, the terminal may use a format based on a spread sequence, and otherwise, may use a format to which encoded UCI is mapped. In this case, the number of repetitions applied to the PUCCH occasion may vary. For example, according to (Method A.4-1), since the number of repetitions is assigned for each PUCCH resource, a different number of repetitions may be assigned for each format.

In an example, the terminal may interpret a PUCCH instance as transmission in successive symbols. Alternatively, the terminal may interpret a PUCCH instance as transmission having a predetermined interval (d symbols). Alternatively, in another example, the terminal may interpret a PUCCH instance as transmission having a (sub-) slot interval.

(Method A.4-2) For each PUCCH resource set, the number of repetitions of a PUCCH may be included.

A PUCCH resource set may be selected by the terminal according to the amount of UCI. Depending on the amount of UCI, a PUCCH may be generated by spreading or applying a Reed Muller code or a polar code. The PUCCH resource set may be determined according to the amount of UCI, the first set may be selected when the amount of UCI (N bits) is 1 or 2 bits, and the i-th set may be selected when the amount of UCI is $N_i-1<N\leq N_i$ bits. Here, the value of $N_i$, may be indicated (or configured) to the terminal through RRC signaling. The value of i has a value of 4 or less, and $N_2$ and $N_4$ are fixed to 3 and 1706, respectively. If the value of $N_i$ is not indicated (or configured) to the terminal, it is regarded as 1706.

A coding scheme (i.e., spreading, Reed Muller code, polar code) applied to the PUCCH may be different for each PUCCH resource set. When the appropriate $N_i$, is set, one PUCCH resource set may have the same coding scheme, and may have the same number of repetitions according to (Method A.4-2). This may have a small RRC signaling burden compared to (Method A.4-1).

In an example, when UCI is spread and mapped to a PUCCH, such repetitive transmission may not be supported.

That is, in the first set (i.e., when the amount of UCI is less than 3 bits) of the PUCCH resource set, it may be considered that transmission of the PUCCH is not repeated.

In another example, regardless of the amount of UCI, such repetitive transmission may be independently indicated regardless of the PUCCH resource set. That is, it may be considered that repetitive transmission is indicated (or configured) only in all or some of the PUCCH resource sets according to the indication (or configuration) of the base station.

(Method A.4-3) The number of repetitions is indicated in an RRC parameter representing repetitive transmission of a PUCCH.

Repetitive transmission may not be indicated to the terminal by an index representing a PUCCH resource, and the number of repetitions may be indicated (or configured) separately from the PUCCH resource. In an example, one RRC parameter indicating repetitive transmission of a PUCCH may be used. The same number of times may be applied regardless of whether the number of times the PUCCH is transmitted (i.e., the number of PUCCH instances) is based on a slot or based on a sub-slot.

On the other hand, in another example, a plurality of RRC parameters indicating repetitive transmission of a PUCCH may be indicated to the terminal. For example, an RRC parameter 1 may indicate the number of repetitions at an interval of a slot, and an RRC parameter 2 may indicate the number of repetitions at an interval of a sub-slot. In this case, the terminal may apply the RRC parameter 2 when PUCCH transmission is expressed using a sub-slot, and the RRC parameter 1 when PUCCH transmission is expressed using a slot.

In addition, the RRC parameter indicating repetitive transmission of a PUCCH may be indicated differently for each format. In this case, the RRC parameter may be indicated to the terminal differently for each format and for each slot/sub-slot. A pre-processing of the PUCCH occasion may be indicated (or configured) as a TCI state or SRI.

Hereinafter, a case of transmitting a PUCCH occasion in consecutive symbols will be described.

PUCCH instances belonging to a PUCCH occasion include UCI, and it is preferable that the UCI is delivered to the base station (or TRP) in a short time. This is because the terminal may support URLLC traffic. If UCI is repeatedly transmitted, an error rate at the TRP may be further reduced, but a delay time may be increased in proportion to a time of the PUCCH occasion. In order to reduce this delay time, it is preferable to reduce a time interval between the PUCCH instances.

(Method A.4-4) A time interval between PUCCH instances may have d (d≥0) symbol(s) according to the capability of the terminal.

If a PUCCH occasion is transmitted for transmission to one TRP, PUCCH instances may be identical to each other and thus may be transmitted in consecutive symbols (i.e., d=0). If a PUCCH occasion is transmitted for transmission to two or more TRPs, different preprocessing may need to be applied for each TRP, and thus the terminal may place a predetermined number of symbols between the PUCCH instances as an interval. The value of d may be 0, but may be greater than 0, depending on the capability of the terminal.

FIG. 14 is a conceptual diagram illustrating a case in which a PUCCH is repeatedly transmitted according to an exemplary embodiment of the present disclosure.

A size of a nominal time window may be explicitly or implicitly indicated to the terminal, or may be derived by the terminal based on received information. PUCCH instances having a predetermined interval may be repeatedly transmitted a predetermined number of times within the nominal time window.

It is not always possible to transmit a PUCCH instance in all symbols belonging to the nominal time window. For example, some symbol(s) belonging to a (sub-)slot may be indicated as DL symbol(s) according to a slot pattern, an SSB may be indicated to be transmitted in some symbol(s), or a Type0-PDCCH CSS set may be indicated to be transmitted in some symbol(s). In this case, some PUCCH instance(s) belonging to the PUCCH occasion may not be transmitted. In this case, the interpretation of the nominal time window described in (1), (2), and (3) above may be applied.

FIG. 15 is a conceptual diagram illustrating an example of a method of considering a slot boundary when a time interval is provided for each PUCCH instance(s) according to an exemplary embodiment of the present disclosure.

FIG. 15 shows cases in which some symbol(s) are regarded as invalid symbol(s) by crossing a (sub-)slot boundary. Unlike transmission of the PUSCH, a PUCCH instance may not be transmitted as being divided. Accordingly, in cases (a) and (b) of FIG. 15, the third PUSCH instance may not be transmitted because some symbol(s) are composed of invalid symbol(s).

(Method A.4-5) When some symbol(s) belonging to a PUCCH instance are considered as invalid symbol(s), a corresponding PUCCH instance is not transmitted.

Hereinafter, a PUCCH occasion transmission on a (sub-) slot basis will be described. A sub-slot may be composed of fewer consecutive symbols than a slot, and a length of a sub-slot may be indicated (or configured) by RRC signaling.

FIG. 16 is a conceptual diagram illustrating a case of a sub-slot-based PUCCH occasion according to an exemplary embodiment of the present disclosure.

Referring to FIG. 16, a sub-slot composed of two symbols (i.e., case (a)) or a half of a slot (i.e., case (b)) may be indicated (or configured) to the terminal. An index of a PUCCH resource applied in a sub-slot may be indicated to the terminal. This may be indicated (or configured) using RRC signaling and/or DL-DCI.

Since a time resource of a PUCCH may be indicated regardless of a sub-slot boundary, it may be indicated to cross a sub-slot boundary. However, depending on a certain UCI type or configuration, it may be indicated not to cross a sub-slot boundary. For example, a time resource of a PUCCH on which a HARQ-ACK is transmitted may be indicated not to cross a sub-slot boundary (i.e., case shown in FIG. 16). Alternatively, a time resource of a PUCCH on which CSI is transmitted may be indicated on a slot basis, and may have a time resource crossing a sub-slot boundary.

The following methods may be applied equally to not only a sub-slot, but also a slot. For example, in FIG. 16, a nominal time window may be interpreted by interpreting that a time resource is allocated based on a sub-slot composed of 14 symbols, and a PUCCH resource (or PUCCH instance) may be transmitted once per slot or sub-slot.

When the terminal is indicated to transmit a PUCCH occasion, a sub-slot to which a first PUCCH instance belonging to the PUCCH occasion belongs may be indicated. For example, when UCI is an SR, a periodicity of the SR may be interpreted as a periodicity of the sub-slot. For example, when UCI is a HARQ-ACK, a timing of feeding back a HARQ-ACK for a PDSCH may be given as an offset for the sub-slot. When a length of a sub-slot is indicated (or configured) to the terminal in this manner, repetitive transmission may be performed on a sub-slot basis irrespective of UCI.

Alternatively, depending on a UCI type, a nominal time window in which repetitive transmission is performed may be interpreted differently. For example, even when a length of a sub-slot is indicated (or configured) to the terminal, if UCI is an SR, a PUCCH may be repeatedly transmitted on a slot basis, and if UCI is a HARQ-ACK, a PUCCH may be repeatedly transmitted on a sub-slot basis.

When the terminal is indicated (or configured) to transmit a PUCCH occasion, the terminal may transmit a PUCCH instance in consecutive (sub-)slot(s). In this case, in order to reduce a signaling burden, it may be preferable that PUCCH instances are transmitted in the same resources having a predetermined time interval (i.e., (sub-)slot).

(Method A.4-6) A PUCCH instance is represented by the same resource index in each (sub-)slot, and may be repeated at an interval of a (sub-)slot.

FIG. 17 is a conceptual diagram illustrating a case in which a PUCCH occasion is composed of 4 PUCCH instances according to an exemplary embodiment of the present disclosure.

Referring to FIG. 17, all PUCCH instances may be transmitted because invalid symbol(s) are not included in a nominal time window (or the number of repetitions and a time resource derived as a first sub-slot of the PUCCH instances) indicated to the terminal. Here, four sub-slots are utilized, and these may be included in one or more slot(s).

It is not always possible to transmit the PUCCH instances in successive (sub-) slots. For example, in a system operating in the TDD scheme, some symbol(s) belonging to a (sub-)slot may be indicated as DL symbol(s) according to a slot pattern, an SSB may be indicated to be transmitted in some symbol(s) belonging to a (sub-)slot, or a Type0-PDCCH CSS may be indicated to be transmitted in some symbol(s) belonging to a (sub-)slot. In this case, some PUCCH instances belonging to the PUCCH occasion may not be transmitted. In this case, the nominal time window interpretation described in (1), (2), and (3) above may be applied.

(Method A.4-7) When some symbol(s) belonging to a PUCCH instance are regarded as invalid symbol(s), the corresponding PUCCH instance is not transmitted.

Figure 18:
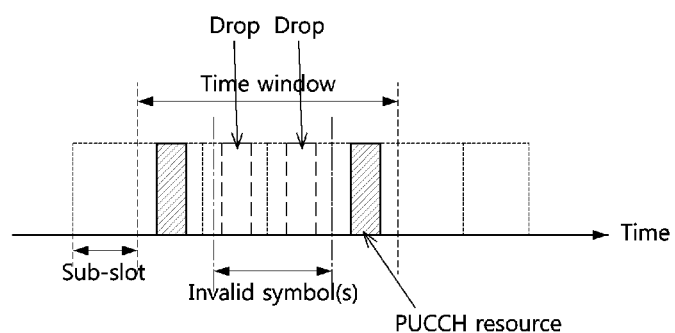
FIGS. 18 and 19 are conceptual diagrams illustrating cases in which a PUCCH instance is not transmitted due to invalid symbol(s) according to an exemplary embodiment of the present disclosure.
Figure 19:
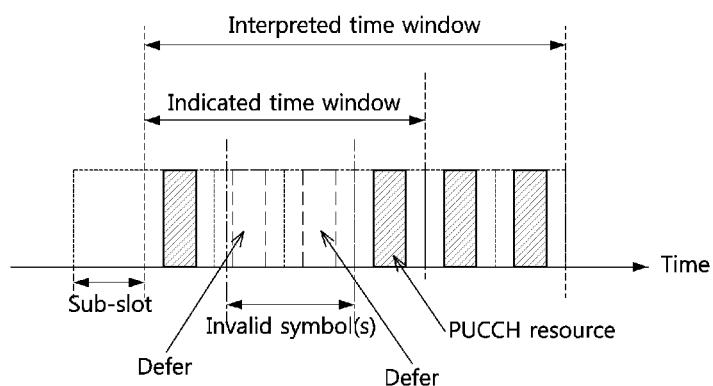

FIGS. 18 and 19 are conceptual diagrams illustrating cases in which a PUCCH instance is not transmitted due to invalid symbol(s) according to an exemplary embodiment of the present disclosure.

FIG. 18 shows a case in which a PUCCH instance is not transmitted due to an invalid symbol belonging to the PUCCH instance. Since invalid symbol(s) are included in second and third PUCCH instances, the remaining first and fourth PUCCH instances are transmitted, so that the terminal transmits only two PUCCH instances.

Meanwhile, a time window may be interpreted as being long so that a PUCCH occasion avoids invalid symbol(s) and has valid resources. That is, the nominal time window indicated to transmit the PUCCH occasion may be interpreted as being extended.

(Method A.4-8) When some symbols belonging to a PUCCH instance are regarded as invalid symbols, the PUCCH instance is not transmitted, but the PUCCH instance may be transmitted in valid symbols that can be transmitted later.

FIG. 19 shows a case in which only two PUCCH instances are transmitted within a time window indicated to the terminal because invalid symbol(s) are included in second and third PUCCH instances. According to (Method A.4-8), the terminal may interpret the nominal time window longer in consideration of invalid symbols. That is, referring to the case shown in FIG. 19, transmission of the PUCCH instance may be delayed, so that the terminal may always transmit the guaranteed number of PUCCH instances. To this end, by receiving additional DCI indicating a slot format (e.g., DCI format 2_0), the terminal may identify valid symbols and transmit a PUCCH occasion in the corresponding valid symbols. When the terminal is not configured (or indicated) to receive such the DCI, the PUCCH occasion may be transmitted only in valid symbols (i.e., semi-static DL symbols, semi-static FL symbols, symbols that are not invalid symbols due to SSB or TO-PDCCH CSS) indicated (or configured) by RRC signaling.

(5) Methods of Transmitting a Split PUCCH Instance in Some Valid Symbol(s)

A PUCCH instance may be transmitted in some symbol(s) that are not determined as invalid symbol(s), and for this, a rate matching procedure on a symbol basis may be performed. To this end, it may be preferable to distinguish a full PUCCH instance from a split PUCCH instance, and to determine a position of a DM-RS in the split PUCCH instance.

(In)valid symbol(s) in a PUCCH occasion may be indicated by RRC signaling and DCI. Alternatively, invalid symbol(s) of the PUCCH occasion may be indicated only by RRC signaling.

(Method A.5-1) When some symbol(s) belonging to a PUCCH instance are regarded as invalid symbol(s), UCI may be mapped and transmitted in symbol(s) excluding the invalid symbols of the corresponding PUCCH instance. The terminal may map UCI only to valid symbol(s). Here, the UCI may be channel-coded or spread. Accordingly, a DM-RS and UCI may be mapped to symbol(s) to which a PUCCH instance is mapped, excluding invalid symbol(s) among symbols belonging to a time window.

(Method A.5-2) A split PUCCH instance and a full PUCCH instance may have different formats. When a full PUCCH instance is not transmitted and split PUCCH instances are transmitted, the split PUCCH instances may be composed of different numbers of symbols, and the split PUCCH instance may have an arbitrary format. For example, even when the full PUCCH instance has a format 1, format 3, or format 4, the split PUCCH instance may have a format 0 or format 2. Here, the split PUCCH instance and the full PUCCH instance may be interpreted from the same PRI.

(Method A.5-3) A split PUCCH instance and a full PUCCH instance may always have the same format. If not, the split PUCCH instance may not be transmitted.

A full PUCCH instance may have a format having one or two symbols, or a format having four or more symbols. According to (Method A.5-3), for a format in which a full PUCCH instance has two symbols, a split PUCCH instance may have one symbol. For a format in which a full PUCCH instance has 4 or more symbols (e.g., PUCCH formats 1, 3, 4), a split PUCCH instance may be composed of less than 4 symbols. However, according to (Method A.5-3), if the split PUCCH instance is composed of less than 4 symbols, since the split PUCCH instance and the full instance may have different formats, the terminal may not transmit the split PUCCH instance. In addition, a specific PUCCH format (e.g., PUCCH format 1) may have two or more arbitrary symbols. In this case, according to (Method A.5-3), if one split PUCCH instance is configured, the terminal may not transmit the split PUCCH instance.

A PUCCH instance constituting a PUCCH occasion has a DM-RS. In this case, the DM-RS may be mapped on a PUCCH instance basis. A DM-RS may not be shared by a plurality of PUCCH instances. Depending on an implementation of the base station, DM-RSs belonging to a plurality of PUCCH instances may be used when estimating a channel that is associated in time, but the terminal may not assume such the processing of the base station and may allocate the DM-RS to the PUCCH instance. If a PUCCH instance is transmitted as split PUCCH instances due to invalid symbols, a DM-RS may be allocated in one split PUCCH instance.

(Method A.5-4) Assuming only valid symbols of a split PUCCH instance, a position of a DM-RS corresponding to the length of the split PUCCH instance is derived.

For a given PUCCH instance, the positions and the number of DM-RSs according to the number of symbol(s) belonging to a full PUCCH instance or a split PUCCH instance may be determined from the technical specification. For example, the technical specification may include Table 1, and the terminal may derive the positions of the DM-RSs of the PUCCH instance from Table 1 (i.e., without separate signaling).

TABLE 1

| | DM-RS position within PUCCH instance | | | |
|---|---|---|---|---|
| | No additional DM-RS | | Additional DM-RS | |
| PUCCH length | No freq hopping | Freq hopping | No freq hopping | Freq hopping |
| 4 | 1 | 0, 2 | 1 | 0, 2 |
| 5 | | 0, 3 | | 0, 3 |
| 6 | | 1, 4 | | 1, 4 |
| 7 | | 1, 4 | | 1, 4 |
| 8 | | 1, 5 | | 1, 5 |
| 9 | | 1, 6 | | 1, 6 |
| 10 | | 2, 7 | | 1, 3, 6, 8 |
| 11 | | 2, 7 | | 1, 3, 6, 9 |
| 12 | | 2, 8 | | 1, 4, 7, 10 |
| 13 | | 2, 9 | | 1, 4, 7, 11 |
| 14 | | 3, 10 | | 1, 5, 8, 12 |

In addition, according to Table 1, the position of the DM-RS of the split PUCCH instance is determined according to the number of symbol(s), and frequency hopping and/or additional DM-RS may be indicated to the terminal through higher layer signaling. In this manner, the position of the DM-RS for a given split PUCCH instance may be informed to the terminal.

There may be no limit to the number of symbols of the split PUCCH instance. Therefore, if the base station determines that the terminal moves at a high speed, or when a high-quality channel estimation is required, the base station may indicate the terminal to allocate an additional DM-RS through RRC signaling.

(Method A.5-5) A front-loaded DM-RS and additional DM-RS of a split PUCCH instance may be indicated to the terminal.

However, in order to allocate an additional DM-RS, one PUCCH instance should have a plurality of symbols. In this case, the terminal may be indicated to repeat a PUCCH instance having a small number of symbols, so that an additional DM-RS may not be allocated. That is, when transmitted as a PUCCH occasion, the maximum length of the PUCCH instance may be limited so that an additional DM-RS is not indicated.

(Method A.5-6) A DM-RS of a split PUCCH instance is configured as a front-loaded DM-RS, and a PUCCH instance may be indicated to have a predetermined length or less so that an additional DM-RS is not indicated to the terminal. According to the technical specification (or Table 1), when a PUCCH instance has a length of 10, 11, 12, 13, or 14, an additional DM-RS may be indicated. As such, according to (Method A.5-6), a split PUCCH instance may have only 9 or fewer symbols. Here, a specific number may differ depending on the technical specification. (Method A.5-7) Frequency hopping for a split PUCCH instance may or may not be indicated. Whether frequency hopping for a split PUCCH instance is performed may be indicated to the terminal through higher layer signaling or DL-DCI. When frequency hopping is not indicated, the terminal may use the same frequency resource for all PUCCH occasions. Alternatively, when frequency hopping is indicated, the terminal may use different frequency resources for the PUCCH instances. This operation may be indicated to the terminal by DL-DCI or may be indicated by RRC signaling.

(Method A.5-8) Frequency hopping may not be performed within a full PUCCH instance or a split PUCCH instance, and frequency hopping may be performed only between split PUCCH instances or between full PUCCH instances.

Meanwhile, a power applied to a PUCCH occasion may depend on the amount of UCI, bandwidth, and the number of symbols included in a PUCCH instance. Accordingly, a power allocated to a split PUCCH instance and a power allocated to a full PUCCH instance may have different values.

(Method A.5-9) A power applied to a PUCCH occasion is not derived for each split PUCCH instance, and a power calculated for a full PUCCH instance may be equally applied to split PUCCH instances.

When one full PUCCH instance is divided into two or more split PUCCH instances, a method of starting encoded UCI mapping may vary. In case of a full instance, the encoded UCI may always be mapped from a first symbol. In case of a first split instance, the encoded UCI may be mapped from a first position. However, in case of a second or subsequent split PUCCH instance, the encoded UCI may be mapped from a first position or may be mapped from an intermediate position other than the first position.

(Method A.5-10) In case of a second or subsequent split PUCCH instance, encoded UCI may always be mapped from the same position (e.g., the first position or the first index).

The terminal may always map the encoded UCI to a split PUCCH instance from a front part of the encoded UCI. In this case, if a codeword is composed of systematic bits and parity bits, the terminal has an advantage of being able to transmit the systematic bits more frequently.

Figure 20:
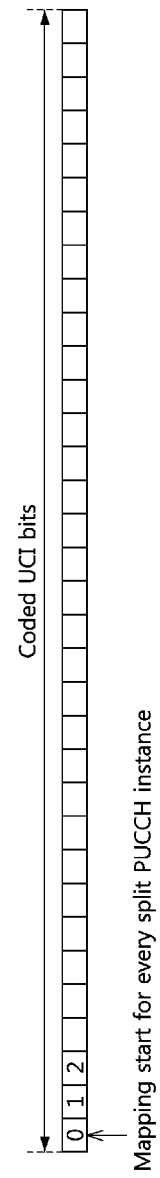
FIGS. 20 and 21 are conceptual diagrams for describing examples of a method of mapping encoded UCI to a split PUCCH instance according to an exemplary embodiment of the present disclosure.
Figure 21:
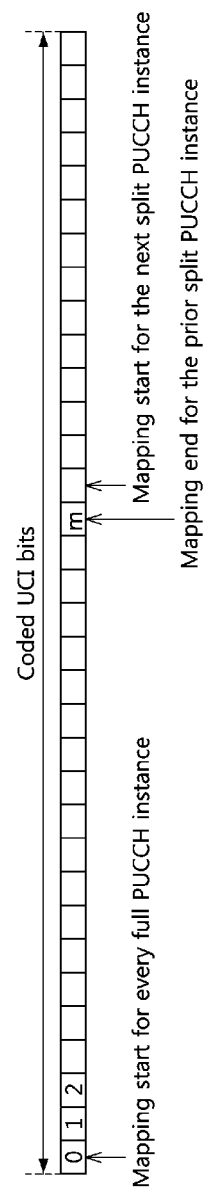

FIGS. 20 and 21 are conceptual diagrams for describing examples of a method of mapping encoded UCI to a split PUCCH instance according to an exemplary embodiment of the present disclosure.

Referring to FIG. 20, since mapping always starts at a fixed position of a split PUCCH instance, if a PUCCH occasion is transmitted only as split PUCCH instances, some bits of encoded UCI may not always be transmitted. However, since some bits that are not transmitted as described above are likely to be parity bits, the error rate achieved by the base station may not be significantly affected.

(Method A.5-11) In case of a second or subsequent split PUCCH instance, encoded UCI may be mapped from a position immediately following a position in which the encoded UCI is mapped to the immediately preceding split PUCCH instance. That is, the terminal may not transmit a codeword portion that has already been transmitted, but may transmit a codeword portion that has not been transmitted. For example, if mapping of the encoded UCI is finished at the m-th position of the split PUCCH instance, mapping of the encoded UCI may start at the (m+1)-th position of the next split PUCCH instance. In this case, since the terminal may sufficiently transmit the parity bits, the base station may utilize the parity bits for decoding.

Referring to FIG. 21, a position where the mapping of the encoded UCI starts may vary for each split PUCCH instance. In this case, a codeword may be received at the base station using multiple split PUCCH instances. Compared with (Method (A.5-10), when (Method A.5-11) is used, it may be interpreted that the base station performs soft combining for the UCI.

EXEMPLARY EMBODIMENTS

Figure 22:
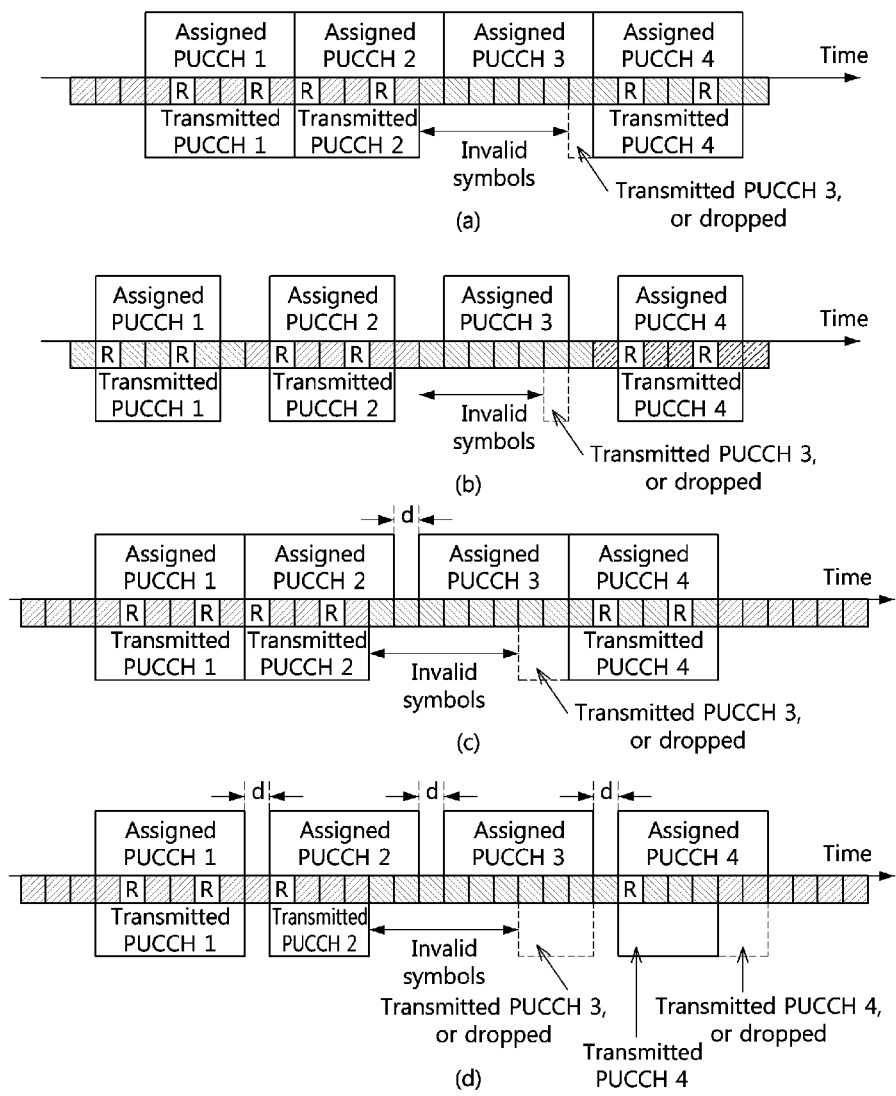
FIG. 22 is a conceptual diagram illustrating a method of considering invalid symbol(s) in PUCCH occasion transmission according to an exemplary embodiment of the present disclosure.

FIG. 22 is a conceptual diagram illustrating a method of considering invalid symbol(s) in PUCCH occasion transmission according to an exemplary embodiment of the present disclosure.

Referring to FIG. 22, a PUCCH occasion may be composed of 4 PUCCH instances, some of which may be transmitted as split PUCCH instances according to (in)valid symbol(s). Here, the PUCCH instance is shown as having 4 or more symbols, but is not limited thereto. For example, when UCI has an amount of 2 bits or less, a PUCCH instance may be transmitted as a PUCCH format 0 or format 1. In this case, the terminal may transmit split PUCCH instances while maintaining the corresponding format. In FIG. 22, each symbol may represent a TCI state of the corresponding PUCCH instance.

According to a case (a), the PUCCH instance is transmitted in consecutive symbols, and the method described in (5) may be applied to a PUCCH instance 2 and a PUCCH instance 3 due to a slot boundary and invalid symbols. Since a PUCCH instance 1 and a PUCCH instance 4 are transmitted in valid symbols, they are transmitted as full PUCCH instances, and the position of the DM-RS may be determined according to the technical specification. The PUCCH instance 2 may be composed of 5 symbols by excluding one symbol due to a slot boundary and invalid symbol(s). In the PUCCH instance 2, the DM-RS may be mapped within 5 symbols. In case of the PUCCH instance 3, only one symbol is left due to invalid symbols. Here, a split PUCCH instance may be transmitted with only one symbol. Alternatively, if a format that the one symbol has is changed, transmission of the split PUCCH instance may be dropped.

In a case (b), the PUCCH instance may be transmitted in consecutive sub-slots, and the method described in (5) may be applied to the PUCCH instance 3 due to a slot boundary and invalid symbol. Since the PUCCH instance 1, PUCCH instance 2, and PUCCH instance 4 are transmitted in valid symbols, they are transmitted as full PUCCH instances, and the position of the DM-RS may be determined according to the technical specification. In the PUCCH instance 3, only one symbol is left due to a slot boundary and invalid symbol(s). Here, the split PUCCH instance may be transmitted with only one symbol. Alternatively, if a format that the one symbol has is changed, transmission of the split PUCCH instance may be dropped.

In a case (c), a predetermined number of PUCCH instances are arranged in consecutive symbols, but a larger number of PUCCH instances may be transmitted with a predetermined interval from each other. The method described in (5) may be applied to the PUCCH instance 2 and the PUCCH instance 3 due to a slot boundary and invalid symbols. Since the PUCCH instance 1 and PUCCH instance 4 are transmitted in valid symbols, they are transmitted as full PUCCH instances, and the position of the DM-RS may also be determined according to the technical specification. The PUCCH instance 2 and PUCCH instance 4 are transmitted as split PUCCH instances due to a slot boundary and/or invalid symbols. The PUCCH instance 2 is composed of 5 symbols as one split PUCCH instance. In case of the PUCCH instance 3, a split PUCCH instance composed of two symbols may be transmitted as it is. Alternatively, if the split PUCCH instance composed of two symbols has a format different from that of the full PUCCH instance, transmission thereof may be dropped.

In a case (d), PUCCH instances are transmitted with a predetermined interval, and the method described in (5) may be applied to the PUCCH instance 2, PUCCH instance 3, and PUCCH instance 4 due to a slot boundary and invalid symbols. Since the PUCCH instance 1 is transmitted in valid symbols, it is transmitted as a full PUCCH instance, and the position of the DM-RS may also be determined according to the technical specification. The PUCCH instance 2 and PUCCH instance 4 are transmitted as split PUCCH instances due to a slot boundary and invalid symbols. The PUCCH instance consists of 4 symbols 2 as one split PUCCH instance. The PUCCH instance 4 may be composed of two split PUCCH instances each of which is composed of 4 symbols and a split PUCCH instance composed of two symbols. Here, the split PUCCH instance having two symbols may be transmitted as it is, or transmission thereof may be dropped because it has a format different from that of the full PUCCH instance. In case of the PUCCH instance 3, it may be configured as one split PUCCH instance composed of 3 symbols due to invalid symbols. The split PUCCH instance may be transmitted as it is, or transmission thereof may be dropped if it has a format different from that of the full PUCCH instance.

B. Methods of Determining a Transmission Power in UL Repetition (1) Methods of Determining a Transmission Power for SRS Resource and PUSCH In order to control a transmission power applied to an SRS resource corresponding to an SRI, the base station may estimate a path loss for each SRS resource. The base station may control transmission powers for SRS resources by using DCI. The DCI may be scheduling DCI (e.g., DCI format 0_0, 0_1, or 0_2, or DCI format 1_0, 1_1, or 1_2), and may be group-common DCI (GC-DCI) (e.g., DCI format 2_3, or DCI format 2_2). By indicating an index (TPC command) indicating a transmission power as a field value of the DCI, the terminal may increase or decrease the transmission power. In order to determine a power applied to a PUSCH, the terminal may reflect a bandwidth of the PUSCH indicated by the DCI in addition to a value obtained as a path loss and a value reflecting the DCI field value.

The terminal may receive two or more sets of transmission power parameters from the base station using higher layer signaling. Elements constituting each set are transmission power parameter(s), and each set may have transmission power parameter(s) suitable for a different scenario (e.g., URLLC or eMBB). The terminal may receive an indication of a transmission power parameter set to be applied from scheduling DCI or activation DCI allocating a PUSCH. When a transmission power parameter set varies, for example, the amount of increase or decrease in a transmission power indicated by the same TPC command may vary in the terminal.

In case of a T1 CG and T2 CG, a transmission power for an SRI associated with a PUSCH instance may be applied using a value indicated using DCI 22 (or DCI 23). In case of a T2 CG, activation DCI may indicate a set of transmit power parameters to be applied to a PUSCH occasion. Thereafter, the terminal may receive a TPC command by using GC-DCI, interpret it appropriately for the indicated set of transmission power parameters, and derive a transmission power applied to the PUSCH instance. The PUSCH may be transmitted using a pre-processing (or beam) based on the SRI configured to the terminal.

In case of a dynamically scheduled PUSCH, the terminal may derive a transmission power applied to a PUSCH instance by combining GC-DCI and scheduling DCI. The terminal may be assumed to store a TPC command for the PUSCH by using GC-DCI. In case of a dynamically scheduled PUSCH, the scheduling DCI may indicate a set of transmission power parameters and a TPC command to be applied to a PUSCH occasion. The terminal may transmit a PUSCH instance by using a pre-processing (or beam) for the SRI associated with the PUSCH instance.

(2) Methods of Interpreting a TPC in PUSCH Repetition

A PUSCH occasion may be composed of two or more PUSCH instances, and when operating according to the mTRP scenario, each PUSCH instance may be transmitted to a different TRP. In this case, a radio channel formed by the terminal and each TRP may have different characteristics.

(Method B.2-1): Different transmission powers may be applied to PUSCH instances corresponding (or mapped) to different TRPs (or TCI states or RSs).

A plurality of SRIs may be configured and activated in the terminal, and different transmission powers may be managed for the respective SRIs. According to (Method B.2-1), since an SRI may be indicated independently for a PUSCH instance, the terminal may apply a different transmission power for each SRI.

When a PUSCH occasion is indicated by one DCI (i.e., scheduling DCI or activation DCI), it is preferable that the terminal can derive transmission powers for all PUSCH instance(s) belonging to the PUSCH occasion. In addition, the terminal may receive information on transmission powers for the PUSCH occasion through group-common DCI.

(Method B.2-2): A TPC command may be independently indicated for each different TCI state (or SRI) associated (or mapped or corresponding) to a PUSCH instance by a TPC-related field in DCI, and the TPC commands may be indicated as being concatenated.

FIG. 23 is a conceptual diagram illustrating an example of a DCI field in which TPC commands are concatenated according to an exemplary embodiment of the present disclosure.

Referring to FIG. 23, a length of a field indicating a TPC in DCI may increase in proportion to the maximum number of PUSCH instances belonging to a PUSCH occasion. The DCI may include a TPC command for each PUSCH instance. From a bit string included in the field of the DCI, the terminal should interpret the TPC commands according to an order of TRPs (i.e., order of SRIs). In the conventional technical specification, a TPC command is defined as having a size of 2 bits. Accordingly, if this definition is applied as it is, the TPC field may be expressed as a bit string having a length of twice the number of TRPs.

(Method B.2-3): When applying (Method B.2-2), a TPC command for a specific TRP (i.e., each RS included in an SRI or TCI state) in a TPC field of DCI may be interpreted as being indicated to the terminal at a position preconfigured by higher layer signaling.

For example, a TPC command for a specific PUSCH instance may be included at a specific position of the field indicating TPC commands. If there are two SRIs, information on a TRP1 may be indicated (or configured) in a CORESET corresponding to CORESETpoolIndex1, and an SRI1 mapped (or associated) thereto may be indicated (or configured) to the terminal. In the same manner, information on a TRP2 may be indicated (or configured) in a CORESET corresponding to CORESETpoolIndex2, and an SRI2 mapped (or related) thereto may be indicated (or configured) to the terminal. Here, each of the SRI1 and SRI2 may indicate an SRS interpreted as a TCI state according to an indication (or configuration) of the base station. However, without being limited thereto, each of the SRI1 and SRI2 may indicate a DL RS (e.g., SSB, TRS, CSI-RS) associated (or mapped) thereto. The TCI state configured (or indicated) to the terminal may be configured with two RSs, and each RS may correspond (or map) to each TRP (or CORESETpoolIndex).

For example, if a TCI state indicated to the terminal is expressed as (SRI1, SRI2), a spatial filter indicated by the SRI1 may be applied to a PUSCH instance transmitted to the TRP1 (or CORESETpoolIndex1), and a spatial filter indicated by the SRI2 may be applied to a PUSCH instance transmitted to the TRP2 (or CORESETpoolIndex2).

Values of a TPC command 1 for the PUSCH instance associated with the SRI1 and a TPC command 2 for the PUSCH instance associated with the SRI2 may be concatenated and included in DCI. Here, the DCI may be scheduling DCI or group-common DCI including the TPC command.

By RRC signaling, the PUSCH instance to which the TPC command 1 of FIG. 23 is applied may be determined, and the PUSCH instance to which the TPC command 2 of FIG. 23 is applied may be determined.

(Method B.2-4): When applying (Method B.2-2), the terminal derives an order of TPC commands in a TPC field of DCI by using an order of TRPs (or an order of SRIs or an order of RSs included in TCI state).

For example, according to allocation of a PUSCH occasion by DCI, an order of PUSCH instances may be different from an order of TRPs (or an order of CORESETpoolIndexes or an order of SRIs). In an example, DCI may allocate such that the order of SRIs (or TCI states) applied to PUSCH instances corresponds to the order of TRPs. That is, the order of the TPC commands applied in the TPC field may follow the order of the TRPs.

When there are two TRPs, a PUSCH occasion is allocated by DCI, and an order of SRIs (or TCI states) each of which is applied to a PUSCH instance may be indicated. That is, for an SRI1 mapped to a TRP1 and an SRI2 mapped to a TRP2, according to DCI, they may be applied (or mapped) to PUSCH instances in the order of SRI1 and SR12, or in the order of SRI2 and SRI1.

The interpretation of the TPC field included in DCI distinguishes the TPC command 1 and the TPC command 2 in FIG. 23, and they are applied to the SRI1 and SIR2 (or the order of TRPs or the order of CORESETpoolIndexes), respectively. That is, in case of the order of (SRI1, SRI2), the TPC command 1 may be applied to a PUSCH instance corresponding to the SRI1, and the TPC command 2 may be applied to a PUSCH instance corresponding to the SRI2. In case of the order of (SR12, SRI1), the TPC command 1 may be applied to the PUSCH instance corresponding to the SRI2, and the TPC command 2 may be applied to the PUSCH instance corresponding to the SRI1.

According to (Method B.2-2), the size of the TPC field should increase according to the number of TRPs (i.e., the number of SRIs to be indicated). It is preferable to reduce the average size of the DCI because the DCI may also perform scheduling in which only a portion of the TRPs is allocated to be utilized. Therefore, it is preferable that the given TPC field can be used differently according to the size of the SRI field used in the PUSCH occasion (or the size of the field indicating the TCI state). In addition, it is preferable to be able to indicate TPC commands for two or more SRIs while maintaining the size of the TPC field.

(Method B.2-5): One TPC command may be indicated for a PUSCH occasion in a TPC field of DCI.

DCI may include one TPC command, and the terminal may apply this to all PUSCH instances belonging to a PUSCH occasion. For example, when a large increase/slight increase/decrease/maintenance is indicated through a TPC command in scheduling/activation DCI, the terminal may apply the same TPC command to all PUSCH instances. This scheme has a limited degree of freedom of transmission power control, but does not increase the size of the TPC field of DCI.

(Method B.2-6): The number of bits by which a part of a TPC field of DCI represents a TPC command for a PUSCH instance may be reduced in inverse proportion to the number of TRPs.

When a TPC field of DCI is given as N bits, a TPC command m (m=1, 2, . . . , M) for each of PUSCH instances associated with M SRIs may have a size of $\lceil N/M \rceil$ or $\lfloor N/M \rfloor$ bits. When transmitting a PUSCH occasion to two TRPs, TPC commands for two SRIs should be included in DCI. When the size of the TPC field is fixed to 2 bits, a TPC command for each SRI may have a size of 1 bit. This method has an advantage that the size of the TPC field required when transmitting the PUSCH occasion to one TRP and the size of the TPC field required when transmitting the PUSCH occasion to two TRPs are the same.

However, in case of one TRP and two TRPs, there is a difference in a method of interpreting the TPC field. The TPC command of the PUSCH occasion for one TRP may indicate four cases, but each of the TPC commands of the PUSCH occasion for 2 TRPs may indicate only two cases.

In an example, an MSB of the TPC field of DCI may indicate the TPC command 1 of the PUSCH occasion for the first TRP, and an LSB of the TPC field of DCI may indicate a relative offset for determining the TPC command 2 of the PUSCH occasion for the second TRP. The TPC command 2 is determined as a sum of the TPC command 1 and the relative offset. For example, assuming a case where the TPC command 1 is indicated as 'increase' or 'maintain' and the relative offset is indicated as 'increase' or 'decrease', if the TPC command 1 is indicated as 'increase', the TPC command 2 may be interpreted as a value further increased from 'increase' (i.e., 'large increase', e.g., +4 dB) or a value decreased from 'increase' (i.e., 'maintain', e.g., 0 dB). If the TPC command 1 is indicated as 'maintain', the TPC command 2 may be interpreted as a value increased from 'maintain' (i.e., 'increase', e.g., +1 dB) or a value decreased from 'maintain' (i.e., 'decrease', e.g., −1 dB).

In this case, the TPC command 1 may be composed of two types, but the TPC command 2 may be composed of four types. Therefore, it is preferable to adjust the order of the SRIs in the TCI state field so that if a transmission power for a certain SRI is to be maintained, the TPC command 2 may be used for the corresponding SRI.

(Method B.2-7): A TPC field of DCI may indicate an index indicating a combination of TPC commands.

A TPC index may indicate TPC commands applied to one or more PUSCH instances. The size of the TPC index may be derived from the maximum number of RSs constituting TCI states configured in the terminal or the maximum number of PUSCH instances that a PUSCH occasion can include.

The base station may configure combinations of TPCs to the terminal through higher layer signaling. When a maximum of M TRPs are given, values of TPC command i (i=1, 2, . . . , M) for the TRP i (or the i-th RS of RS pairs representing TCI states) may be derived from one index.

Here, the DCI may be not only scheduling/activation DCI but also GC-DCI. In case that GC-DCI is used, a predetermined position may be indicated (configured) by the base station to the terminal through additional higher layer signaling, and the terminal may identify the TPC index at the corresponding position of a payload of the GC-DCI.

FIG. 24 is a conceptual diagram illustrating an example of configuring a TPC field with a TPC index indicating a combination of TPC commands according to an exemplary embodiment of the present disclosure.

As shown in FIG. 24, a TPC field of DCI may indicate a TPC index. From the TPC index, the terminal may derive (TPC command 1, TPC command 2, . . . , TPC command M). For convenience of description, one combination of TPC commands (TPC command 1, TPC command 2, . . . , TPC command M) may be described as corresponding to one 'TPC state'.

When two TRPs are given (or when the TCI state is expressed by two or more RSs and indicated to the terminal), there may be $3^2$ (=9) cases where the TPC index for (TRP1, TRP2) (or, an ordered pair of RSs indicated by the TCI state) increases, decreases, or maintains. In this case, according to (Method B.2-7), the TPC field may express all 9 cases using 4 bits. These correspond to a smaller number than the 16 cases represented by 4 bits.

In addition, 4 bits are required even when the TPC field follows (Method B.2-2). However, if some of the TPC states are omitted, the number of TPC states to be expressed by the TPC index may be reduced to 8 or less, and thus by applying (Method B.2-7), the size of the TPC field of DCI may be reduced to 3 bits or less. For example, a TPC state for reducing both transmission powers for TRP 1 and TRP2 may not be indicated, and other TPC states may be represented by eight indices.

When three TRPs are given, there may be $3^3$ (=27) cases where the TPC index for (TRP1, TRP2, TRP3) increases, decreases, or maintains. In this case, according to (Method B.2-7), all 27 cases smaller than 32 cases expressed by the TPC field having a size of 5 bits may be expressed. On the other hand, when the TPC field follows (Method B.2-2), a 6-bit TPC field in direct proportion to the number of TRPs is required. However, if some of the TPC states are omitted, the size of the TPC field of DCI may be reduced to 4 bits or less by applying (Method B.2-7) in case of reducing the TPC states to be expressed by the TPC index to less than 16.

In an example, some of the TPC states for decreasing or maintaining transmission powers for two or more TRPs may not be indicated by the TPC index. The reason is that in order to reduce the error rate of the PUSCH occasion, a TPC index that rapidly increases the transmission powers may be required more often. In this case, 6 TPC states for decreasing the powers for 2 TRPs, 1 TPC state for decreasing the powers for 3 TRPs, 6 TPC states for maintaining the powers for 2 TRPs, and 1 TPC state for maintaining the powers for 3 TRPs may be required. Accordingly, 13 TPC states excluding 14 TPC states among $3^3$ (=27) TPC states may be expressed using TPC indexes. In order to express with 4 bits (i.e., 16 TPC indexes), 3 TPC states among the excluded TPC states may be additionally mapped to TPC indexes, or additional TPC states may be not allowed and may be left as reserved states.

(Method B.2-8): Depending on the number of TRPs used in a PUSCH occasion (or the number of RSs indicated in a TCI state or the number of SRIs), a TPC index may be interpreted differently.

The size of the TPC field of DCI may be determined by RRC signaling, and its value may be derived from the maximum number of TRPs (or the number of RSs indicated in the TCI state, the number of SRIs, or the number of PUSCH instances) of the PUSCH occasion. Since the DCI dynamically controls the TCI state (or the number of TRPs) to be applied by the terminal in the PUSCH occasion, a method of interpreting the TPC field by the terminal may vary. In order to interpret the TPC field, the terminal may refer to the TCI state, and a method of interpreting the TPC field may vary according to the TCI state.

Therefore, when the number of TRPs (or the number of RSs indicated in the TCI state, the number of SRIs, or the number of PUSCH instances) less than this is indicated, the TPC index indicated by the TPC field will be interpreted in a different meaning to the terminal.

For example, for a PUSCH occasion for which a maximum of 3 TRPs are utilized, a TPC field of DCI may have a fixed size. When DCI allocates the PUSCH occasion, one, two, or three TRPs may be used, and the number of used TRPs may be derived from the number of RSs indicated to the terminal in a TCI state, the number of SRIs, or the number of PUSCH instances. In this case, the terminal interprets the TPC field as a TPC index indicating a TPC state for a PUSCH occasion for which three TRPs are used (i.e., (Method B.2-7)), but for a PUSCH occasion for which two TRPs are used, the terminal may interpret that the TPC field includes a TPC command for each TRP, not the TPC index (i.e., (Method B.2-2). Similarly, for a PUSCH occasion for which one TRP is used, the terminal may interpret a TPC index as a TPC command.

For example, the MSB or LSB of the TPC index indicated to the terminal may be interpreted as a TPC command. The base station may configure 6 bits or less to the terminal as the size of the TPC field representing the TPC index.

In case that the size of the TPC field is 6 bits (e.g., (b6, b5, b4, b3, b2, b1)), when three TRPs are indicated to the terminal by deriving the number of TRPs from the TCI state, the TPC field may be interpreted as TPC commands for the respective TRPs. (b6, b5) may be applied to a first RS of the TCI state, (b4, b3) may be applied to a second RS thereof, and (b2, b1) may be applied to a third RS thereof, so that the PUSCH occasion may be transmitted.

When two TRPs are indicated, the MSB or LSB of the TPC field may be interpreted as TPC commands for the respective TRPs. When the MSB is applied, (b6, b5) may be applied to a first RS of the TCI state, and (b4, b3) may be applied to a second RS thereof, so that the PUSCH occasion may be transmitted. When the LSB is applied, (b4, b3) may be applied to the first RS of the TCI state, and (b2, b1) may be applied to the second RS thereof, so that the PUSCH occasion may be transmitted. Even when one TRP is indicated, the same method may be applied. Alternatively, when two or less TRPs are indicated, a TPC command for each TRP may be interpreted at a predetermined position in the TPC field. Depending on configuration of the base station, for example, (b2, b1) may be applied to a first RS of the TCI state, and (b6, b5) may be applied to a second RS thereof, so that the PUSCH occasion may be transmitted. These positions may be indicated (or configured) to the terminal by RRC signaling.

In case that the size of the TPC field is 4 bits (e.g., (b4, b3, b2, b1)), when three TRPs are indicated to the terminal by deriving the number of TRPs from the TCI state, the TPC field may be interpreted as a TPC index. By the TPC index configured (or indicated) to the terminal, a TPC command may be applied to each RS of the TCI state, and the PUSCH occasion may be transmitted. On the other hand, if two or less TRPs are indicated, since the size of the TPC field is sufficient, the TPC field may be interpreted as including TPC commands for the respective TRPs. As described above, to which TRP (or RS) each unit of 2 bits in the TPC field is mapped (or associated) may be determined according to configuration of the base station or fixed in the technical specification, so that additional indication may not be required. For example, (b4, b3) may be applied to a first RS of the TCI state, and (b2, b1) may be applied in a second RS thereof. For example, (b2, b1) may be applied to the first RS of the TCI state, and (b4, b3) may be applied to the second RS thereof. For example, if only one RS is indicated in the TCI state, the PUSCH occasion may be transmitted by applying (b4, b3) or (b2, b1).

For example, for a PUSCH occasion for which a maximum of two TRPs are utilized, the TPC field of the DCI may be indicated (or configured) to have a fixed size (e.g., through RRC signaling). The same field may be applied to a PUSCH occasion for which one or two TRPs are utilized. In this case, the terminal may interpret the field as a TPC state that can be expressed by a TPC index for a PUSCH occasion for which two TRPs are used (i.e., Method B.2-7), and the terminal may interpret that a TPC command for a PUSCH occasion for which one TRP is used is given as a part (i.e., MSB or LSB) of the TPC field.

(Method B.2-9): A state indicating transmission power(s) for TRP(s) may be expressed with a relative offset that a TPC command for at least one TRP has for another TRP.

It may not be necessary to indicate TPC commands in the same unit for all radio links that the terminal has with the TRPs. For example, for a reference TRP, a TPC command may be indicated in a detailed unit, but for another TRP, an offset from the reference TRP may be indicated, so that a TPC command for the corresponding TRP may be derived from the offset and the reference TPC command. For example, a TPC command 2 may be derived by adding a relative offset from a TPC command 1 to the TPC command 1. For example, the relative offset may not be expressed as a numerical value, but only as 'increase', 'decrease', or 'maintain'. As an example, the reference TRP may be a TRP corresponding to the first SRI of the TCI state indicated by the TCI state field of DCI.

While the TPC command 1 for the reference TRP 1 indicates one of the four cases 'large increase/slight increase/decrease/maintain', the offset for the TRP 2 may indicate one among three or less cases such as 'increase/decrease/maintain', which is a relative value with respect to the TRP 1. According to (Method B.2-9), the TPC command 2 may be obtained by adding the relative offset to the TPC command 1. The TPC command 1 and TPC command 2 should be able to be interpreted by the terminal in the same range. That is, when the TPC command 1 indicates the largest value (e.g., +4 dB), the base station may not indicate the terminal so that the TPC command 2 becomes more than +4 dB with the relative offset, or when the TPC command 2 indicates the smallest value (e.g., −1 dB), the base station may not indicate the terminal so that the TCP command 2 becomes less than −1 dB. Since these offsets are not indicated, the number of TPC states to be expressed may be reduced.

For example, for a PUSCH occasion for which two TRPs are utilized, a TPC command 1 for a TRP1 is given, and a TPC command 2 for a TRP2 may be derived from the TPC command 1 using an offset from the TPC command 1. For example, if the TPC command for the TRP 1 indicates 4 cases and the offset for the TRP2 indicates 3 cases, a total of 12 cases may be expressed. Here, excluding a case where a power for the TRP2 further increases when a power for the TRP1 increases significantly, and a case where the power for the TRP2 further decreases when the power for the TRP1 decreases (i.e., two cases), a TPC index representing one of 10 TPC states may be indicated in the TPC field of DCI.

For example, for a PUSCH occasion for which three TRPs are utilized, a TPC command 1 for a TRP1 is given, and a TPC command i (i=2, 3) for a TRPi may be given as an offset from the TPC command 1. For example, if the TPC command for TRP1 indicates 4 cases and the TPC command for the TRPi (i=2,3) indicates 3 cases, 36 TPC states may be expressed. Here, excluding cases where a transmission power for another TRP further increases when a transmission power for the TRP1 increases significantly, and cases where the transmission power for another TRP further decreases when the transmission power for the TRP1 decreases (i.e., a total of 10 cases), a TPC index representing one of 26 TPC states may be indicated in the TPC field of DCI.

(3) Methods of Interpreting a TPC in PUCCH Repetition

In (1) and (2), methods of defining a TPC state in order to transmit a PUSCH instance were described, but the same methods may be applied when repeatedly transmitting a PUCCH. That is, in group-common DCI (e.g., DCI format 2_2) or scheduling DCI/activation DCI indicating TPC command(s) of the PUCCH, the methods described in (1) and (2) may be used as they are.

C. Methods of Configuring a Pre-Processing in UL Repetition (1) Operation of a Terminal Supporting Multiple Beams The terminal may have one or more antenna panels. A method for the terminal to use multiple panels may vary. In some terminals, only one panel is activated, and a predetermined time (e.g., several ms) may be required to change/activate the panel. One or more panels are activated at the same time in some terminals, and the terminal may perform transmission/reception using the one or more panels. In some terminals, one or more panels are activated at the same time, but transmission/reception may be performed using only one panel at a time.

The base station may configure TCI state(s) to the terminal using higher layer signaling, and one TCI state among them may be used for transmission of a PUSCH or a PUSCH occasion. A TCI state index indicates one TCI state, and the base station may indicate the TCI state index to the terminal using DCI. Here, the TCI state may represent RS pairs (or pairs of antenna ports corresponding to RSs), or may represent TPMIs. Alternatively, the RS pair may correspond to the TPMI.

(Method C.1-1): A TCI state is given by an RS pair consisting of a source RS and a target RS or two or more RS pairs, and may refer to a quasi-co-location (QCL) type of an RS pair.

The TCI state may be expressed by the TCI state index, and the TCI state represents one or more combinations. Here, the combination may include at least a target RS that is a target of the TCI state, a reference RS having a QCL relation with the target RS, and a corresponding QCL. The number of combinations that can be indicated by the TCI state (i.e., the number of pairs of reference RS and target RS) may be indicated (or configured) as a maximum value to the terminal through higher layer signaling, or may be implicitly indicated to the terminal by indicating (or configuring) the TCI state through higher layer signaling.

An example in which the TCI state is expressed in a maximum of two pairs to the terminal may be shown in Table 2. An example in which the TCI state is indicated to the terminal by higher layer signaling, and M TCI states are configured is shown. The terminal may receive an indication of two or less RS pairs. According to a TCI state index 1, a PUSCH DM-RS and an SRS resource configured for beam management have a QCL relation in the first RS pair, and there is no special information for the second RS pair. Therefore, when the TCI state index 1 is indicated, the terminal applies a pre-processing applied to the SRS resource for beam management to a PUSCH when transmitting the PUSCH. According to a TCI state index 2, a PUSCH DM-RS and a CSI-RS resource have a QCL relation in the first RS pair, and the PUSCH DM-RS and an SSB have a QCL relation in the second RS pair. The terminal may derive a pre-processing to be applied when transmitting a PUSCH in combination with other information of DCI. For example, when transmitting a PUSCH using two panels, the terminal may analyze a pre-processing to be applied to each panel. For example, in case of repeatedly transmitting the PUSCH, the terminal may interpret a pre-processing to be applied in each transmission.

In Table 2, only the PUSCH DM-RS is shown, but a PUCCH DM-RS may also be applied, and the same may be applied to other QCL types other than spatial relation. In addition, in order to apply a QCL type to each of two or more RS pairs, a QCL type for each RS pair may be included in the TCI state.

When only a QCL type 1 is indicated (or configured) to the terminal, or when both the QCL type 1 and a QCL type 2 are indicated (or configured) to the terminal, the QCL type 2 may refer to a QCL type D. In this case, in the pair of (source RS, target RS) of Table 2, two source RSs may be given to correspond to the QCL type 1 and the QCL type 2, respectively, and may be interpreted by the terminal as a relation with the target RS to the terminal.

If both the TCI state and the TPMI are provided to the terminal, the terminal may determine a pre-processing for each PUSCH instance according to a mapping relationship between the RS indicated in the TCI state and the TPMI, and transmit the PUSCH instance to the base station. If two or more RS pairs are indicated by the TCI state to the terminal, two or more TPMIs may be indicated to the terminal. In this case, the terminal may determine a pre-processing for a PUSCH instance by combining the RS pair and the TPMI.

In the DCI received by the terminal, the TCI field (or SRI field) implies only transmission for one TRP, but TPMIs may be indicated. In this case, the terminal may determine pre-processing(s) to be applied to PUSCH instances in the order of the TPMIs or according to a predetermined rule, with respect to the same TCI state (or SRI).

TABLE 2

| TCI state index | (Source RS, Target RS) pair 1 | (Source RS, Target RS) pair 2 | QCL type |
|---|---|---|---|
| 1 | (SRS resource for BM, PUSCH DM-RS) | Not applicable | Spatial relation |
| 2 | (CSI-RS resource, PUSCH DM-RS) | (SSB, PUSCH DM-RS) | Spatial relation |
| ... | ... | ... | ... |
| M | ... | ... | ... |

(2) Methods of Interpreting a TCI State in PUSCH Repetition

In order to apply in the mTRP scenario, it may be preferable in terms of obtaining a multiplexing gain to apply a different TCI state to each PUSCH instance while allocating a PUSCH occasion by one DCI. When operating in the frequency range 2 (FR2), a beam suitable for one TRP may be formed through a pre-processing applied to a panel by the terminal. That is, when the terminal has a plurality of panels, it may be preferable to indicate a TCI state differently for each panel. In addition, in the PUSCH repetition type A or/and the PUSCH repetition type B, a TCI state may be indicated differently according to a PUSCH instance. For convenience of description, the number of PUSCH instances included in a time domain resource allocation (TDRA) of DCI (i.e., the number of SLIVs or the number of Ls) or the number of split PUSCH instances generated at a slot boundary or a boundary of invalid symbols may be referred to as K, and the number of PUSCH instances indicated by the TCI state index of the DCI may be referred to as M.

The DCI may indicate a TCI state composed of two or more RS pairs to the terminal. In this case, the terminal may transmit the m-th PUSCH instance by using the m-th RS pair (m=1, 2, ..., M) and/or the TPMI mapped to (or associated with) it. For convenience of description, a QCL relation derived from each RS pair constituting the TCI state and a pre-processing (or TPMI) applied to the PUSCH instance may also be referred to as a TCI state.

(Method C.2-1): A transmission power applied to a PUSCH instance may be determined by applying the above-described methods.

(Method C.2-2): Time resources applied to PUSCH instances may correspond to m SLIVs indicated by a TDRA of DCI, respectively.

(Method C.2-3): When K is not greater than M (K≤M), pre-processings applied to PUSCH instances may respectively correspond to TCI states indicated in a TCI state field of DCI in an order.

If K=M, the SLIVs of the TDRA and the TCI states of the TCI state field may be interpreted as having one-to-one correspondence. If K<M, the SLIVs of the TDRA correspond to the TCI states of the TCI state filed, and some TCIs do not correspond to SLIVs, but the terminal may determine an SLIV and TCI state that a PUSCH instance has. This is because the number of PUSCH instances constituting the PUSCH occasion may be assumed to be K.

However, if of K>M, a method of determining an SLIV corresponding to a TCI state indicated by the TCI state field is required. Such allocation of a PUSCH occasion may occur frequently. This is because in the mTRP scenario, a small number (e.g., two) of TRPs are usually deployed, and in the URLLC scenario, a PUSCH is repeatedly transmitted 8 or 16 times.

(Method C.2-4): If K is greater than M (K>M), TCI states indicated by a TCI state field of DCI may be cyclically extended into K TCI states, and pre-processings applied to PUSCH instances may correspond to the cyclically-extended TCI states, respectively.

That is, the M TCI states are cyclically extended, so that (K−M) TCI states may be further generated. For example, when a TCI state 1, TCI state 2, ..., and TCI state M are given by the TCI state field, TCI states corresponding to a TCI state (M+1), ..., and TCI state K may be given as the TCI state 1, TCI state 2, ..., and TCI state (K−M), respectively.

(Method C.2-5): When K is greater than M (K>M), TCI states indicated by a TCI state field of DCI may be repeatedly extended into K TCI states, and pre-processings applied to PUSCH instances may correspond to the cyclically-extended TCI states, respectively.

That is, the M TCI states are repeated extended, so that (K−M) TCI states may be further generated. For example, when a TCI state 1, TCI state 2, ..., and TCI state M are given in the TCI state field, one TCI state may be repeated $\lfloor K/M \rfloor$ or $\lceil K/M \rceil$ times. A TCI state m may be repeated $\lfloor K/M \rfloor$ times (or $\lceil K/M \rceil$ times) (m=1, 2, ..., M−1), and the TCI state M may be repeated $K-(M-1) \cdot \lfloor K/M \rfloor$ times (or, $K-(M-1) \cdot \lceil K/M \rceil$ times).

(Method C.2-6): When K is greater than M (K>M), or for all combinations of K and M, a scheme in which pre-processings applied to PUSCH instances correspond to the TCI states indicated by a TCI state field of DCI may be indicated (or configured) by higher layer signaling, so that one of (Method C.2-4) and (Method C.2-5) may be indicated.

When a predetermined time is required for the terminal to change the TCI state, (Method C.2-4) consumes a large time because the TCI state is changed for each PUSCH instance, but (Method C.2-5) consumes a smaller time because the TCI state may be changed for a plurality of PUSCH instances. In (Method C.2-6), the base station may select such a scheme and indicate it to the terminal through higher layer signaling.

When a plurality of pre-processings (e.g., TCI states, SRIs, or TPMIs) are indicated to the terminal, all TAs of PUSCH instances may have different values. In this case, the PUSCH instances may be arranged in the order in which the TA is longer. The reason is that when a PUSCH instance with a shorter TA is arranged earlier, a problem may occur in which a part of a last symbol of a preceding PUSCH instance overlaps in time with a part of a first symbol of a following PUSCH instance in some PUSCH instances. Accordingly, an order of the pre-processings may be determined by the length of the TA(s) regardless of an order of the pre-processings to be applied to the PUSCH occasion.

(Method C.2-7): An order of pre-processing(s) may be determined by the length(s) of TA(s) regardless of an order of the pre-processing(s) to be applied to a PUSCH occasion.

(3) Methods of Interpreting a TCI State in PUCCH Repetition

In (1) and (2), the methods of defining TCI states in order to transmit PUSCH instances were described, but the same methods may be applied even when repeatedly transmitting a PUCCH. That is, when RRC information elements for configuring PUCCH resources include an RS pair together with a QCL type as a spatial relation, TCI state(s) (or SRI) or pre-processing(s) may be applied in an order when repeatedly transmitting the PUCCH. Here, when the number of antenna ports used by the PUCCH is 1, the pre-processing may be derived only by the TCI state without TPMI.

When a plurality of TCI states, pre-processings, or SRIs are indicated to the terminal, TAs of PUCCH instances may all have different values. In this case, the PUCCH instances may be arranged in the order in which the TA is longer. The reason is that when a PUSCH instance with a shorter TA is arranged earlier, a problem may occur in which a part of the last symbol of a preceding PUSCH instance overlaps in time with a part of a first symbol of a following PUSCH instance in some PUSCH instances. Accordingly, an order of the preprocessing(s) may be determined by the length of the TA(s) regardless of an order of the preprocessing(s) to be applied to the PUSCH occasion.

(Method C.3-1): An order of pre-processing(s) may be determined by the length(s) of TA(s) regardless of an order of pre-processings to be applied to a PUCCH occasion.

(4) Methods of Changing a TCI State in PUCCH Repetition

The terminal may be configured with pre-processings (i.e., spatial relation information) applied to a PUCCH through higher layer signaling, and when some of them are activated, the terminal may apply the activated pre-processings. The terminal may receive an indication of an RS or SS/PBCH block applied to the pre-processing as a part of resource configuration of the PUCCH.

FIGS. 25 to 29 are conceptual diagrams illustrating configuration examples of a MAC CE for changing spatial relation information applied to a PUCCH according to an exemplary embodiment of the present disclosure.

FIG. 25 shows an example of a MAC CE for a case in which the base station indicates one TCI state, pre-processing, or SRI to the terminal. The corresponding MAC CE may include information on a serving cell (i.e., serving cell ID) and information on a BWP (i.e., BWP ID) in which a PUCCH resource is defined, and may include pre-processing information. The terminal may receive a PDSCH including the MAC CE shown in FIG. 25 and transmit a HARQ-ACK therefor to the base station. The changed pre-processing of a PUCCH may be applied after a predetermined time. In FIG. 25, 'R' denotes a bit on which information is not carried (or a bit with a fixed value), and a spatial relation info ID denotes an index or an identifier required to determine a pre-processing.

When the PUCCH transmitted by the terminal is received by two or more TRPs, two or more TCI states may be indicated by the MAC CE for changing the pre-processing of the PUCCH. For convenience of description, two pre-processings are considered, but may be easily extended to a larger number of pre-processings. Methods for this will be described below.

(Method C.4-1): Among two pre-processings of a PUCCH resource given by a MAC CE, the first pre-processing may be changed, or both the first pre-processing and the second pre-processing may be changed.

The base station may change the first pre-processing of the PUCCH resource, and may also change the second pre-processing if necessary. The MAC CE used in this case (e.g., MAC CE of FIG. 26) may have a form in which the last octet is additionally added to the MAC CE of FIG. 25. The MAC CE of FIG. 26 may not use $C_0$, which will be described later. Here, the positions of reserved bits R and the position of spatial relation information may be changed.

Meanwhile, the value of $C_0$ may indicate the pre-processing(s) to be changed. For example, if $C_0$ has one value, the proposed MAC CE indicates to change only the first pre-processing, but if $C_0$ has another value, the MAC CE may indicate to change both pre-processings. The size of the MAC CE for changing only one pre-processing (i.e., MAC CE of FIG. 25) may be changed by $C_0$. For example, since the MAC CE shown in FIG. 27 includes the MAC CE of FIG. 25, the size of the MAC CE may be conditionally extended so that the second pre-processing can be changed. Accordingly, the MAC CE may have two sizes according to the value of $C_0$.

In case that the base station wants to change only one of the two pre-processings, if (Method C.4-1) is applied, inefficiency occurs when only the second pre-processing is changed. This is because the MAC CE of FIG. 27 includes both information on the first pre-processing and information on the second pre-processing. To solve this, an MAC CE for changing only the second pre-processing of the PUCCH resource may be required.

(Method C.4-2): Using one bit (Ci) of a MAC CE, only one of two pre-processings of a given PUCCH resource may be changed.

A MAC CE shown in FIG. 28 includes a new bit Ci. If Ci has one value, the first preprocessing of the PUCCH resource may be changed, and if Ci has another value, the second pre-processing of the PUCCH resource may be changed. If only one pre-processing is required for the PUCCH resource, the terminal may regard that the corresponding bit has a fixed value (e.g., R). On the other hand, in order to change all pre-processings of the PUCCH resource, the base station may allocate a new octet in the MAC CE and indicate each pre-processing in each Octet.

In order to change only one pre-processing or all pre-processing by the base station, an MAC CE should be able to express three cases.

Referring to FIG. 29, since the case of changing only one pre-processing should be expressed, information representing the three cases should be included in an octet x+2 or octet x+3 of the MAC CE. In order to secure backward compatibility, it is preferable that the additionally used bit is a bit (R) that has not been used before.

(Method C.4-3): One bit (k) of an MAC CE may express which pre-processing a pre-processing for a PUCCH resource is, and another bit ($C_0$) may express the number of pre-processing(s) to be changed.

In the proposed MAC CE, two additional bits may be used. In a certain octet, in addition to the value for changing the pre-processing, k may express which preprocessing is to be changed. If two pre-processings are to be changed, in a subsequent octet, $C_0$ may express that the remaining pre-processing is to be changed. Therefore, according to (Method C.4-3), the size of the MAC CE may be variable, and thus the size of the MAC CE may be simplified even when only the second pre-processing of the PUCCH resource is changed.

When $C_0$ has one value, the MAC CE indicates that one pre-processing indicated by k is to be changed, and when $C_0$ has another value, the MAC CE indicates that all pre-processings are to be changed. When only one pre-processing is to be changed, k having a specific value may indicate that the first pre-processing is to be changed, and k having another value may indicate that the second pre-processing is to be changed. If both pre-processings are to be changed, the value of k may be meaningless. Since the MAC CE includes information on both pre-processings, the octet x+2 may include the first pre-processing, and the octet x+3 may include the second pre-processing. An example of this is shown in Table 3. According to Table 3, the MAC CE may express three cases excluding the case of not changing the pre-processing by using two bits.

TABLE 3

| k | $C_0$ | Meaning |
| --- | --- | --- |
| 0 | 0 | First pre-processing is to be changed |
| 1 | 0 | Second pre-processing is to be changed |
| 0 | 1 | All pre-processings are to be changed |

D. Methods for Determining RV in UL-Repetition (1) Methods of Determining an RV for a Single TRP When scheduling DCI, activation DCI, or RRC signaling indicates resources of a PUSCH occasion, a redundancy version (RV) of a first transmitted PUSCH instance may be indicated. RVs may be mapped to subsequent PUSCH instances or split PUSCH instances in an order determined according to a predetermined rule defined in the technical specification.

In this case, one of a plurality of orders may be indicated. For example, the technical specification may define at least orders cyclically-extended from (0,2,3,1), (0,0,0,0), or (0,3,0,3). The base station may indicate the terminal to use one of these orders of RVs through higher layer signaling. Alternatively, when one order is fixedly used, additional signaling for the terminal may not be required. For example, in the technical specification, the order obtained by cyclically extending (0,2,3,1) may be specified to be used in a fixed manner.

One RV may be assigned to each of a plurality of (split) PUSCH instances constituting a PUSCH occasion. The terminal may map encoded bits by applying a new RV to each (split) PUSCH instance.

(2) Methods of Determining RVs in mTRP Scenario

In the mTRP scenario, a case in which SRIs are assigned to PUSCH instance(s) may be further considered. When one TCI state is indicated to the terminal, the terminal may derive pre-processing scheme(s) to be applied to the PUSCH instance(s) from the indicated TCI state.

Since an implementation of the base station may combine PUSCH instances received from multiple TRPs, it may be preferable that the terminal does not distinguish between transmission for a single TRP and transmission for mTRP without additional specification. However, it may be preferable to determine a method of applying a TCI state cycling and an RV cycling to (split) PUSCH instances (e.g., application priority).

(Method D.2-1): The terminal may apply an RV to a (split) PUSCH instance regardless of a TCI state of the PUSCH instance.

Accordingly, when scheduling DCI, activation DCI, or RRC signaling indicates resources of a PUSCH occasion, an RV of a first transmitted PUSCH instance may be indicated. RVs may be sequentially mapped to subsequent (split) PUSCH instances in an order determined by a predetermined rule defined in the technical standard.

When scheduling DCI, activation DCI, or RRC signaling indicates resources of a PUSCH occasion, an RV of a first transmitted PUSCH instance may be indicated. RVs may be sequentially mapped to subsequent PUSCH instances or (split) PUSCH instances in an order determined by a predetermined rule defined in the technical standard.

In a system operating in the FR2, when the base station combines PUSCH instances received from multiple TRPs, it may be easy for implementation that pre-processings of the terminal are aligned with a specific TRP. In this case, it may be preferable to assign a new RV for a TRP (or SRI). Accordingly, the terminal may have to distinguish between transmission for a single TRP and transmission for mTRP. This is because when the TRP is changed, it may be preferable in terms of the combining by the base station that the RV has a new value so that systematic bits are received.

(Method D.2-2): The terminal may apply an order of RVs to (split) PUSCH instance(s) belonging to the same TCI state, respectively.

Scheduling DCI, activation DCI, or RRC signaling for allocating a PUSCH occasion may indicate two or more TCI states to the terminal. In this case, a pre-processing may be changed for each PUSCH instance, and after the same pre-processing is applied to two or more consecutive PUSCH instances(s), the same pre-processing may be applied to consecutive PUSCH instances(s) after a time interval.

Figure 30:
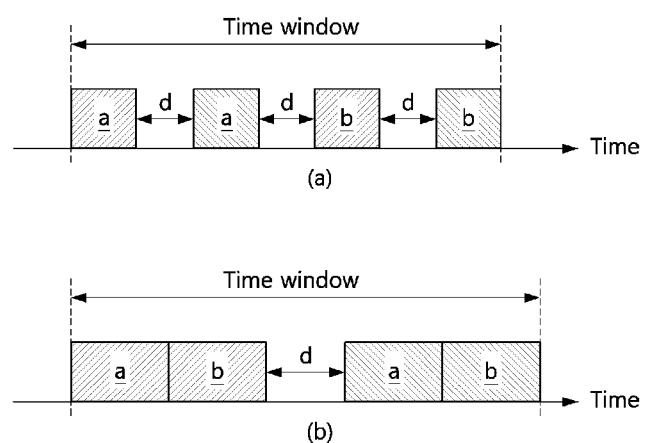
FIG. 30 is a conceptual diagram illustrating a mapping relationship between PUSCH instances and RVs according to an exemplary embodiment of the present disclosure.

FIG. 30 is a conceptual diagram illustrating a mapping relationship between PUSCH instances and RVs according to an exemplary embodiment of the present disclosure.

According to (Method D.2-2), the same RV order is used for PUSCH instances corresponding to the same TCI state. Referring to FIG. 30, RVs may follow an order of (a, b). Here, (a, b) may be given as (0, 2), (0, 0), or (0, 3).

The base station may indicate (or configure) the terminal to map a different RV to each first (split) PUSCH instance of the TCI state. This may be expressed as an RV offset. When this is applied, the terminal may derive another RV order by applying the RV offset to an RV order serving as a reference. For example, with respect to an RV order defined as (0, 2, 0, 2, . . . ), if an RV offset +2 is applied, a different RV order interpreted as (2, 0, 2, 0, . . . ) may be derived. As another example, with respect to an RV order defined as (0, 2, 3, 1, 0, 2, 3, 1, . . . ), if an RV offset is applied, a different RV order may be derived. The RV offset may be indicated (or configured) to terminal through RRC signaling. Alternatively, the RV offset may be indicated to the terminal through scheduling/activation DCI.

For example, while DCI allocates a PUSCH occasion, some bits of an RV field may be interpreted as an RV offset. For example, when a 3-bit RV field is given by DCI, 2 bits of the 3 bits may represent a first value of a reference RV order, and the remaining 1 bit may represent the RV offset to represent a different RV order.

For example, as in the case of FIG. 30, the RV order (a, b) may be equally applied to all TCI states, but according to another example, a different RV order may be applied for each TCI state. That is, RVs are mapped in the order of (a, b) to a first (split) PUSCH instance to which one TCI state (or SRI) is applied, but RVs may be mapped in the order of (b, a) to a first (split) PUSCH instance to which another TCI state (or SRI) is applied.

The terminal may derive a TCI state and a time resource applied to a PUSCH instance from DCI or RRC signaling allocating a PUSCH occasion. The terminal may apply (Method D.2-1) or (Method D.2-2) to a (split) PUSCH instance.

Figure 31:
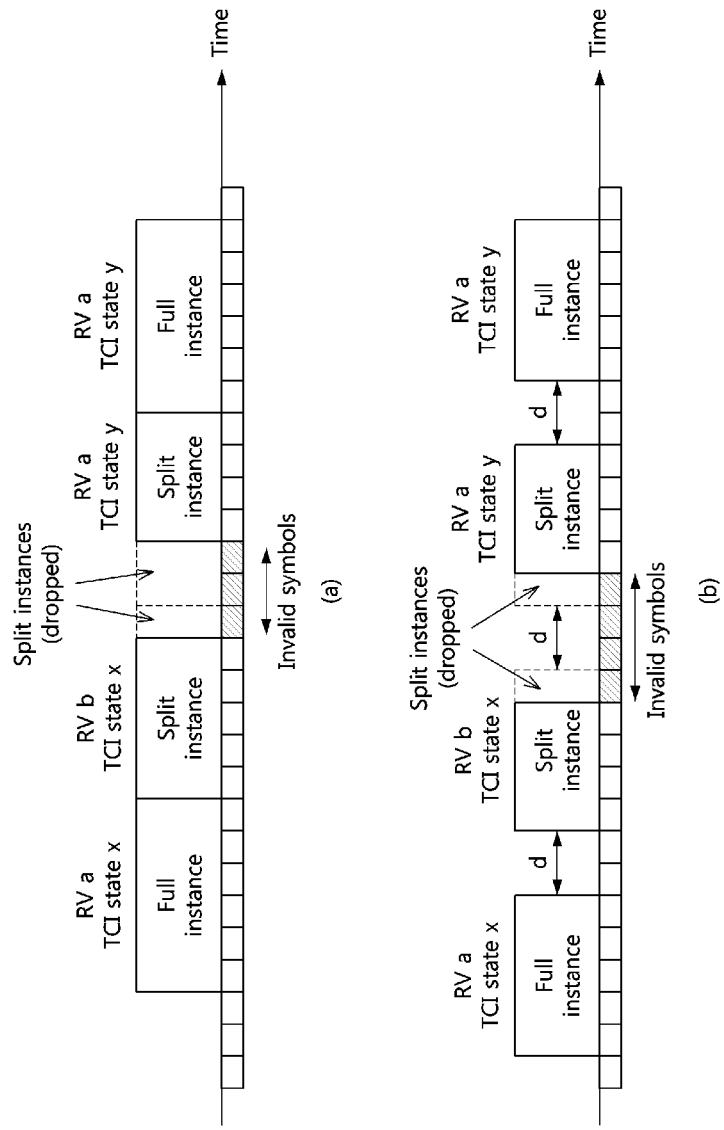
FIG. 31 is a conceptual diagram illustrating a mapping relationship between PUSCH instances and RVs when RV cycling is performed prior to TCI state cycling according to an exemplary embodiment of the present disclosure.

FIG. 31 is a conceptual diagram illustrating a mapping relationship between PUSCH instances and RVs when RV cycling is performed prior to TCI state cycling according to an exemplary embodiment of the present disclosure.

FIG. 31 shows an example in which when RV cycling is performed prior to TCI state cycling, (in)valid symbol(s) are determined as invalid symbol(s), and thus RVs and TCI states are mapped while a full PUSCH instance is changed to split PUSCH instances.

Referring to FIG. 31, a PUSCH occasion is composed of 4 PUSCH instances. A case (a) is a case in which the PUSCH instances are consecutively mapped, and a case (b) is a case in which the PUSCH instances are mapped at predetermined intervals. When split PUSCH instances occur due to invalid symbol(s), RVs may also be changed for the split PUSCH instances. Each TCI state is composed of two PUSCH instances, and an order of RVs is applied for each of the same TCI state. Therefore, an RV a and RV b are sequentially applied to a TCI state x, and the RV a and RV b are sequentially applied to a TCI state y.

E. UCI Transmission Methods (1) Repetitive UCI Transmission

Repetitive HARQ-ACK transmission may be indicated (or configured) to the terminal through higher layer signaling for each PUCCH format. The number of repetitions for a PUCCH format i (i=1, 3, 4) may be independently given to the terminal. When the terminal repeatedly transmits a PUCCH, the PUCCH may be repeatedly transmitted using the same time resource for each slot.

The UCI type may be classified into at least SR, L1-RSRP, HARQ-ACK, and CSI. When UCI is repeatedly transmitted, only one UCI type may be transmitted. To this end, the priority between UCI types may be defined in the technical specification. The priorities of the UCI types may be HARQ-ACK, SR, and CSI in an order of higher priorities. The CSI may be further subclassified according to a priority of a CSI report.

In addition, if one UCI is selected and is repeatedly transmitted as being included in a PUCCH, it may be assumed that the terminal does not transmit another UCI until transmission of the selected UCI is completed. To this end, in order to indicate the terminal to transmit an SR or HARQ-ACK, the base station should indicate the terminal to transmit the corresponding UCI after transmission of the PUCCH is completed. Since it may take a lot of time to wait for this, in some cases, this may act as a constraint on scheduling of the base station.

Among the UCI types, for example, when HARQ-ACKs are indicated to be transmitted in the same (sub-)slot, or when time resources of PUCCHs indicated by DCI/RRC signaling allocating a PDSCH overlap each other, a HARQ codebook may be generated to be transmitted on one PUCCH. For the generation of the HARQ codebook, the terminal may generate information bits by arranging HARQ-ACK bits as a bit string according to a predetermined order specified in the technical specification, and form encoded bits through an encoding process.

Here, as the encoding, Reed Muller code or polar code may be used. A code rate applied in the encoding process may be indicated to the terminal through higher layer signaling. For example, in a given PUCCH format, one value may be indicated to the terminal as the code rate.

According to the technical specification, one codeword is mapped to one PUCCH. If a PUCCH is repeatedly transmitted, only one UCI type is generated as a codeword. If a PUCCH is transmitted only once, one or two or more UCI type(s) are concatenated as information bits, and one codeword may be generated through the same encoding process. However, since soft combining for a Reed Muller code or a polar code is difficult to implement, the same codeword may be transmitted even when a PUCCH is repeatedly transmitted, and the base station may perform the Chase combining on the same codewords. Here, the encoded bits or codeword may refer to a bit string expressed by concatenating a plurality of code blocks. The codeword may be mapped to REs through a modulation procedure.

Meanwhile, a plurality of UCIs of the same UCI type may be mapped as being regarded as different information. For example, UCIs may be generated to support traffic having different priorities. An SR or HARQ-ACK supporting eMBB traffic and an SR or HARQ-ACK supporting URLLC traffic may be regarded as separate information. In this case, the UCIs of the same UCI type may be distinguished from each other.

Figure 32:
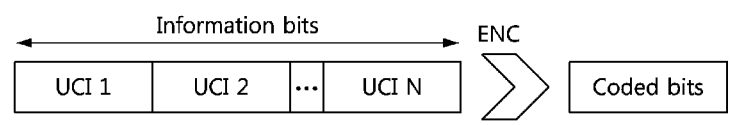
FIG. 32 is a conceptual diagram illustrating a concept in which UCIs are encoded as being concatenated according to an exemplary embodiment of the present invention.

FIG. 32 is a conceptual diagram illustrating a concept in which UCIs are encoded as being concatenated according to an exemplary embodiment of the present invention.

Referring to FIG. 32, N (≥1) UCI types or UCIs having different priorities of the same UCI type may be concatenated and encoded.

The encoded UCI is mapped to a PUCCH. When the PUCCH is transmitted, the same pre-processing (or spatial information or spatial relation) may be maintained. Alternatively, when the PUCCH is transmitted, a different pre-processing may be applied to each transmitted PUCCH according to RRC signaling of the base station.

(2) When Two or More Codewords are Multiplexed in One Uplink Channel

In order to solve the constraint on scheduling in the base station, it is preferable that different UCI types may be multiplexed or different encodings of the same UCI type may be multiplexed in repeatedly transmitted PUCCHs.

(Method E.2-1): Two or more codewords having different code rates or coding schemes may be multiplexed in one uplink channel.

When the terminal transmits a PUCCH or PUSCH, two or more codewords may be mapped to the PUCCH or PUSCH. For example, while transmitting a PUSCH, UCI and TB may be transmitted as being multiplexed. Here, the UCI may be configured as one or more UCI type(s) or UCIs having the same UCI type but different priorities (e.g., referred to as UCI types/UCI priorities for convenience). The UCIs that are distinguished from each other may have different code rates, and codewords may be generated using Reed Muller codes or polar codes. Here, in case of a TB, a codeword may be generated using an LDPC code. The generated codewords may be modulated and mapped to a PUSCH. For example, while transmitting a PUCCH, UCIs configured with one or more UCI types/UCI priorities may be transmitted. Information having different UCI types/UCI priorities may be concatenated, encoded through the same encoding process, and then modulated to generate one codeword.

In (Method E.2-1), (Method E.2-2) or (Method E.2-3) described below may be applied alone or in combination.

(Method E.2-2): In (Method E.2-1), a codeword may be defined for each UCI type/UCI priority.

The terminal may derive a different codeword for each UCI type/UCI priority in an uplink channel to be transmitted. Available code rate(s) for UCI type/UCI priority may be indicated by higher layer signaling or DCI. According to (Method E.2-2), a different code rate may be indicated according to a quality required for each UCI type/UCI priority.

Figure 33:
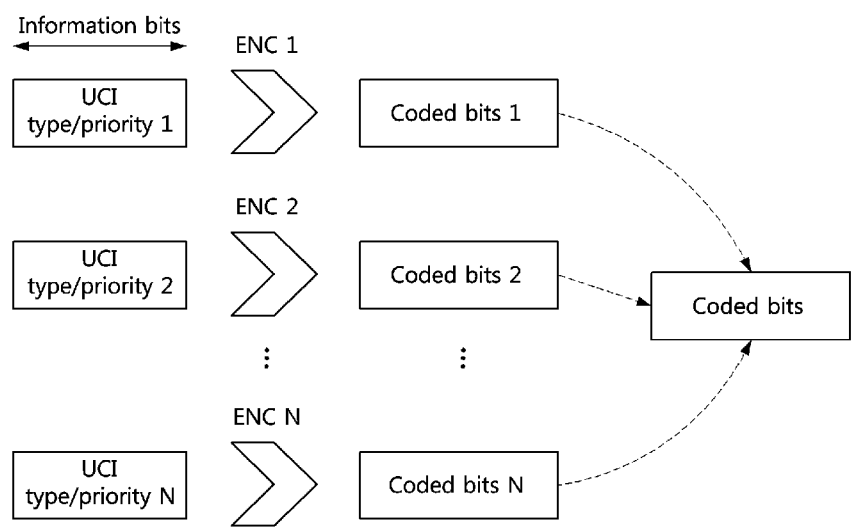
FIGS. 33 and 34 are conceptual diagrams for describing cases in which a different code rate is applied for each UCI type/UCI priority according to an exemplary embodiment of the present disclosure.
Figure 34:
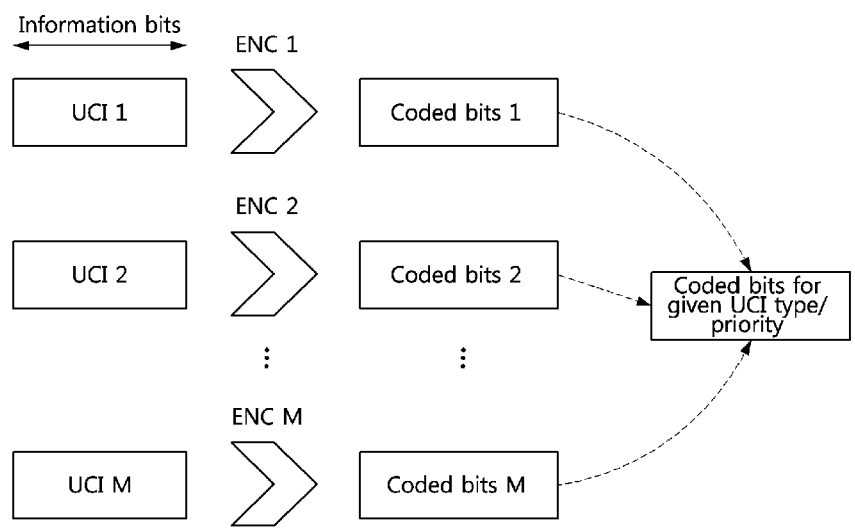

FIGS. 33 and 34 are conceptual diagrams for describing cases in which a different code rate is applied for each UCI type/UCI priority according to an exemplary embodiment of the present disclosure.

That is, FIG. 33 shows an example according to (Method E.2-2). Since different UCI types/UCI priorities are used differently, code rates applied to different UCI types/UCI priorities may be different from each other. For example, a code rate applied to a HARQ-ACK is related to transmission of a PDSCH, but a code rate applied to an SR is related to transmission of a PUSCH.

Even when error rates required by UCI types/UCI priorities are different, if the same code rate is applied, the base station may have to apply a code rate for a UCI type/UCI priority that requires the lowest error rate (i.e., the highest quality). In this case, the uplink channel should use more REs, and the uplink channel should be mapped to a wider bandwidth or more symbols.

(Method E.2-3): In (Method E.2-1), a codeword may be defined from different pieces of information having the same UCI type/UCI priority.

Differently encoded bits may be derived for the same UCI type/UCI priority, and a codeword may be generated by concatenating them. A plurality of pieces of information having the same UCI type/UCI priority may also require different qualities.

When the UCI type/UCI priority is HARQ-ACK, the terminal may transmit a HARQ codebook 1 and a HARQ codebook 2 to the base station. Here, the HARQ codebook may be a bit string composed of HARQ-ACK bits, and the bit string may be generated by arranging the HARQ-ACK bits in a predetermined order.

FIG. 34 shows an example according to (Method E.2-3). Even in case of the same UCI type/UCI priority, encoding procedures with different code rates may be performed.

For example, the HARQ codebook 1 may be derived from HARQ-ACKs for eMBB PDSCHs, and the HARQ codebook 2 may be derived from HARQ-ACKs for URLLC PDSCHs. In this case, the HARQ codebook 1 and the HARQ codebook 2 may request different error rates.

For example, the HARQ codebook 1 has been transmitted to the base station, and the HARQ codebook 2 may not have been transmitted to the base station yet. In this case, the base station may receive a PUCCH (or PUSCH) including both the HARQ codebook 1 and the HARQ codebook 2, and combine (e.g., chase-combining or combining) the already-received HARQ codebook 1 and the HARQ codebook 1 to be soon received, and thus errors can be corrected even at a code rate higher than that of the HARQ codebook 2. Here, both the HARQ codebook 1 and the HARQ codebook 2 may be derived from either eMBB PDSCHs or URLLC PDSCHs.

For example, the HARQ codebook 1 may be transmitted to a base station 1 or a TRP 1, and the HARQ codebook 2 may be transmitted to a base station 2 or a TRP 2. Although received through the same uplink channel (i.e., PUSCH or PUCCH), since the HARQ codebook 1 and the HARQ codebook 2 may have different code rates, a sufficiently low error rate may be achieved even when the base stations or TRPs are different from each other.

The encoded bits may be concatenated into one codeword. The codeword may undergo a modulation process. In this case, according to a modulation scheme, adjacent encoded bits may be mapped to one modulation symbol. For example, when modulated in a QPSK scheme, two adjacent encoded bits may be mapped to one modulation symbol. In this case, a situation in which encoded bits that have undergone different encoding processes are mapped to the same modulation symbol may be considered. The base station may demodulate and decode one modulation symbol. In this case, demodulation and decoding may be implemented separately or may be implemented in an integrated manner.

In one implementation, when demodulation and decoding are implemented in separate steps, the base station may perform a hard decision in demodulation of the PUCCH and perform decoding using a result of the hard decision result. In another implementation, when demodulation and decoding are implemented in the integrated manner, the demodulation and decoding of the PUCCH may be implemented in the same step. In this case, the base station may perform a soft decision in demodulation of the PUCCH and perform decoding using a result of the soft decision.

(Method E.2-4): UCIs to which different coding schemes are applied may be mapped only to different modulation symbols.

The terminal may concatenate known bit(s) (e.g., 0 or 1) to the encoded bits to match the length of the encoded bits to a multiple of the number of encoded bits required for one modulation symbol. The number of encoded bits required for one modulation symbol may vary according to a modulation order. For example, since a QPSK symbol requires two encoded bits, a known bit may be additionally concatenated to the encoded bits. For example, since one π/2-BPSK or BPSK symbol requires one encoded bit, there is no need for such additional bit to be concatenated with the encoded bit.

Figure 35:
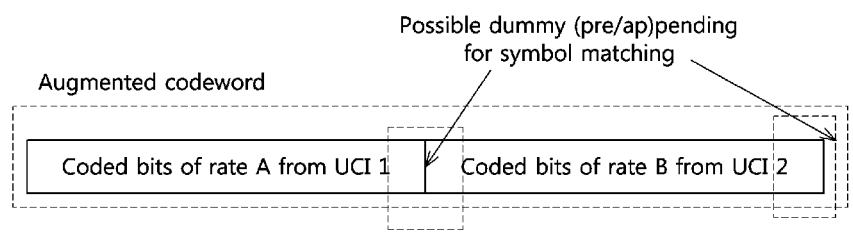
FIG. 35 is a conceptual diagram illustrating a case in which different coding schemes are applied to different UCI types/UCI priorities or two parts of UCI according to an exemplary embodiment of the present disclosure.

FIG. 35 is a conceptual diagram illustrating a case in which different coding schemes are applied to different UCI types/UCI priorities or two parts of UCI according to an exemplary embodiment of the present disclosure.

Referring to FIG. 35, code rates applied to different UCI types/UCI priorities or two parts of UCI may be different from each other, and known bit(s) may be concatenated to each encoded bits, thereby being aligned with a boundary of a modulation symbol.

Meanwhile, only the same modulation order may be applied to different UCI type/UCI priorities. In this case, encoded bits of different UCI types/UCI priorities may be multiplexed in one modulation symbol.

(Method E.2-5): UCIs to which different encodings are applied may be mapped to the same modulation symbol.

For example, encoded bits of UCI 1 and encoded bits of UCI 2 may be concatenated into one QPSK symbol. When a hard decision is performed in a demodulation process, the base station may apply (Method E.2-5). When a soft decision is performed in a demodulation process, since the encoded bits of UCI 1 and the encoded bits of UCI 2 may affect each other, (Method E.2-5) may increase complexity. In addition, even when (Method E.2-5) is used, in order to map the encoded bits concatenated with each other to a modulation symbol, known bits may be concatenated.

(3) Methods of Indicating a HARQ Codebook to be Transmitted on a PUCCH

PDSCHs indicated to the terminal may be divided into two or more PDSCH groups. A PDSCH group may be indicated by scheduling DCI, and may include PDSCHs that are candidates for the same HARQ codebook. HARQ-ACKs belonging to the same HARQ codebook may be transmitted on the same PUCCH. The base station may indicate to the terminal a PDSCH group to which a PDSCH belongs and a PUCCH resource for the corresponding PDSCH by using scheduling DCI. The number of repeated PUCCH transmissions for each PUCCH format may be indicated to the terminal through scheduling DCI or RRC signaling. In this case, in a time resource in which a repetition 1 of the PUCCH and a repetition 2 of the PUCCH overlap each other, one or more HARQ codebook(s) may be encoded as being concatenated. Here, when the PUCCH is repeatedly transmitted, a time interval between PUCCH instances may be given as 0 or more symbol(s), slot(s), or sub-slot(s). The interval between PUCCH instances may be an interval between first symbols of the PUCCH instances or between a last symbol of a preceding PUCCH and a first symbol of a following PUCCH.

Here, the PDSCHs may have the same priority or different priorities, which may be indicated by RRC signaling or DCI. For example, a HARQ codebook for PDSCHs for supporting eMBB traffic or URLLC traffic may be transmitted on a PUCCH. For example, one PUCCH may include a HARQ codebook for PDSCHs for eMBB traffic, and another PUCCH may include a HARQ codebook for PDSCHs for URLLC traffic.

(Method E.3-1): A field of scheduling DCI may indicate that a HARQ codebook for a PDSCH group to which a scheduled PDSCH belongs and other HARQ codebook(s) are multiplexed.

When the HARQ codebook(s) are multiplexed, (Method E.2-3) may be additionally applied. Accordingly, the HARQ codebook may be obtained as bits encoded through different encoding processes. The encoded bits may be concatenated to form one codeword.

The terminal may repeatedly transmit a HARQ codebook 1 for a PDSCH group 1, and may repeatedly transmit a HARQ codebook 2 for a PDSCH group 2. Here, the terminal may have partially transmitted the HARQ codebook 1.

FIGS. 36 to 39 are conceptual diagrams for describing repetitive HARQ codebook transmission according to exemplary embodiments of the present disclosure.

In FIGS. 36 to 39, predetermined intervals (i.e., $d_1$, $d_2$, d) between time resources of repeatedly transmitted PUCCHs are shown, and these may be expressed in units of symbol(s), slot(s), or sub-slot(s). When a HARQ codebook 1 and a HARQ codebook 2 are multiplexed, a PUCCH resource may be determined differently according to the number of encoded bits. In this case, the numbers of repetitions of the PUCCHs may be indicated to be the same.

Figure 36:
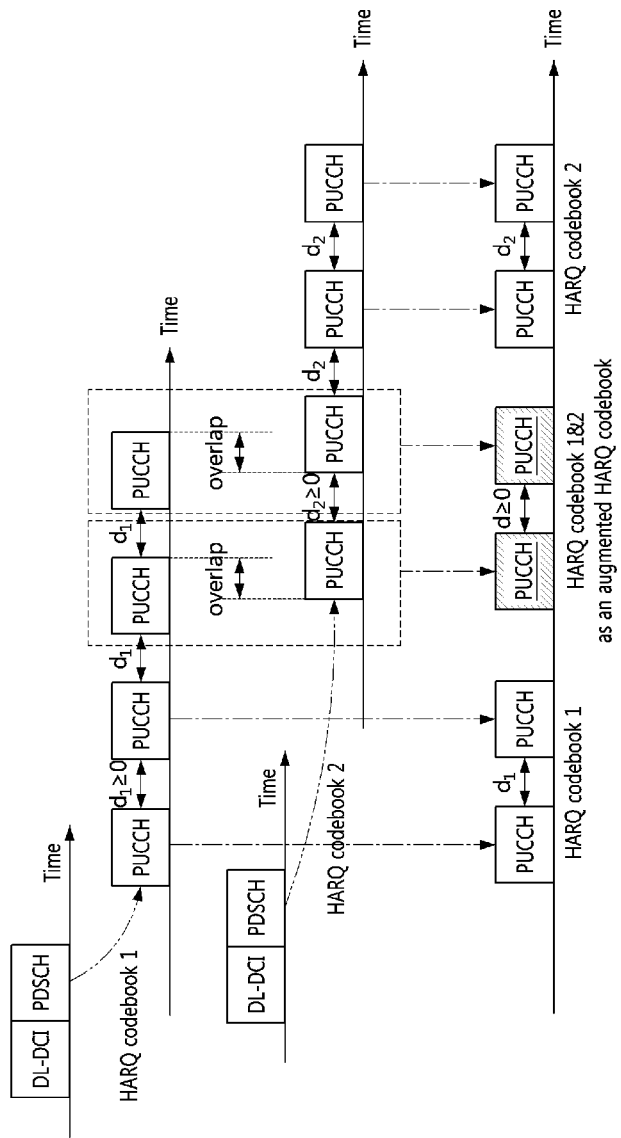
FIGS. 36 to 39 are conceptual diagrams for describing repetitive HARQ codebook transmission according to exemplary embodiments of the present disclosure.
Figure 37:
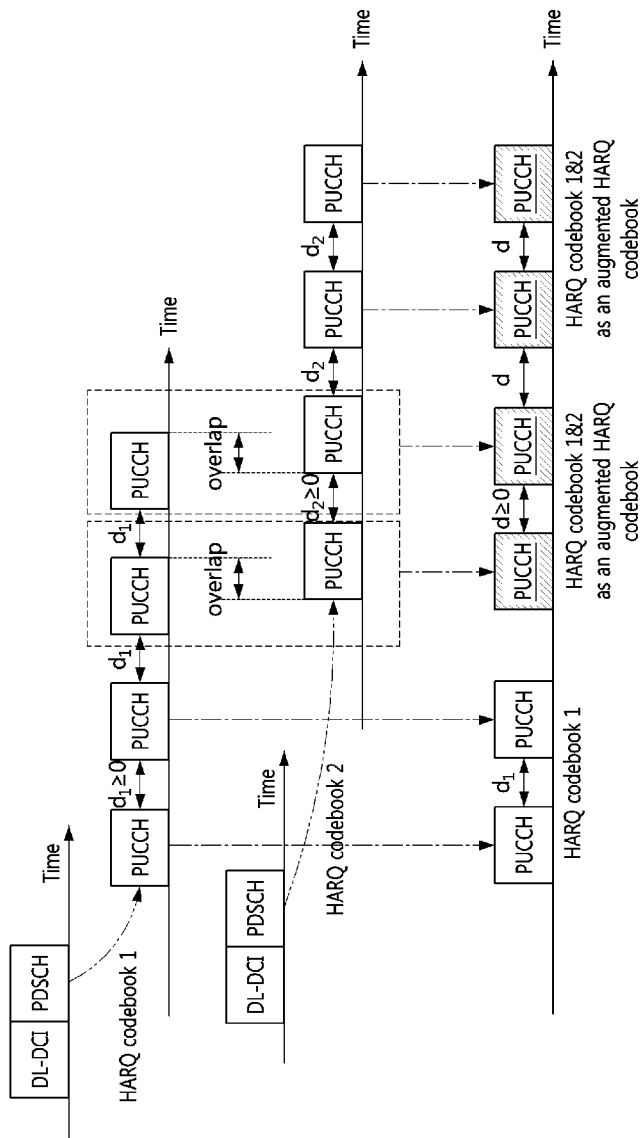

When the terminal is indicated to repeatedly transmit the PUCCH 4 times, after the terminal repeatedly transmits the HARQ codebook 1 twice, transmission of the HARQ codebook 2 may be additionally indicated from the PUCCH transmitted the third time. Referring to FIG. 36, when repetitive transmission is performed on a HARQ codebook basis, the terminal transmits only the HARQ codebook 1 twice, then transmits the HARQ codebook 1 and HARQ codebook 2 twice by multiplexing them, and then transmits only the HARQ codebook 2 twice. Referring to FIG. 37, when the terminal is indicated by DCI received by the terminal to transmit both the HARQ codebook 1 and the HARQ codebook 2, the terminal may transmit both the HARQ codebook 1 and the HARQ codebook 2 on the same PUCCH. The terminal transmits only the HARQ codebook 1 twice, and then transmits the HARQ codebook 1 and the HARQ codebook 2 four times by multiplexing them. The HARQ codebook 1 and the HARQ code book 2 are multiplexed, and transmitted as an extended HARQ codebook. The number of repetitions may be applied equally (i.e., 4 times) by DCI (or RRC signaling). Therefore, the HARQ codebook 1 has been already transmitted twice, and may be additionally transmitted four times.

(4) Examples of Repetitive PUCCH Transmission

When UCI is repeatedly transmitted, the number of repetitions may be indicated for each PUCCH format. In this case, the terminal may repeatedly transmit a PUCCH to which only a codeword composed of only one UCI type is mapped. When the terminal intends to transmit UCIs having two or more UCI types or UCI priorities, the terminal may generate a codeword by selecting only one UCI type/priority according to a priority determination rule. Since this scheme has a disadvantage in that the amount of transmission decreases in a specific UCI type (e.g., HARQ-ACK), there is a need for a method capable of multiplexing UCIs of two or more UCI types or UCI priorities.

For each UCI type or UCI priority (i.e., for each codeword), the number of repeated transmissions may be indicated to the terminal. For example, the base station may indicate the terminal to repeatedly transmit a HARQ-ACK for an eMBB PDSCH twice, to repeatedly transmit a HARQ-ACK for a URLLC PDSCH four times, and to transmit CSI once. The base station may indicate this information to the terminal through higher layer signaling. The terminal may be indicated by the base station a resource for transmitting a PUCCH, and may apply the number of repeated transmissions for each codeword. Therefore, when a PUCCH resource is indicated to the terminal through DL-DCI, since HARQ-ACKs or a HARQ codebook is configured as one codeword and thus the same number of repetitions is applied thereto, the terminal may repeatedly transmit the PUCCH the corresponding number of times.

In addition, if UCI (e.g., HARQ codebook 2, CSI, etc.) is newly generated, it may be configured as a new codeword and transmitted separately from a previous codeword (e.g., HARQ codebook 1). For example, the respective codewords may be transmitted first from different (sub-)slots, and the respective codewords may be transmitted later in different (sub-)slots. Alternatively, an implementation of the base station may adjust the (sub-)slots in which the PUCCH is transmitted, so that the terminal repeatedly transmits a PUCCH into which the new HARQ codebook is encoded after repeatedly transmitting a PUCCH into with the previous HARQ codebook is encoded. Since this may mean the scheduling constraint, it is preferable that the base station can indicate transmission of a new PUCCH even before transmission of a previous PUCCH is completed. Here, when the PUCCH is repeatedly transmitted, an interval between time resources of PUCCH instances may be given as zero or more symbol(s) or slot(s). The interval between PUCCH instances may be an interval between first symbols of the PUCCH instances, or may be an interval between a last symbol of a preceding PUCCH instance and a first symbol of a following PUCCH instance.

(Method E.4-1): A repetition (i.e., PUCCH instance) of a PUCCH may not be transmitted when a time resource thereof overlaps with another repetition (i.e., PUSCH instance) of a PUCCH.

For convenience of description, it is assumed that repetitive transmission 1 of a PUCCH and repetitive transmission 2 of a PUCCH have overlapping time resources, and the repetitive transmission 2 of the PUCCH starts later in time. According to (Method E.4-1), the repetitive transmission 2 of the PUCCH may be transmitted, and a part of the repetitive transmission 1 of the PUCCH may not be transmitted. (Method E.4-1) may be further classified into (Method E.4-2) and (Method E.4-3).

Hereinafter, a case of HARQ-ACK will be described as an example of the UCI type. However, without being limited thereto, methods to be described later may be applied to L1-RSRP, SR, CSI, or a combination thereof. Here, UCIs having the same UCI type may have the same or different priorities, which may be indicated by RRC signaling or DCI. For example, a HARQ codebook for PDSCHs for supporting eMBB traffic or URLLC traffic may be transmitted on a PUCCH. For example, one PUCCH may include a HARQ codebook for PDSCHs for eMBB traffic, and another PUCCH may include a HARQ codebook for PDSCHs for URLLC traffic.

(Method E.4-2): When (Method E.4-1) is applied, a stopped repetition of a PUCCH may not be retried later.

Since a PUCCH includes a HARQ codebook, the base station should allocate sufficient resources to satisfy a required error rate. Therefore, according to (Method E.4-2), when repetitions of two or more PUCCHs are allocated, it may be replaced with a repetition of a PUCCH whose transmission is started later. If an order in which DCI is received and an order of a first PUSCH instance of repetitive PUCCH transmission corresponding to the DCI are the same (i.e., in case of in-order scheduling), it may be interpreted as being replaced by the repetitive transmission of the lastly allocated PUCCH.

Otherwise (in case of out-of-order scheduling), a repetition of a PUCCH whose transmission is allocated later may be different from a repetition of a PUCCH whose transmission starts later. In this case, according to (Method E.4-2), when repetitions of two or more PUCCHs are allocated, it may be replaced with a repetition of a PUCCH whose transmission is allocated later.

Figure 38:
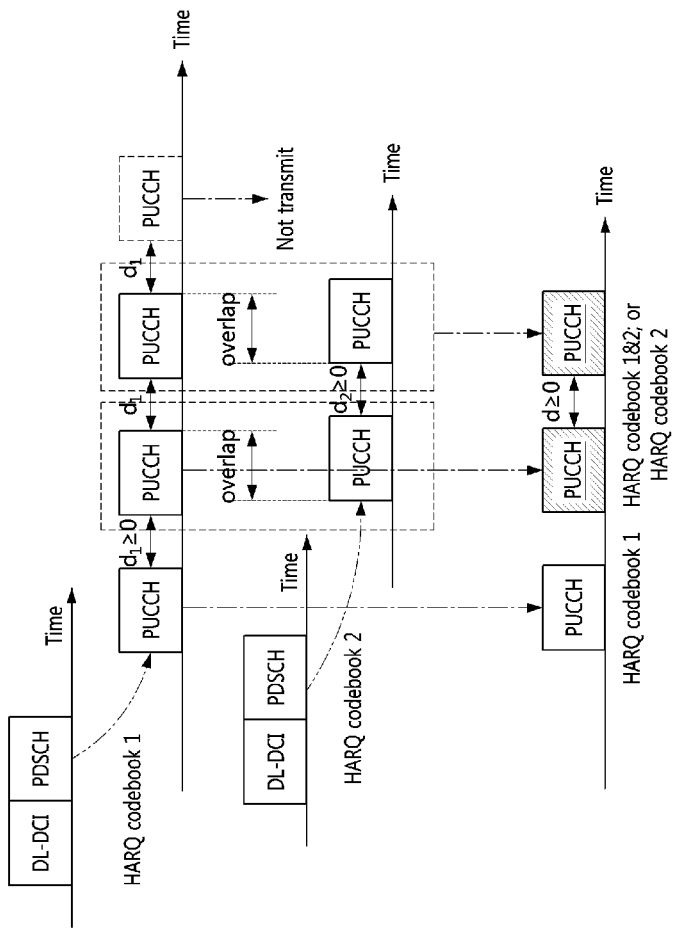

In FIG. 38, predetermined intervals (i.e., $d_1$, $d_2$, d) between time resources of repeatedly transmitted PUCCHs are shown, and these may be expressed in units of symbol(s), slot(s), or sub-slot(s). When a HARQ codebook 1 and a HARQ codebook 2 are multiplexed, a PUCCH resource may be determined differently according to the number of encoded bits. In this case, the numbers of repetitions of the PUCCHs may be indicated to be the same.

A PUCCH format in which the HARQ codebook 1 is transmitted may be repeatedly transmitted four times, and a PUCCH format in which both the HARQ codebook 1 and the HARQ codebook 2 are transmitted may be repeatedly transmitted twice. Consider a case in which repetitive transmission of a new PUCCH is indicated before repetitive transmission of a PUCCH on which the HARQ codebook 1 is transmitted is completed, and time resources of the PUCCHs are allocated so as to overlap each other in some slots.

According to (Method E.4-2), the HARQ codebook 1 may be transmitted only 3 times. Here, the HARQ codebook 1 may be transmitted once through a PUCCH including the HARQ codebook 1 alone, and may be transmitted twice through PUCCHs including both the HARQ codebook 1 and the HARQ codebook 2. Alternatively, a PUCCH including only the HARQ codebook 2 may be transmitted. Here, the HARQ codebook 2 may include the HARQ codebook 1 and an additional HARQ-ACK bit string. Alternatively, the HARQ codebook 1 and the HARQ codebook 2 may be composed of HARQ-ACK bit strings for different HARQ processes. Since the base station allocates resources so that the HARQ codebook 2 achieves a sufficiently low error rate, the HARQ codebook 1 may also obtain a sufficient error rate. Accordingly, the terminal may not additionally transmit the PUCCH including the HARQ codebook 1.

Here, the base station should be able to perform hard combining while receiving the HARQ codebook 1 several times. It is preferable that a code rate and/or codeword of the HARQ codebook 1 always maintains the same value when transmitted on PUCCHs.

(Method E.4-3): When (Method E.4-1) is applied, stopping of repetitive PUCCH transmission is limited when time resources overlap, and the stopped repetitive PUCCH transmission may be retried later.

Even if repetitive transmission 2 of a PUCCH is completed, the number of repetitions of repetitive transmission 1 of a PUCCH may still remain. In this case, according to (Method E.4-2), the repetitive transmission 1 of the PUCCH may be canceled later, but according to (Method E.4-3), the repetitive transmission 1 of the PUCCH may be transmitted afterwards.

Figure 39:
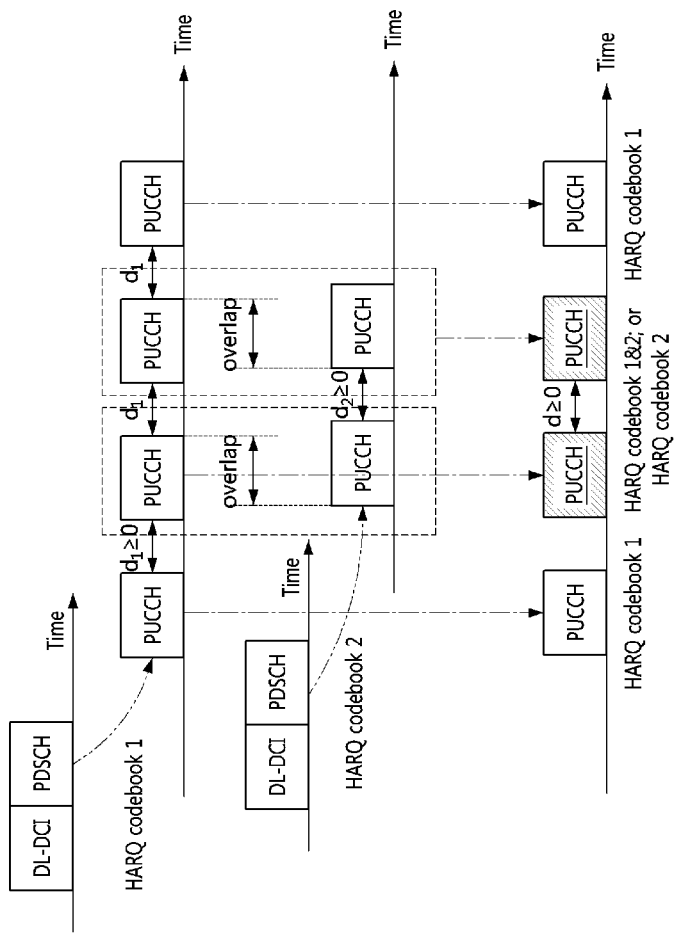

In the case shown in FIG. 39, a PUCCH including only the HARQ codebook 1 may be additionally transmitted in the same environment as shown in FIG. 38. Since the base station receives the codeword for the HARQ codebook 1 four times, the error rate for the HARQ codebook 1 may be kept sufficiently low. In addition, the base station may maintain a sufficiently low error rate for the HARQ codebook 2 by sufficiently allocating resources of the PUCCH including the HARQ codebook 2. Here, the HARQ codebook 2 may include the HARQ codebook 1 and an additional HARQ-ACK bit string. Alternatively, the HARQ codebook 1 and the HARQ codebook 2 may be composed of HARQ-ACK bit strings for different HARQ processes.

F. Methods for Multiplexing Repeated UCI and Repeated PUSCH (1) Case in which the Same UCI is Repeated Hereinafter, a case in which a PUCCH is indicated to be repeatedly transmitted and a PUSCH is indicated to be repeatedly transmitted is considered.

UCIs of the same UCI type may have the same or different priorities, and the priorities may be indicated by RRC signaling or DCI. For example, a HARQ codebook for PDSCH for supporting eMBB traffic or URLLC traffic may be transmitted on a PUCCH. For example, one PUCCH may include a HARQ codebook for PDSCH for eMBB traffic, and another PUCCH may include a HARQ codebook for PDSCH for URLLC traffic. In addition, when a PUSCH includes a TB, a priority of the TB may be the same as or different from a priority of UCI.

(Method F.1-1): When a PUSCH and a PUCCH are repeatedly transmitted and partially overlapped in time, the PUCCH may be transmitted and the PUSCH may not be transmitted.

Here, a PUCCH instance may be repeated on a slot basis or may be repeated on a sub-slot basis. When a full PUSCH instance or a split PUSCH instance belonging to a PUSCH or a PUSCH occasion overlaps a PUCCH instance in some symbols, only the PUCCH may be transmitted.

FIGS. 40 to 43 are conceptual diagrams for describing operation methods when a PUCCH instance and a full/split PUSCH instance overlap each other according to an exemplary embodiment of the present disclosure.

Figure 40:
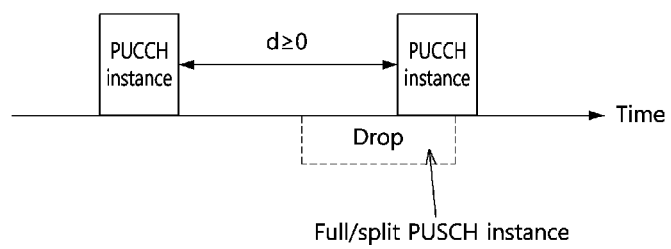

Referring to FIG. 40, PUCCH instances have an interval of d, and d may correspond to slot(s) or sub-slot(s). d may mean a time interval between first symbols of the PUCCH instances. Alternatively, d may be an interval between a last symbol of a preceding PUCCH instance and a first symbol of a following PUCCH instance.

(1.1) Case in which PUCCH(s) and PUSCH(s) Overlap in Time According to One-to-One Correspondence When UCI and a PUSCH are repeatedly transmitted, the UCI and PUSCH may repeatedly overlap. In this case, the UCI may be multiplexed in a PUSCH instance. The UCI may be multiplexed in all of PUSCH instances, or may be multiplexed only in a specific PUSCH instance.

(Method F.1-2): UCI may be multiplexed in all PUSCHs that overlap a PUCCHs.

Figure 41:
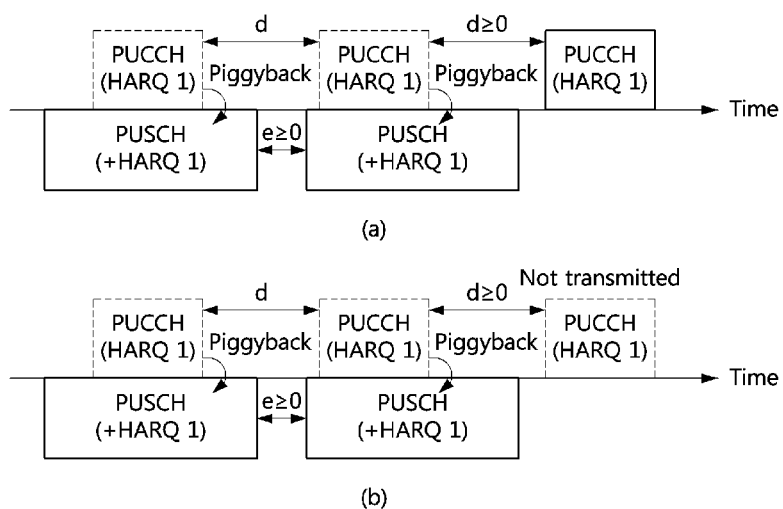

When the terminal is indicated to repeatedly transmit a HARQ codebook, the HARQ codebook may be repeatedly multiplexed in PUSCH instances. FIG. 41 shows this case. For example, the terminal may be indicated to transmit a HARQ codebook 1 m times (m≥3), and may be indicated to transmit a PUSCH k times (k≥2). Here, PUCCHs including the HARQ codebook 1 (i.e., HARQ1) may overlap with PUSCHs. Therefore, according to (Method F.1-2), the terminal may transmit the PUSCH in which the HARQ codebook 1 is multiplexed twice. In this case, a PUCCH instance that does not overlap with a PUSCH instance may be additionally transmitted (i.e., case (a)). Alternatively, a PUCCH instance that does not overlap a PUSCH instance may no longer be transmitted (i.e., case (b)).

When the terminal continues to transmit a PUCCH instance, the base station should be able to perform soft combining on the HARQ codebook 1. However, a code rate applied to the HARQ codebook 1 multiplexed in a PUSCH instance and a code rate applied to the HARQ codebook 1 transmitted through a PUCCH instance may be different from each other. In this case, it may be difficult for the base station to perform soft combining on them. Nevertheless, since the base station may improve an error rate for the HARQ codebook 1 by implementation, a PUCCH instance that does not overlap a PUSCH instance may be additionally transmitted as in the case (a). When the base station does not support such implementation, a PUCCH instance that does not overlap a PUSCH instance may not be transmitted as in the case (b). In the case (b), the base station may have to perform scheduling so that the HARQ codebook 1 has a sufficient error rate.

(Method F.1-3): UCI may be multiplexed in a specific PUSCH that overlaps in time with a PUCCH.

When the terminal is indicated to repeatedly transmit a HARQ codebook, the HARQ codebook may be multiplexed only in one PUSCH instance. For example, UCI may be multiplexed only in a PUSCH that is the earliest in time among PUSCHs that overlap with PUCCHs. FIG. 42 shows this case. The terminal may be indicated to transmit a HARQ codebook 1 m times (m≥3), and may be indicted to transmit a PUSCH k times (k≥2). Here, a PUCCH including the HARQ codebook 1 may overlap a PUSCH. Therefore, according to (Method F.1-3), the terminal may transmit the PUSCH in which the HARQ codebook 1 is multiplexed once. In this case, a PUCCH instance that does not overlap with a PUSCH instance may be additionally transmitted (i.e., case (a)). Alternatively, a PUCCH instance that does not overlap a PUSCH instance may no longer be transmitted (i.e., case (b)).

As described above, according to an implementation and scheduling of the base station to improve an error rate for the HARQ codebook 1, the terminal may operate in the case (a) or the case (b).

(1.2) Case in which PUCCH(s) and PUSCH(s) Overlap in Time According to One-to-Many (or Many-to-One) Correspondence The above-described methods may be applied when one PUSCH instance and one PUCCH instance overlap. On the other hand, one PUSCH instance may overlap two or more PUCCH instances, or one PUCCH instance may overlap two or more PUSCH instances. In these cases, it may be difficult to apply the above-described methods. Further, PUCCH instances may be repeatedly transmitted including the same UCI, or may be repeatedly transmitted including different UCIs.

Figure 43:
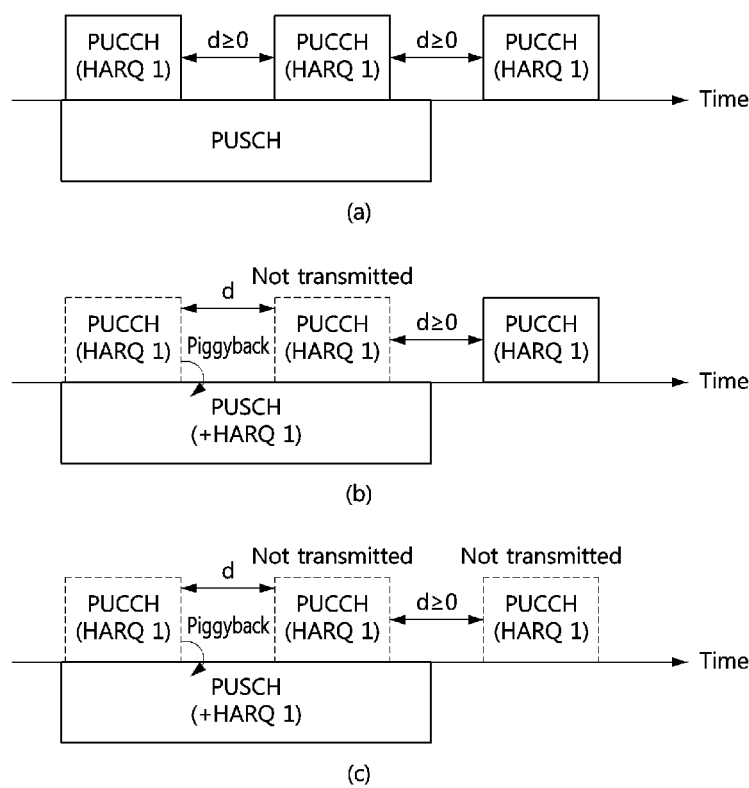

Therefore, a PUCCH including a HARQ codebook may be indicated to be repeatedly transmitted, and all of PUCCH instances may include the same HARQ codebook. A PUSCH may be transmitted over a plurality of (sub-)slots while the PUCCH including the HARQ codebook is being repeatedly transmitted. As the PUSCH is transmitted over a plurality of (sub-)slots, it may overlap with two or more PUCCH instances. FIG. 43 shows this case.

As shown in a case (a), a PUSCH allocated by the base station is overlapped with two or more PUCCH instances. In this case, the terminal may multiplex the HARQ codebook 1 in the PUSCH. Since two or more PUCCH instances are repeatedly transmitted as including the HARQ codebook 1, the terminal may multiplex a specific PUCCH instance among the PUCCH instances (e.g., a PUSCH instance that first overlaps with the PUSCH) in the PUSCH. In this case, a sufficient processing time for the terminal to multiplex the HARQ codebook 1 in the corresponding PUSCH instance may need to be secured.

In this case, the remaining PUCCH instances that do not overlap with the PUSCH may be transmitted (i.e., case (a)). Alternatively, the remaining PUCCH instances that do not overlap with the PUSCH may not be transmitted (i.e., case (b)). As described above, according to an implementation and scheduling of the base station for improving an error rate for the HARQ codebook 1, the terminal may operate in the case (a) or the case (b).

(2) Case in which Different UCIs are Transmitted (2.1) Case in which PUCCH(s) and PUSCH(s) Overlap in Time According to One-to-One Correspondence The base station may indicate the terminal to continuously transmit UCIs. In this case, a PUSCH may overlap one or more PUCCH instances. In this case, a PUCCH instance (i.e., UCI) may be multiplexed in the PUSCH. When UCI is multiplexed in the PUSCH, the terminal may need to know the amount of the UCI.

In case of HARQ-ACK, the terminal may estimate a size of a HARQ codebook from a DAI field of DL-DCI. A case in which one PUSCH is overlapped with two or more PUCCH instances, and the HARQ codebook is not repeatedly transmitted may be considered. Since there are multiple HARQ codebooks, the terminal may need to know the size of each HARQ codebook.

(Method F.2-1): The number of HARQ codebooks (or PUCCH instances) multiplexed in a PUSCH occasion is limited to a maximum of n.

(Method F.2-2): In (Method F.2-1), the number of HARQ codebooks multiplexed in one PUSCH instance is limited to one or less.

The terminal may estimate the size of the HARQ codebook from a specific field of DCI. In order to limit the size of DCI, the base station may indicate a value of n to the terminal through RRC signaling. Alternatively, the value of n may be determined as one value in the technical specification. In an example, n may be set to 1. When n is 1, the conventional DCI may be reused. When n has a value of 2 or more, n DAIs may be included in DCI. In addition, the base station may need to perform scheduling so that n or less PUCCH instances overlap PUSCH(s).

In (Method F.2-1) and (Method F.2-2), n may be given regardless of priorities (i.e., eMBB or URLLC) corresponding to HARQ codebooks, or may be given for each priority. When n is given for each priority, two priorities are given even if n is 1, and thus a DAI should be able to derive two indices.

Figure 44:
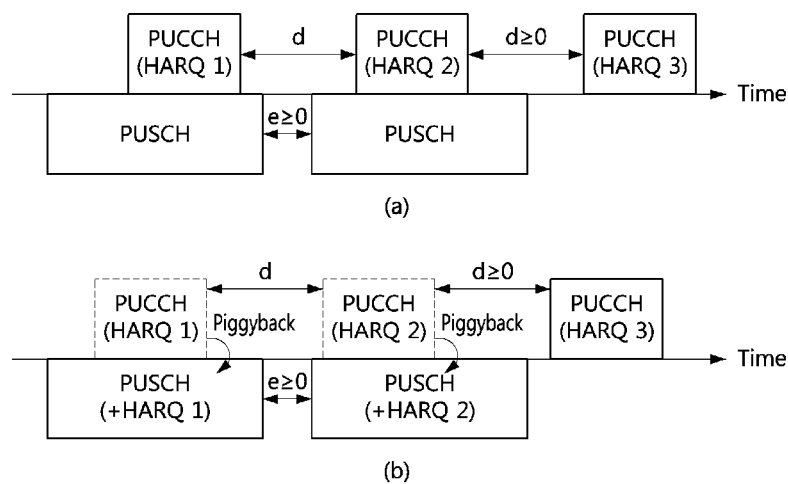
FIGS. 44 and 45 are conceptual diagrams for describing other operation methods when a PUCCH instance and a full/split PUSCH instance overlap each other according to an exemplary embodiment of the present disclosure.
Figure 45:
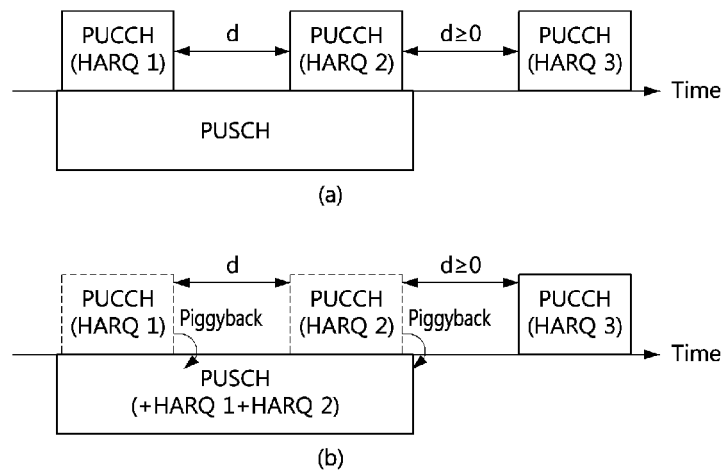

FIGS. 44 to 45 are conceptual diagrams for describing other operation methods when a PUCCH instance and a full/split PUSCH instance overlap each other according to an exemplary embodiment of the present disclosure.

As shown in FIG. 44, the terminal may be indicated to transmit a HARQ codebook i∈{1,2,3}, and may be allocated a PUSCH that overlaps with a PUCCH instance associated with the HARQ codebook i∈{1,2} (i.e., case (a)). The base station should transmit UL-DCI allocating the PUSCH not earlier in time than DL-DCI that may be associated with the HARQ codebook i∈{1,2}. However, since a PUCCH instance including a HARQ codebook 3 does not overlap with the PUSCH, it does not have this limitation.

On the other hand, in case of a PUSCH occasion that is not allocated by UL-DCI, this limitation is unnecessary. Therefore, the number n of HARQ codebook(s) that can be multiplexed in a PUSCH occasion may be extended as needed (n≥1). However, it may be preferable that the number of HARQ codebook(s) multiplexed in one PUSCH instance is still limited to one or less.

In case of n=1, according to (Method F.2-1), a PUSCH in which the HARQ codebook 1 is multiplexed may be transmitted, and the HARQ codebook 2 may not be transmitted. Alternatively, the base station performs scheduling so that such allocation does not occur, and the terminal may assume that such allocation does not occur.

In case of n=2, according to (Method F.2-1), the HARQ codebook i∈{1,2} may be transmitted as being multiplexed in PUSCHs, respectively. This is represented by the case (b).

(2.2) Case in which PUCCH(s) and PUSCH(s) Overlap in Time According to One-to-Many (or Many-to-One) Correspondence The base station may indicate the terminal to continuously transmit UCIs. Here, the UCIs may be generated by different DCIs or resource allocations. In this case, a PUSCH may overlap one or more PUCCH instances. In this case, a PUCCH instance (i.e., UCI) may be multiplexed in the PUSCH. When UCI is multiplexed in the PUSCH, the terminal may need to know the amount of the UCI.

In case of HARQ-ACK, the terminal may estimate a size of a HARQ codebook from a DAI field of DL-DCI. A case in which one PUSCH is overlapped with two or more PUCCH instances, and the HARQ codebook is not repeatedly transmitted may be considered. Since there are multiple HARQ codebooks, the terminal may need to know the size of each HARQ codebook.

(Method F.2-3): The number of HARQ codebooks (or PUCCH instances) multiplexed in a PUSCH is limited to a maximum of n.

The terminal may estimate the size of the HARQ codebook from a specific field of DCI. In order to limit the size of the DCI, the base station may indicate a value of n to the terminal through RRC signaling. Alternatively, the value of n may be determined as one value in the technical specification. In an example, n may be set to 1. When n is 1, the conventional DCI may be reused. When n has a value of 2 or more, n DAIs may be included in DCI. In addition, the base station should perform scheduling so that n or less PUCCH instances overlap PUSCH(s).

In (Method F.2-3), (Method F.2-4), and (Method F.2-5), n may be given regardless of priorities (i.e., eMBB or URLLC) corresponding to HARQ codebooks, or may be given for each priority. When n is given for each priority, two priorities are given even if n is 1, and thus a DAI should be able to derive two indices.

As shown in FIG. 45, the terminal may be indicated to transmit a HARQ codebook i∈{1,2,3}, and may be allocated a PUSCH that overlaps with a PUCCH instance associated with the HARQ codebook i∈{1,2}. The base station should transmit UL-DCI allocating the PUSCH not earlier in time than DL-DCI that may be associated with the HARQ codebook i∈{1,2}. However, since a PUCCH instance including a HARQ codebook 3 does not overlap with the PUSCH, it does not have this limitation.

In case of n=2, according to (Method F.2-3), a PUSCH in which the HARQ codebook i∈{1,2} is multiplexed may be transmitted. In case of n=1, according to (Method F.2-3), only the HARQ codebook 1 is multiplexed in the PUSCH, and the HARQ codebook 2 may not be transmitted. Alternatively, the base station performs scheduling so that such allocation does not occur, and the terminal may assume that such allocation does not occur.

(Method F.2-4): The value of n applied to (Method F.2-3) may be the same for a PUSCH occasion dynamically allocated by DCI, a PUCCH occasion allocated by a T1 CG scheme, and a PUCCH occasion allocated by a T2 CG scheme.

Since the implementation of the terminal can be simplified, the value of n may be independent from the scheme in which a PUSCH occasion is allocated (i.e., a dynamic allocation scheme by DCI, a scheme in which configuration is performed by RRC signaling and activation is performed by DCI, or a scheme in which allocation/activation is performed only by RRC signaling). However, in this case, the value of n should have the lowest value for these three schemes. Accordingly, the value of n may be independently assigned for each scheme in which a PUSCH occasion is allocated.

(Method F.2 5): The value of n applied to (Method F.2-3) may vary according to a PUSCH occasion dynamically allocated by DCI, a PUCCH occasion allocated by a T1 CG scheme, and a PUCCH occasion allocated by a T2 CG scheme.

For example, n may be 1 for a dynamically allocated PUSCH occasion, and n may have a value greater than 1 for a PUSCH occasion allocated by a T1/T2 CG scheme. Here, the value of n for a PUSCH occasion allocated by a T1/T2 CG scheme may refer to the number of PUCCH instances overlapping the PUSCH.

(3) Case in which New UCI is Repeated when Repetition is not Completed

A case in which multiplexing between UCI and PUSCH is considered will be described.

Figure 46:
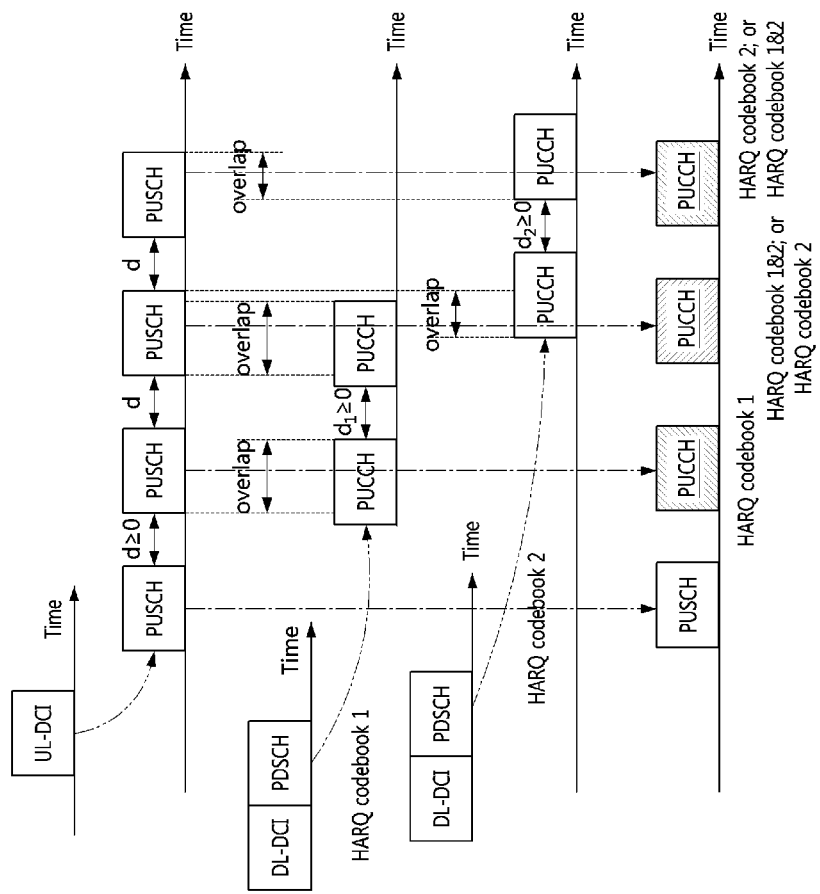
FIGS. 46 and 47 are conceptual diagrams for describing a UCI transmission method for a case where repetitive transmission of new UCI starts when repetitive transmission of UCI does not end according to an exemplary embodiment of the present disclosure.
Figure 47:
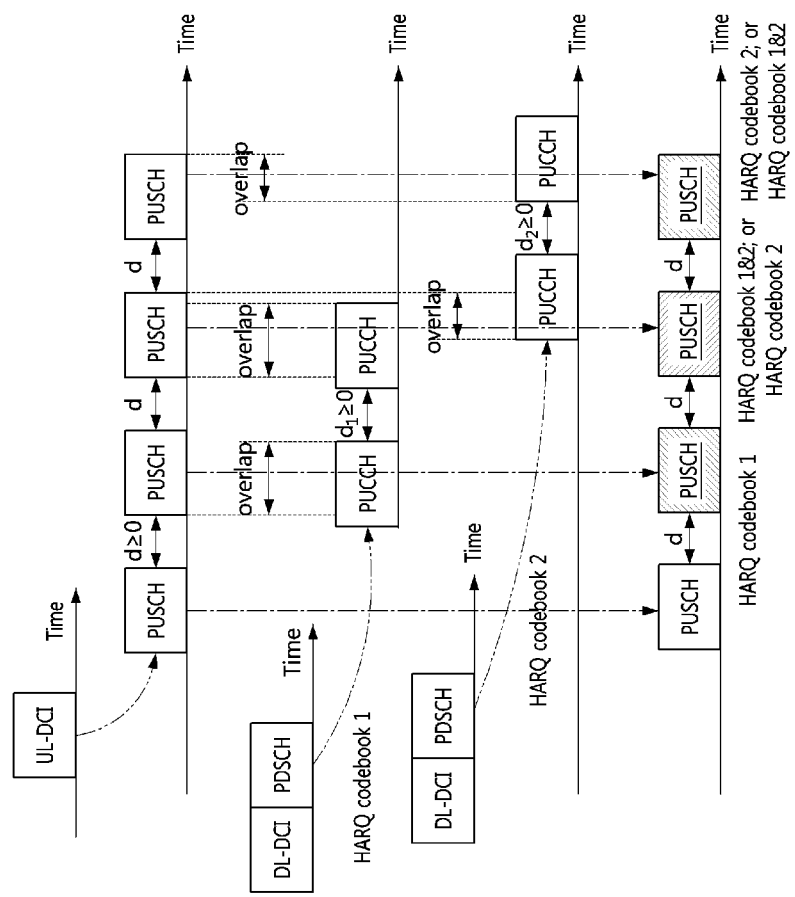

FIGS. 46 and 47 are conceptual diagrams for describing a UCI transmission method for a case where repetitive transmission of new UCI starts when repetitive transmission of UCI does not end according to an exemplary embodiment of the present disclosure.

In FIGS. 46 and 47, a predetermined interval (i.e., $d_1$, $d_2$, d) is given between repeated PUCCH instances, which may be slot(s) or sub-slot(s). The interval between PUCCH instances may refer to a time interval between first symbols of the PUCCH instances. Alternatively, the interval between PUCCH instances may be an interval between a last symbol of a preceding PUCCH instance and a first symbol of a following PUCCH instance.

When a HARQ codebook 1 and a HARQ codebook 2 are multiplexed, a PUCCH resource may be determined differently according to the number of encoded bits. In this case, the number of repeated transmissions of a PUCCH may be indicated equally.

In an example, when a time resource of a PUCCH corresponding to allocated UCI and a time resource of a PUSCH overlap, the terminal may map the UCI to the PUCCH and may not transmit the PUSCH. Here, the non-transmitted PUSCH may refer to all full/split PUSCH instances with which the PUCCH is overlapped in time resources.

Referring to FIG. 46, the terminal repeatedly transmits a PUSCH 4 times and repeatedly transmits a PUCCH 2 times. In this case, since after the PUSCH is transmitted only once, the remaining PUSCH instances overlap with PUCCH instances, the PUCCH instances may be transmitted instead of the PUSCH instances. One of the HARQ codebook 1 or the HARQ codebook 2 may be transmitted in a PUCCH instance, the HARQ codebook 1 and the HARQ codebook 2 may be concatenated and transmitted in a PUCCH instance, or the HARQ codebook 1 or the HARQ codebook 2 may be generated as a new HARQ codebook and transmitted in a PUCCH instance.

In another example, when a time resource of a PUCCH corresponding to allocated UCI and a time resource of a PUSCH overlap, the terminal may map UCI to the PUSCH.

Referring to FIG. 47, the terminal repeatedly transmits a PUSCH 4 times and repeatedly transmits a PUCCH 2 times. A HARQ codebook 1 and a HARQ codebook 2 are respectively generated. Here, an example of a method of generating the HARQ codebook 2 is to independently generate the HARQ codebook 2 from the HARQ codebook 1. In this case, HARQ process identifiers overlapping each other may not be in the HARQ codebook 1 and the HARQ codebook 2. Alternatively, another example of the method of generating the HARQ codebook 2 is to generate the HARQ codebook 2 by adding a HARQ-ACK bit string to the HARQ codebook 1.

Repetitive transmission of the PUCCH may follow the above-described methods (i.e., (Method E.4-1), (Method E.4-2), or (Method E.4-3)). When the method for the repetitive transmission of the PUCCH is determined, a method for multiplexing with a PUSCH may be considered.

Referring to FIG. 47, only a PUSCH is transmitted in a first transmission (i.e., first PUSCH instance) of the PUSCH. In a second transmission (i.e., second PUSCH instance) of the PUSCH, the HARQ codebook 1 is transmitted. In a third transmission (i.e., third PUSCH instance) of the PUSCH, the HARQ codebook 1 and the HARQ codebook 2 or the HARQ codebook 2 including the HARQ codebook 1 may be transmitted. In a fourth transmission (i.e., fourth PUSCH instance) of the PUSCH, the HARQ codebook 2 or the HARQ codebook 2 including the HARQ codebook 1 may be transmitted.

When only the HARQ codebook 1 is allocated, the terminal may transmit the HARQ codebook 1 in all PUSCH instances overlapping with PUCCH instances.

When the HARQ codebook 1 and the HARQ codebook 2 are configured only with different HARQ process identifiers, UL-DCI may include both an offset (i.e., beta offset) of a modulation and code rate that the HARQ codebook 1 should have and an offset of a modulation and code rate that the HARQ codebook 2 should have. This may be applied to all UCIs as well as the HARQ-ACK.

(Method F.3-1): UL-DCI may indicate offsets of modulation and code rates applied to UCIs having two or more UCI types, the same UCI type, or different priorities.

Since different UCIs may be mapped to a PUSCH, a beta offset may be indicated to the terminal for each of the UCIs (i.e., for each UCI type or each UCI codebook, etc.). A code rate applied to each UCI may be indicated to the terminal through higher layer signaling. Alternatively, a code rate applied to each UCI may be indicated by a beta offset through UL-DCI. Since the base station may repeatedly receive UCI, it is preferable that the code rate indicated by the higher layer signaling to the terminal and the beta offset indicated by the UL-DCI can be indicated to have only the same value.

However, when the number of UCI types or HARQ codebooks is large, or when the priorities of traffics (i.e., eMBB or URLLC) are distinguished, it may be ineffective to indicate all the beta offsets for UCI types or HARQ codebooks in UL-DCI. Therefore, for the same UCI type, it is preferable that a plurality of beta offsets are indicated using one index.

(Method F.3-2): In (Method F.3-1), one index may indicate multiple offsets.

An index for beta offsets may be included in UL-DCI. The beta offsets corresponding to one index may vary according to a UCI type and a coding scheme (e.g., Reed Muller code or polar code). This correspondence may be indicated by higher layer signaling. According to (Method F.3-2), both a beta offset for the HARQ codebook 1 and a beta offset for the HARQ codebook 2 may be derived from one index.

(4) Methods of Multiplexing UCI in Split PUSCH Instance

According to the conventional technical specification, when UCI is multiplexed in a PUSCH, the number of REs used by the UCI is determined using various variables, and REs used by a TB are determined as the rest of the REs used by the UCI. For example, when HARQ-ACK(s) are mapped to a PUSCH to which a UL-SCH is mapped, the number of REs to which the HARQ-ACK(s) are mapped may be determined using Equation 1 below.

[Equation 1]

$$Q'_{ACK} = \min \left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l_0=0}^{N^{PUSCH}_{symb,all}-1} M^{UCI}_{sc}(l) \right\rceil \right\}$$

Here, $O_{ACK}$ denotes the number of HARQ-ACK(s), $L_{ACK}$ denotes the length of CRC, $M_{sc}^{UCI}$ denotes the number of subcarriers of the l-th symbol, $K_r$ denotes the size of the r-th codebook, $N_{symb,all}^{PUSCH}$ denotes the number of symbols that the PUSCH has, $C_{UL-SCH}$ denotes the number of code blocks of the TB, and $l_0$ denotes an index of a first symbol not including a DM-RS (or a first index after a DM-RS symbol). Here, $\beta_{offset}^{PUSCH}$ (or beta offset) roughly represents a ratio of an effective code rate of the HARQ-ACK(s) and a code rate of the PUSCH, a plurality of values thereof are indicated to the terminal by RRC signaling, and one of the plurality of values may be indicated to the terminal through UL-DCI. α (or alpha scaling or scaling) acts as an upper limit ratio so that the HARQ-ACK(s) do not occupy too many REs of the PUSCH. One α value may be indicated to the terminal through RRC signaling.

In addition to HARQ-ACK, similar equations (Equation 2, Equation 3, Equation 4, Equation 5, and Equation 6) may be applied also to other UCI types (i.e., SR, L1-RSRP, CSI). Specifically, the number of REs to which HARQ-ACK(s) are mapped when the HARQ-ACK(s) are mapped to a PUSCH to which a UL-SCH is not mapped may be determined using Equation 2 below. The number of REs to which a CSI part 1 is mapped when the CSI part 1 is mapped to a PUSCH to which a UL-SCH is mapped may be determined using Equation 3 below. The number of REs to which a CSI part 1 is mapped when the CSI part 1 is mapped to a PUSCH to which a UL-SCH is not mapped may be determined using Equation 4 below. The number of REs to which a CSI part 2 is mapped when the CSI part 2 is mapped to a PUSCH to which a UL-SCH is mapped may be determined using Equation 5 below. The number of REs to which a CSI part 2 is mapped when the CSI part 2 is mapped to a PUSCH to which a UL-SCH is not mapped may be determined using Equation 6 below. Therefore, all the methods to be described later may be easily extended and applied.

$$Q'_{ACK} = \min\left\{\left\lceil\frac{(0_{ACK} + L_{ACK}) \cdot \beta^{PUSCH}_{offset} \cdot \sum_{l=0}^{N^{PUSCH}_{symb,all}-1} M^{UCI}_{sc}(l)}{R \cdot Q_m}\right\rceil,\right.$$

[Equation 2]

$$\left.\left\lceil\alpha \cdot \sum_{l_0=0}^{N^{PUSCH}_{symb,all}-1} M^{UCI}_{sc}(l)\right\rceil\right\}$$

[Equation 3]

$$Q'_{CSI-1} =$$

$$\min\left\{\left\lceil\frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil,\right.$$

$$\left.\left\lceil\alpha \cdot \sum_{l_0=0}^{N^{PUSCH}_{symb,all}-1} M^{UCI}_{sc}(l)\right\rceil - Q'_{ACK}\right\}$$

[Equation 4]

$$Q_{CSI-1} = \min\left\{\left\lceil\frac{(0_{CSI-1} + L_{CSI-1}) \cdot \beta^{PUSCH}_{offset}}{R \cdot Q_m}\right\rceil,\right.$$

$$\sum_{l_0=0}^{N^{PUSCH}_{symb,all}-1} M^{UCI}_{sc}(l) - Q_{ACK}\right\} \text{ if CSI part 2 is on } PUSCH,$$

$$\text{or } \sum_{l_0=0}^{N^{PUSCH}_{symb,all}-1} M^{UCI}_{sc}(l) - Q'_{ACK} \text{ if CSI part 2 is not on } PUSCH$$

[Equation 5]

$$Q'_{CSI-2} =$$

$$\min\left\{\left\lceil\frac{(0_{CSI-2} + L_{CSI-2}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil,\right.$$

$$\left.\left\lceil\alpha \cdot \sum_{l_0=0}^{N^{PUSCH}_{symb,all}-1} M^{UCI}_{sc}(l)\right\rceil - Q'_{ACK} - Q'_{CSI-1}\right\}$$

[Equation 6]

$$Q'_{CSI-2} = \sum_{l_0=0}^{N^{PUSCH}_{symb,all}-1} M^{UCI}_{sc}(l) - Q'_{ACK} - Q'_{CSI-1}$$

When UCI is multiplexed in a PUSCH, alpha scaling as well as the beta offset is applied, so that the number of REs be occupiable by the encoded UCI is determined. The alpha scaling is used to determine an upper limit of the number of REs. For example, when a beta offset is indicated so that only few REs are left to a TB belonging to the PUSCH, or when the number of REs of the PUSCH is too small to follow the indicated beta offset, the upper limit of alpha scaling may be used.

When a PUSCH is transmitted as split PUSCH instances, Equation 1 may not be applied as it is. This is because the number of REs used when calculating the upper limit in Equation 1 is derived by assuming a full PUSCH instance rather than a split PUSCH instance. Since the upper limit may have an invalid value in a split PUSCH instance, a new method should be applied.

(Method F.4-1) When calculating the upper limit value of Equation 1, parameters derived based on a split PUSCH instance in which UCI is to be multiplexed is used in Equation 1.

A PUCCH associated with UCI may overlap with a split PUSCH instance rather than a full PUSCH instance. In this case, the terminal may calculate the upper limit value applied to Equation 1 using values for the corresponding split PUSCH instance. Therefore, even when interpreted as a beta offset for a split PUSCH instance, the number of REs occupiable by the encoded UCI is calculated to be the upper limit value or less. However, if the base station determines the alpha scaling by assuming that UCI is multiplexed in a full PUSCH instance, since the terminal uses one alpha scaling, the alpha scaling may be indicated as an inappropriate value when the terminal multiplexes UCI in a split PUSCH instance.

(Method F.4-2) When calculating the upper limit value of Equation 1, Equation 1 is used by deriving parameters based on a full PUSCH instance. When calculating the upper limit value of Equation 1, the parameters derived based on a full PUSCH instance are used in Equation 1.

(Method F.4-3): When the upper limit value is calculated using (Method F.4-2), if the upper limit value is derived as an invalid value for a split PUSCH instance in which UCI is to be multiplexed, the corresponding split PUSCH instance is dropped, and a PUCCH is transmitted.

The terminal calculates the upper limit value applied to Equation 1 using values for a full PUSCH instance. Thereafter, by using the number of REs of a split PUSCH instance, it may be determined whether the calculated upper limit is valid (i.e., if the upper limit is not greater than the number of REs of a split PUSCH instance). If it is determined that the upper limit is invalid, the terminal may not transmit the corresponding split PUSCH instance, but may transmit a PUCCH instead.

The above-described (Method F.4-1), (Method F.4-2), and (Method F.4-3) may be applied at least when the base station indicates one alpha scaling to the terminal. The value of alpha scaling may be determined so that the amount of resources (number of REs) for the PUSCH allocated by the base station is sufficient so that UCI and a TB can obtain a sufficient error rate. However, when UCI is multiplexed in a split PUSCH instance, it may be considered that alpha scaling is used as a different value. Since the number of REs of a split PUSCH instance may vary greatly, the error rate of TB and/or UCI when the split PUSCH instance is decoded may be greatly changed.

(Method F.4-4): The base station may calculate a value of alpha scaling based on a full PUSCH instance, and may indicate to the terminal a value of another alpha scaling for a split PUSCH instance.

An alpha scaling value that the terminal applies to a full PUSCH instance and an alpha scaling value that the terminal applies to a split PUSCH instance may be different from each other. The base station may indicate (or configure) two or more alpha scaling values to the terminal through RRC signaling.

In order to determine an alpha scaling value for a split PUSCH instance, an assumption for a split PUSCH instance is required. For a split PUSCH instance which is a reference (i.e., reference split PUSCH instance), an alpha scaling value that sufficiently lowers the error rate of TB and UCI may be derived. The reference split PUSCH instance may defined in the technical specification, and the base station may calculate the alpha scaling value based on the reference split PUSCH instance.

Depending on allocation of a split PUSCH instance, the error rate of TB and/or UCI may be not sufficiently low or an invalid upper limit value may be derived from Equation 1 even for one or more alpha scaling value(s) indicated to the terminal. In this case, it is preferable not to transmit the UCI.

(Method F.4-5): If an invalid upper limit value is derived from Equation 1 from all alpha scaling values indicated to the terminal, or the error rate of TB and/or UCI is not sufficiently low, the corresponding split PUSCH instance is not transmitted, and a PUCCH may be transmitted instead.

(5) Methods of Multiplexing UCIs Having Different Priorities

The terminal may transmit UCIs having different types/priorities on one uplink channel. For example, there may be a case in which PUCCHs associated with the UCIs overlap each other in time, or a case in which PUSCHs and PUCCHs overlap each other in time. In this time, since a PAPR/IMD occurs when the terminal transmits multiple PUCCH(s) or PUSCH(s) at the same time, the terminal may not be able to allocate a sufficient transmission power.

Hereinafter, a method of deriving resources of virtually multiplexed PUCCH and/or PUSCH when time resources of a PUCCH corresponding to UCI and/or a PUSCH corresponding to a TB partially overlap will be described.

(Method F.5-1): After multiplexing UCI and/or TB having a high priority, it may be determined whether or not to multiplex UCI and/or TB having a low priority.

Since the terminal may assume that UCI and/or TB having a high priority is to be transmitted, the terminal may perform a multiplexing procedure for the UCI and/or TB having a high priority, and then determine whether to further multiplex UCI and/or TB having a low priority. If multiplexing for a low priority is performed, sufficient uplink resources (e.g., bandwidth, transmission power) should be allocated to the terminal. Sufficient uplink resources should be allocated to the terminal so that the low priority UCI and/or TB can be multiplexed while achieving a sufficiently low error rate for the UCI and/or TB having the high priority. Therefore, when allocating UCI and/or TB having a high priority, it should be known to the terminal whether multiplexing for UCI and/or TB having a low priority is allowed.

(Method F.5-2): RRC signaling or DCI allocating UCI and/or TB with a high priority may indicate (or configure) the terminal to multiplex UCI and/or TB having a low priority or not to multiplex UCI and/or TB having a low priority.

When UCI and/or TB having a high priority is allocated, a PUSCH resource may be allocated by RRC signaling in case of a T1 CG scheme. In case of a T2 CG scheme, a PUSCH resource may be allocated through RRC signaling and DCI, and may be allocated additionally through DCI. PUCCH resources for transmitting HARQ-ACK may also be allocated by RRC signaling allocating a SPS PDSCH and DCI. In addition, a resource of a PUCCH for a dynamically allocated PDSCH may be allocated by DCI. Accordingly, UCI and/or TB having a high priority may be indicated to the terminal through a plurality of RRC signaling(s) or DCIs.

(Method F.5-3): In (Method F.5-2), in order to multiplex UCI or TB having a high priority and UCI having a low priority, DCI(s) allocating the UCI with a high priority may indicate multiplexing, and a resource to be used for the multiplexing may be indicated by the lastly received DCI among the DCI(s).

When DCI is involved in allocating UCI and/or TB having a high priority, the UCI and/or TB having a high priority may be multiplexed in an uplink resource indicated by the DCI received at the last at the terminal. According to the indication of the corresponding DCI, also the UCI and/or TB having a low priority may be multiplexed in the corresponding uplink resource.

When an indication to multiplex UCI and/or TB having a low priority is received through the corresponding DCI, the terminal may multiplex all or part of the UCI and/or TB having a low priority in the corresponding uplink resource.

(Method F.5-4): After performing (Method F.5-1), if PUCCHs associated with low priority UCIs overlap in time with a virtual PUCCH, whether or not the corresponding UCIs are multiplexed may be sequentially determined.

(Method F.5-5): In (Method F.5-2), when UCI having a low priority is multiplexed, only some UCI types (or UCIs having a relatively high priority in the same UCI type) may be multiplexed with UCI or TB having a high priority.

The priority of the UCI type may be HARQ-ACK, SR, and CSI in an order of higher priorities. The CSI may be further classified according to a priority of a CSI report.

As an example, when it is necessary to determine whether an eMBB SR is to be multiplexed after a URLLC SR and a URLLC HARQ-ACK are multiplexed, the eMBB SR does not need to be transmitted, so that the eMBB SR may be dropped.

For example, when an eMBB SR is multiplexed after a URLLC HARQ-ACK is multiplexed, a multiplexing procedure may be determined in consideration of both the UCI type of the SR and the priority of eMBB/URLLC.

For example, when a URLLC SR and an eMBB SR are multiplexed, the URLLC SR and the eMBB SR may be included as one codeword or may be included as respective codewords.

For example, when it is necessary to determine whether or not an eMBB HARQ-ACK and an eMBB CSI are multiplexed after a URLLC HARQ-ACK is multiplexed, all of the eMBB CSI may not be transmitted. In this case, the multiplexed UCI may be considered according to the UCI type. Alternatively, some CSI report(s) having a low priority in the eMBB CSI may not be transmitted. In this case, the multiplexed UCI may be determined in consideration of both the UCI type and the relative priority.

In (Method F.5-4), if the PUCCHs associated with the low priority UCI overlap in time with a virtual PUCCH, whether or not the corresponding UCIs are multiplexed may be determined according to an order in which first symbols of PUCCHs associated with the corresponding UCIs arrive.

Meanwhile, (Method F.5-5) may be easily extended even when a TB is multiplexed. When it is determined whether or not an eMBB TB is multiplexed after a URLLC HARQ-ACK and a URLLC TB are multiplexed, all of the eMBB TB may not be transmitted.

(Method F.5-6): In (Method F.5-2), when UCI having a high priority and UCI having a low priority are multiplexed, a PUCCH resource for the multiplexing may be considered only within a set of PUCCH resources having a high priority.

When UCIs having the same priority are multiplexed, the terminal may determine a resource set of PUCCHs according to the amount of UCIs (i.e., the number of bits), and may determine one PUCCH resource belonging to the resource set of PUCCHs by additionally receiving an indication of a resource index of the PUCCH by DCI or RRC signaling. If UCIs of different priorities are multiplexed, the terminal may not determine the resource set of PUCCHs according to the calculated amount of UCIs because resource allocation for the high-priority UCI and the low-priority UCI may not be equally considered.

(Method F.5-7): In order to derive the amount of UCI, the terminal may consider a code rate.

For example, the amount of UCI having a high priority may be $x_1$ bits, a code rate applied thereto may be given as $r_1$, the amount of UCI having a low priority may be $x_2$ bits, and a code rate applied thereto may be given as $r_2$. In this case, the effective amount of UCI may be given as being divided by the code rate. Therefore, the derived effective amount of UCI may be given as $x=x_1+x_2\ r_2/r_1$, which may not be an integer. The value of x may be used to select a set of PUCCH resources when applying (Method F.5-6).

(6) Methods of Multiplexing PUCCH and UCI Transmitted in an Unlicensed Band

In a system operating in an unlicensed band, some or all of carriers may belong to the unlicensed band. When a carrier of a licensed band (i.e., uplink carrier or supplementary uplink (SUL) carrier) is configured, it is preferable to configure a PUCCH to be transmitted in a carrier of a licensed band in order to transmit UCI. However, when a PUSCH and a PUCCH are to be transmitted in the same time resource, the terminal may multiplex UCI and data in one PUSCH in order to reduce a PAPR and/or IMD. Accordingly, when a PUSCH is to be transmitted in an unlicensed band, UCI may not be transmitted in a licensed band, but may be multiplexed and transmitted in a PUSCH of an unlicensed band. Thereafter, the terminal may determine whether the PUSCH can be transmitted by using an LBT procedure. The base station may predict transmission of a PUSCH allocated by UL-DCI, but it is difficult to predict transmission of a PUSCH allocated by the T1/T2 CG scheme due to a UL skipping procedure. Therefore, the base station may not always avoid time resources of UCI and PUSCH (including at least a PUSCH allocated by the T1/T2 CG scheme) only by scheduling.

(Method F.6-1): The terminal may simultaneously transmit a PUCCH and a PUSCH in each carrier.

When a PUSCH is scheduled in an unlicensed band and a PUCCH is transmitted in a licensed band, the base station may allow the terminal to transmit the PUCCH and the PUSCH at the same time. In this case, when a transmission power of the terminal is sufficient, both a power indicated for transmitting the PUCCH and a power indicated for transmitting the PUSCH may be satisfied. However, when the transmission power of the terminal is insufficient, the terminal may transmit the PUSCH with a power that remains after allocating the transmission power indicated for transmitting the PUCCH as it is.

In order for the terminal to transmit a PUCCH and PUSCH at the same time, capability of the terminal should be separately managed and configured. To solve this, the terminal may transmit either a PUCCH or a PUSCH.

(Method F.6-2): While a PUCCH is transmitted, the terminal may not transmit a PUSCH.

The base station may perform scheduling so that the terminal does not transmit a PUSCH in an unlicensed band. However, since a PUSCH allocated by the T1/T2 CG scheme is not dynamically scheduled by the base station, the terminal may transmit the corresponding PUSCH in an unlicensed band. In this case, UCI may be multiplexed in the corresponding PUSCH. According to (Method F.6-2), the terminal may transmit only the PUCCH without transmitting the PUSCH. (Method F.6-2) may be applied to at least a CG PUSCH. In order for the terminal to transmit a PUSCH, a TB is delivered from a higher layer to a physical layer.

According to (Method F.6-2), if the MAC layer (or HARQ entity) determines that a time resource for transmitting UCI and a time resource for transmitting a PUSCH overlap, the higher layer may not deliver the TB to the physical layer.

In an example, even when the terminal receives UL-DCI, the MAC layer may not deliver a TB to the physical layer. In case of a CG PUSCH, the MAC layer may not transmit a TB to the physical layer. In another example, when the terminal receives UL-DCI, the MAC layer may deliver a TB to the physical layer, and in case of a CG PUSCH, the MAC layer may not transfer a TB to the physical layer.

G. PT-RS Transmission Methods (1) PT-RS Transmission Methods

A phase-tracking reference signal (PT-RS) is a pilot transmitted to compensate for a phase error in a system operating in the FR2. REs occupied by the PT-RS are limited to PDSCH and PUSCH regions, and the PT-RS is distinguished from a TRS transmitted irrespective of data allocation. Time resources and frequency resources to which the PT-RS is mapped are defined in the technical specification, and the base station may indicate a resource of the PT-RS to the terminal through RRC signaling.

A time resource of the PT-RS has a constant time interval from a symbol to which a DM-RS is lastly mapped. An MCS applied to a PUSCH is indicated by scheduling/activation DCI or RRC signaling for allocating the PUSCH. According to the technical specification, a time interval $L_{PT-RS}$ of the PT-RS is determined by the MCS, and Table 4 shows an example of the time intervals of the PT-RS according to the MCSs indicated for the PUSCH. When an MCS index is lower than a predetermined value, the PT-RS is not mapped. According to a range of an MCS index indicated to the terminal by higher layer signaling, $L_{PT-RS}$ is determined to be one of 1, 2, and 4. The higher the MCS index, the smaller the value of $L_{PT-RS}$ corresponds. This is because the higher a modulation order and a demodulation order, the more errors a phase has.

TABLE 4

| Scheduled MCS | Time density ($L_{PT-RS}$) |
|---|---|
| $I_{MCS}$ < ptrs-MCS$_1$ | PT-RS is not present |
| ptrs-MCS$_1$ ≤ $I_{MCS}$ < ptrs-MCS$_2$ | 4 |
| ptrs-MCS$_2$ ≤ $I_{MCS}$ < ptrs-MCS$_3$ | 2 |
| ptrs-MCS$_3$ ≤ $I_{MCS}$ < ptrs-MCS$_4$ | 1 |

Meanwhile, a frequency resource of the PT-RS may be PRBs having a predetermined interval among PRBs belonging to the PUSCH. According to the technical specification, such a frequency interval (or density $K_{PT-RS}$) is determined, and Table 5 shows an example of frequency densities of the PT-RS according to a bandwidth allocated to the PUSCH. If the allocated bandwidth is less than a predetermined value, the PT-RS is not mapped. According to a range of the bandwidth indicated to the terminal by higher layer signaling, $K_{PT-RS}$ is determined to be one of 2 and 4. The wider the bandwidth, the larger the value of $K_{PT-RS}$ corresponds, and the frequency density decreases.

TABLE 5

| Scheduled bandwidth | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

(2) Methods of Supporting T2 FDRA

A system operating in an unlicensed band requires waveform characteristics different from those of a licensed band in the time and frequency domains in order to satisfy various frequency regulations. That is, the base station or the terminal may use a resource only when it succeeds by performing an LBT procedure for the corresponding resource. A maximum time to use the resource is limited by the technical specification, and a minimum frequency bandwidth is also limited by the technical specification. Further, according to the technical specification, a maximum value of an average value of a power density in the band occupied by the base station or the terminal is determined. In order to satisfy these conditions, a PUCCH and PUSCH transmitted by the terminal have an interlace structure. The interlace structure refers to a structure of frequency resources in which PRBs are arranged at an equal interval. According to the technical specification, a type 2 resource allocation (T2 FDRA) allocating frequency resources of the PUSCH using index(es) of interlace(s) may be indicated to the terminal.

If a PUSCH in the FR2 supports the T2 FDRA, a PT-RS may also be configured for the terminal. The PT-RS may be mapped according to a resource allocation scheme for the PUSCH. In this case, according to the conventional PT-RS, since it follows a reference (e.g., mapping according to $K_{PT-RS}$) applied in a type 0 (T0) FDRA or a type 1 (T1) FDRA, it is difficult to determine a density of the PT-RS applied to the T2 FDRA.

(2.1) Interpretation of Time Density

In a PUSCH allocated by a T0 FDRA or T1 FDRA, a PT-RS may not be mapped to a region of a low MCS. However, since non-consecutive PRBs may be allocated according to a method of allocating an interlace by a T2 FDRA, a method of collectively compensating for a phase error by combining several PRBs in the frequency domain may not be applied.

(Method G.2-1): The PT-RS may be mapped even at low MCS.

For a PUSCH allocated by a T2 FDRA, a PT-RS may be required even at a low MCS depending on the capability of the terminal. According to the technical specification, a time density value of the PT-RS may be determined.

In a further proposed method, depending on the capability of the terminal, the PT-RS may be unnecessary at a low MCS. Therefore, it is preferable that a time density value of the PT-RS may be configurable in a region of the low MCS. For example, Table 6 shows an example of time densities of the PT-RS according to MCS indexes assigned to a PUSCH. Through RRC signaling, a MCS region is indicated to the terminal, and a time density of a PT-RS for the low MCS region is given as $r_0$. Here, the value of $r_0$ is indicated by RRC signaling, and may indicate that a PT-RS is absent or may indicate one value. $r_1$, $r_2$, and $r_3$ may have values determined by the technical specification.

TABLE 6

| Scheduled MCS | Time density |
|---|---|
| $I_{MCS}$ < ptrs-MCS$_1$ | $r_0$ |
| ptrs-MCS$_1$ ≤ $I_{MCS}$ < ptrs-MCS$_2$ | $r_1$ |
| ptrs-MCS$_2$ ≤ $I_{MCS}$ < ptrs-MCS$_3$ | $r_2$ |
| ptrs-MCS$_3$ ≤ $I_{MCS}$ < ptrs-MCS$_4$ | $r_3$ |

(2.2) Interpretation of Frequency Density (Method G.2-2): A value of a frequency density of PT-RS may be determined using at least the number of PRBs of a PUSCH.

An interlace indicated by a T2 FDRA is composed of a plurality of PRBs. The number of PRBs constituting an interlace is determined according to an uplink BWP. A value of a frequency density of a PT-RS may be determined using the number of PRBs at this time. When a PUSCH is composed of M PRBs, a range to which M belongs is determined by a rule (e.g., Table 5) defined in the technical specification, and accordingly, the frequency density of the PT-RS may be given as one value. The PUSCH is allocated by a T2 FDRA, and may be indicated as one or more interlace(s). A value of M may be determined based on a subcarrier spacing of the PUSCH, the number of interlace(s), and a bandwidth of the uplink BWP.

Figure 48:
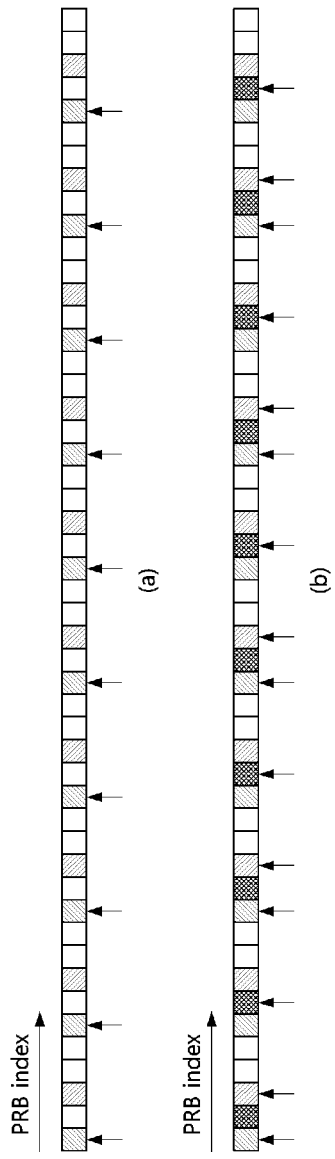
FIG. 48 is a conceptual diagram illustrating schemes in which a PT-RS is mapped according to an exemplary embodiment of the present disclosure.

FIG. 48 is a conceptual diagram illustrating schemes in which a PT-RS is mapped according to an exemplary embodiment of the present disclosure.

When a value (e.g., k) of a frequency density of PT-RS is determined, the PT-RS is mapped for every k PRBs among PRBs to which the PUSCH is allocated. When k=1 is indicated, the PT-RS may be mapped to all PRBs belonging to the PUSCH. FIG. 48 shows examples of PT-RS mapping according to (Method G.2-2) when k=2 is indicated. In a case (a), the PT-RSs may be mapped at the same interval. This is because the number of interlaces and k have the same value. In a case (b), the PT-RS may be mapped at different intervals. This is because the number of interlaces and k have different values.

(Method G.2-3): A value of a frequency density of PT-RS may be determined using at least the number of interlace(s) of a PUSCH.

A value of a frequency density of PT-RS may be given as a function of the number of interlaces rather than the number of PRBs of a PUSCH. According to (Method G.2-3), since a T2 FDRA allocates interlace(s), one interlace has a feature that it is mapped to an entire LBT subband, and the bandwidth to which the PUSCH is allocated include at least one LBT subband. When the PUSCH is allocated in two or more LBT subbands, one interlace means PRBs mapped at the same interval in all the allocated LBT subbands. The number of PRBs of the PUSCH is limited to a predetermined number, and these are determined by the number of allocated interlaces and the number of allocated LBT subbands.

When the value (e.g., k) of the frequency density of PT-RS is determined, the PT-RS is mapped for every k interlaces based on the interlaces to which the PUSCH is allocated. That is, k is selected for the interlace(s), and the PT-RSs are mapped only to PRBs belonging to the selected interlace(s). According to DCI/RRC signaling for allocating the PUSCH, it may be determined to which interlace(s) the PT-RSs can be mapped. Here, a sequence for generating the PT-RS may be mapped in the order of the PRB indexes.

TABLE 7

| Scheduled number of interlaces | Frequency density |
|---|---|
| $N_{RB}$ < $N_{RB0}$ | $k_0$ |
| $N_{RB0}$ ≤ $N_{RB}$ < $N_{RB1}$ | $k_1$ |
| $N_{RB1}$ ≤ $N_{RB}$ | $k_2$ |

Table 7 shows an example in which (Method G.2-3) is applied. The base station indicates, to the terminal, ranges of the number of interlace(s) through RRC signaling so that the number of interlace(s) constituting the PUSCH always belongs to one of the predetermined ranges. The predetermined range may mean an interval between interlaces to which the PT-RS is mapped. According to Table 7, the intervals between interlaces may be assumed as $k_0$, $k_1$, or $k_2$, the PT-RS may be mapped to such the interlace(s), and the values of $k_0$, $k_i$, or $k_2$ may be determined by the technical specification.

In a proposed method, the PT-RS may not be mapped to a PUSCH composed of less than a predetermined number of interlaces. That is, $k_0$ may mean that the PT-RS is not mapped.

In a proposed method, even when one interlace is allocated, the PT-RS may be mapped. That is, the value of $k_0$ may be a natural number of 1 or more.

(Method G.2-4): A value of a frequency density of PT-RS may be determined regardless of the number of interlace(s) of a PUSCH.

A PT-RS may be mapped even to a PUSCH to which one interlace is allocated. In this case, whether the PT-RS is mapped may be determined according to a MCS indicated for the PUSCH. Even when two or more interlaces are allocated to the PUSCH, the PT-RS may be mapped to PRB(s) belonging to one interlace. According to DCI/RRC signaling that allocates the PUSCH, it may be determined to which interlace the PT-RS can be mapped.

(3) Example of PUSCH Repetition Type B

In order to transmit traffic for the purpose of low latency and high reliability, the base station may indicate repetitive PUSCH transmission to the terminal. When the PUSCH repetition type B is indicated to the terminal, the terminal may transmit a PUSCH occasion. In addition, (in)valid(s) may be indicated to the terminal, and the terminal may need to map PUSCH instance(s) using only valid symbol(s). In this process, split PUSCH instance(s) may be generated, and in this case, a MCS indicated to the terminal may be interpreted differently.

(Method G.3-1): A PT-RS may be mapped based on a PUSCH occasion.

In the PUSCH repetition type B, the same data is repeatedly transmitted. Therefore, a PUSCH occasion may be interpreted as one PUSCH. The PT-RS may not be mapped at a low MCS. In one full PUSCH instance constituting the PUSCH occasion, although the PT-RS should be mapped according to a high code rate of the full PUSCH instance (e.g., small L), the PT-RS may not be mapped because an effective code rate derived in the PUSCH occasion is low (e.g., large K). That is, if the number of symbols (L) of the PUSCH instance is small but the number of repetitions (K) is large, the PT-RS may be mapped while the MCS applied to the PUSCH instance exceeds a threshold value, but depending on the total amount of resources of the PUSCH occasion, an effective MCS may be smaller than the threshold value, whereby the PT-RS may not be mapped.

In order to support this more efficiently, the PT-RS may be mapped to all REs allocated to the PUSCH occasions. A time density of the PT-RS may be applied from a DM-RS of a first PUSCH instance of the PUSCH occasion. Symbol(s) to which the PT-RS is mapped may belong to valid symbol(s) in a time window of the PUSCH occasion. When the DM-RS is located in a symbol to which the PT-RS is to be mapped, the PT-RS may not be mapped to the symbol in which the DM-RS is located.

The MCS for determining the time density of PT-RS may be derived from the number of REs actually utilized in the PUSCH occasion. That is, since a modulation order is not changed, but a code rate is changed according to the number of valid symbol(s), the actually applied modulation/demodulation order may be derived. When the actually applied modulation/demodulation order is derived, the time density for mapping the PT-RS is determined according to which MCS index range the modulation/demodulation order belongs.

(Method G.3-2): A PT-RS may be mapped based on a PUSCH instance.

When a MCS is included in DCI/RRC signaling that allocates a PUSCH occasion, the PT-RS may be mapped using this as it is. That is, an MCS applied to a full PUSCH instance may be a reference. If the PT-RS is transmitted, the PT-RS may be mapped to a PUSCH instance.

When some split PUSCH instances are generated due to invalid symbol(s) indicated to the terminal, additional optimization may not be performed. That is, whether a PT-RS is mapped to a split PUSCH instance is determined according to a full PUSCH instance.

H. SRS Transmission Methods (1) Methods of Transmitting SRS in an Unlicensed Band A resource for transmitting a sounding reference signal (SRS) (hereinafter referred to as 'SRS resource') may be composed of one or more SRS symbol(s). The SRS may be transmitted when an LBT procedure is successful. The base station may indicate the SRS resource to the terminal through higher layer signaling. The SRS resource may be configured periodically or semi-statically or indicated dynamically.

According to the conventional technical specification, a case in which an SRS and a PUCCH/PUSCH are transmitted in the same subframe (or slot) and a case in which an SRS and a PUCCH/PUSCH are transmitted in different subframes (or slots) may be distinguished. The SRS resource may be indicated from the base station to a specific terminal by using DCI that allocates a PDSCH/PUSCH, or may be indicated by using DCI that triggers transmission of the SRS to one or more terminals.

The case in which both an SRS and a PUCCH/PUSCH are included in the same subframe (or slot) is considered. When an SRS resource is allocated to a last symbol(s) of a subframe (or slot) according to the conventional technical specification, a PUCCH/PUSCH and an SRS are time division multiplexed, and the PUCCH/PUSCH is transmitted first and then the SRS is transmitted. Accordingly, when the terminal successfully performs an LBT procedure before a first symbol of a PUCCH/PUSCH, the terminal may transmit the PUCCH/PUSCH and subsequently transmit the SRS. However, when the terminal performs an LBT procedure, and the LBT procedure fails, the terminal may not transmit the PUCCH/PUSCH. In this case, in case of a periodic SRS, whether the SRS is transmitted depends on a result of performing a C4 LBT procedure (or type 1 LBT procedure). When the terminal succeeds by retrying an LBT procedure before a first symbol of the SRS resource, the terminal may transmit the SRS. When the LBT procedure fails again, the terminal may not transmit the SRS. Alternatively, the terminal may perform LBT procedures in all SRS symbol(s) belonging to the SRS resource, and the terminal may transmit the SRS in remaining symbol(s) from a first symbol in which the LBT procedure is successful. When the LBT procedures fail in all the SRS symbol(s) belonging to the SRS resource, the terminal may not transmit the SRS.

(2) Channel Access Methods for SRS Resources (2.1) Methods of Allowing or Restricting an Order of Consecutive Uplink Transmissions in the Time Domain If an SRS resource can be started from an arbitrary symbol, this is a resource allocation that has not been considered in the conventional technical specification, and thus the conventional technical specification may not be easily extended. This is because an SRS resource can be started before a PUCCH/PUSCH if the SRS resource can be started in an arbitrary symbol. That is, the terminal may be indicated to start uplink transmission with an SRS. In this case, a channel access method for an SRS resource is required.

The base station may indicate to the terminal a CP extension (CPE) and a scheme of LBT procedure by using DCI. Here, a C4 LBT or a C2 LBT may be indicated as the scheme of LBT procedure. When the terminal transmits a PUCCH for a PDSCH or transmits a PUSCH, the terminal may apply the CP extension and the scheme of LBT procedure (i.e., C2 LBT, C4 LBT, or channel access priority class (CAPC)) to a first symbol of the PUCCH or the PUSCH, or before the first symbol.

The base station may trigger the corresponding terminal to transmit the SRS. The time resource in which the SRS is transmitted may be indicated (or configured) to the terminal through higher layer signaling. As a triggering scheme, scheduling DCI or group-common DCI (e.g., DCI format 2_3) may be used. One index may be indicated to the terminal in a field of the DCI triggering the transmission of the SRS. The terminal may know from the received index what SRS resource to use to transmit the SRS. Thereafter, the terminal may transmit the SRS in the corresponding time resource (i.e., symbol(s) and slot) of the SRS resource.

The first symbol of the SRS resource may not be indicated by the DCI. In this case, a time resource of the PUSCH/PUCCH may not be adjacent to the time resource of the SRS. In particular, the SRS resource indicated by the base station to the terminal and the PUSCH/PUCCH may have a larger interval than a predetermined time (e.g., several us). Here, the predetermined time may be specified in the technical specification (e.g., 3GPP TS37.213, etc.). If the SRS resource and the PUSCH/PUCCH have a larger interval than the predetermined time, an LBT procedure may have to be performed for transmission of the PUSCH/PUCCH (when the SRS is transmitted first).

Figure 49:
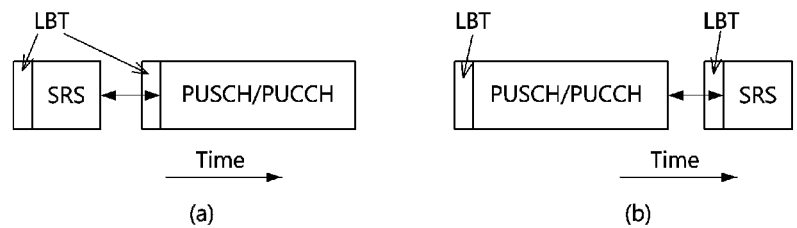
FIG. 49 is a conceptual diagram illustrating a time domain relationship between an SRS and a PUSCH/PUCCH according to an exemplary embodiment of the present disclosure.

FIG. 49 is a conceptual diagram illustrating a relationship in time between an SRS and a PUSCH/PUCCH according to an exemplary embodiment of the present disclosure.

In a case (a) of FIG. 49, the transmit may first transmit an SRS by performing an LBT procedure, and then perform an LBT procedure again to transmit a PUSCH/PUCCH. In a case (b) of FIG. 49, the order is reversed.

Here, a channel access method for SRS may follow a method indicated by DCI (e.g., ul-dci-triggered-UL-ChannelAccess-CPext-CAPC of the DCI). Accordingly, a channel access scheme for SRS (i.e., type 1 channel access or type 2/2A/2B/2C channel access), whether or not a CP extension is applied, an index of a length value of the CP extension, and/or a channel access priority class (CAPC) may be indicated to the terminal. Here, a plurality of values may be indicated (or configured) to the terminal by RRC signaling, and one value may be given by DCI to the terminal as an index. However, the channel access scheme for SRS indicated by the DCI may not be applied to transmission of a PUSCH/PUCCH.

For example, in the case (a), a channel access scheme, CP extension, and/or CAPC for a PUSCH/PUCCH transmitted later among the SRS resource and the PUSCH/PUCCH, which are not contiguous, may not be indicated. This is because the channel access scheme for the PUSCH/PUCCH may vary according to the terminal's determination as to whether the PUSCH/PUCCH is transmitted within a channel occupancy time (COT) secured by the base station or outside the COT. A CP of a first symbol of the PUSCH/PUCCH may not be extended. The CAPC may follow the value included in the DCI.

Alternatively, the channel access scheme for the PUSCH/PUCCH may follow the scheme indicated by the DCI (e.g., ul-dci-triggered-UL-ChannelAccess-CPext-CAPC of the DCI). Accordingly, the channel access scheme for the PUSCH/PUCCH (i.e., type 1 channel access or type 2/2A/2B/2C channel access), CP extension, and/or channel access priority class (CAPC) may be indicated to the terminal. However, the channel access scheme for the PUSCH/PUCCH indicated by the DCI may not be applied to transmission of the SRS.

For example, in the case (b), a channel access scheme, CP extension, and/or CAPC for an SRS transmitted later among the PUSCH/PUCCH and the SRS which are not contiguous may not be indicated. This is because the channel access scheme for the SRS may vary according to the terminal's determination as to whether the SRS is transmitted within a COT secured by the base station or outside the COT. The CP extension may be applied to the SRS.

(Method H.2-1): As a channel access scheme for an SRS resource indicated to have a longer interval with a PUSCH/PUCCH than a predetermined time, a type 1 channel access scheme (i.e., C4 LBT) may be applied outside a COT of the base station, and a type 2 channel access scheme (i.e., C2 LBT) may be applied within the COT of the base station.

In order to transmit the SRS, the terminal may observe a COT indicator from the base station. The COT indicator may be included in DCI of a specific format (e.g., DCI format 2_0) broadcast to a plurality of unspecified terminals. The base station may indicate (or configure) the terminal to observe the COT indicator using higher layer signaling. The terminal may know a structure of the COT secured by the base station by using the COT indicator, and may identify whether the time resource of the SRS belongs to the COT of the base station. According to (Method H.2-1), the LBT procedure for transmitting the SRS may vary depending on whether the time resource of the SRS belongs to the COT of the base station. If the time resource of the SRS belongs to the COT of the base station, the terminal may perform a type 2/2A/2B/2C channel access to perform sensing for a shorter time (than a time required for a type 1 channel access). On the other hand, if the time resource of the SRS does not belong to the COT of the base station, the terminal may determine whether to transmit the SRS by performing a type 1 channel access.

On the other hand, the terminal may not be indicated to observe the COT indicator from the base station. In this case, since the terminal would never know the COT of the base station, it is preferable that the terminal always performs a C4 LBT procedure when the terminal transmits the SRS only. Since the scheme of the LBT procedure for PUSCH/PUCCH is indicated to the terminal by scheduling DCI, the terminal may perform a type 1 channel access (i.e., C4 LBT) or a type 2/2A/2B/2C channel access (i.e., C2 LBT).

(Method H.2-2): A type 1 channel access scheme (i.e., C4 LBT) may be applied as a channel access scheme for an SRS resource indicated to have a longer interval with a PUSCH/PUCCH than a predetermined time.

Here, when the SRS resource is composed of two or more symbols, the terminal may perform an LBT procedure for each symbol or an LBT procedure only at the first symbol of the SRS resource.

(Method H.2-3): When a type 1 channel access is performed on an SRS resource in (Method H.2-1) or (Method H.2-2), the type 1 channel access may be performed for each symbol belonging to the SRS resource.

(Method H.2-4): When a type 1 channel access is performed on an SRS resources in (Method H.2-1) or (Method H.2-2), the type 1 channel access may be performed only for the first SRS symbol belonging to the SRS resource.

According to configuration and DCI of the base station, the SRS resource and the PUSCH/PUCCH indicated to the terminal may have a smaller interval than a predetermined time. To this end, the base station should schedule the SRS resource and the PUSCH/PUCCH to be transmitted in the same slot, and the SRS resource and the PUSCH/PUCCH should be consecutive. For convenience of description, the SRS and PUSCH/PUCCH that are continuously transmitted with a smaller interval than a predetermined time may be referred to as 'consecutive uplink transmissions'.

The consecutive uplink transmissions refer to uplink transmissions in which a gap not larger than 16 us is allowed. Uplink transmissions with an interval greater than 16 us are regarded as different transmissions, and they are not expressed as consecutive uplink transmissions. The terminal may perform uplink transmission after an interval without performing a channel access procedure for different uplink transmissions having an interval of 16 us or less. As a method for the terminal to receive an indication of the consecutive uplink transmissions from the base station, a PUSCH indicated from one or more UL grant(s) may be included, a PUCCH indicated from one or more DL grant(s) (i.e., DCI or semi-persistent scheduling) may be included, or an SRS indicated from one or more UL grant(s) or DL grant(s) may be included.

(Method H.2-5): The terminal may be indicated to transmit an SRS later in consecutive uplink transmissions.

Figure 50:
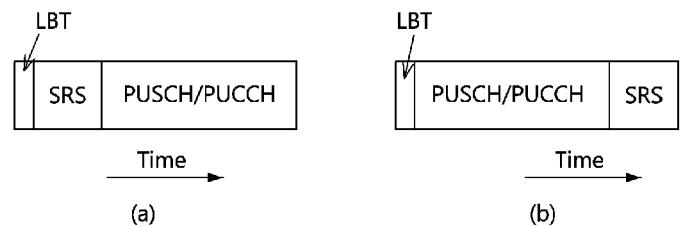
FIG. 50 is a conceptual diagram illustrating a time domain relationship between an SRS and a PUSCH/PUCCH in consecutive uplink transmissions according to an exemplary embodiment of the present disclosure.

FIG. 50 is a conceptual diagram illustrating a relationship in time between an SRS and a PUSCH/PUCCH in consecutive uplink transmissions according to an exemplary embodiment of the present disclosure.

The terminal may assume that an SRS is indicated to be transmitted later than a PUSCH/PUCCH in consecutive uplink transmissions. According to (Method H.2-5), a case (a) of FIG. 50 may not be allowed, only a case (b) of FIG. 50 may be allowed, and the base station may indicate only such scheduling to the terminal. The reason is that the base station estimates an uplink channel using the SRS resource, and the later the SRS is received, the later an acquisition time of a channel estimation result is delayed. In addition, a scheme of LBT procedure for the SRS resource may be indicated by scheduling DCI, but the scheme of LBT procedure for the SRS resource may be indicated also by group-common DCI. In this case, a type 1 channel access may be performed on the SRS resource. Meanwhile, according to (Method H.2-5) in which the PUSCH/PUCCH is indicated to be transmitted first in consecutive uplink transmissions, when the PUSCH/PUCCH is transmitted, a type 2 channel access or LBT procedure may be omitted when the terminal transmits the SRS.

(2.2) A Scheme of LBT Procedure Applied when an SRS Leads in Consecutive Uplink Transmissions According to (Method H.2-5), there may be a restriction on a time resource in which an SRS can be transmitted. Since an SRS may be used not only for channel estimation but also for beam management, it is preferable to allow a case in which the SRS is first transmitted in consecutive uplink transmissions. The methods to be described later may be applied when both the cases (a) and (b) of FIG. 50 can be supported in consecutive uplink transmissions.

DCI for triggering an SRS and DCI for allocating a PUSCH/PUCCH for consecutive uplink transmissions may be the same or different from each other. Since a slot in which the SRS is triggered may be indicated (or configured) to the terminal by higher layer signaling, the slot in which the SRS is triggered may be different from a slot in which the PUSCH/PUCCH is allocated.

Figure 51:
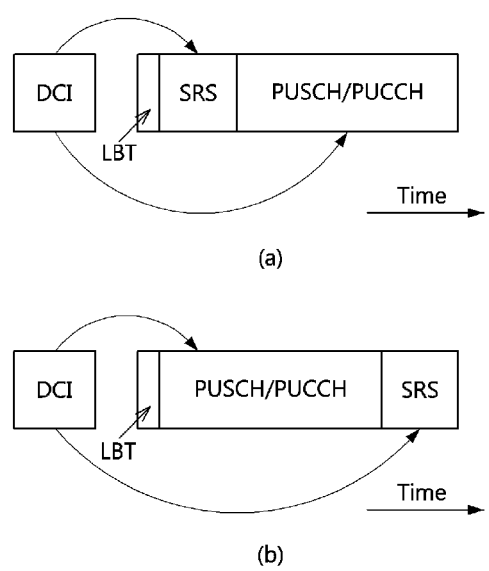
FIGS. 51 to 53 are conceptual diagrams for describing a method of allocating an SRS and a PUSCH/PUCCH in consecutive uplink transmissions according to an exemplary embodiment of the present disclosure.
Figure 52:
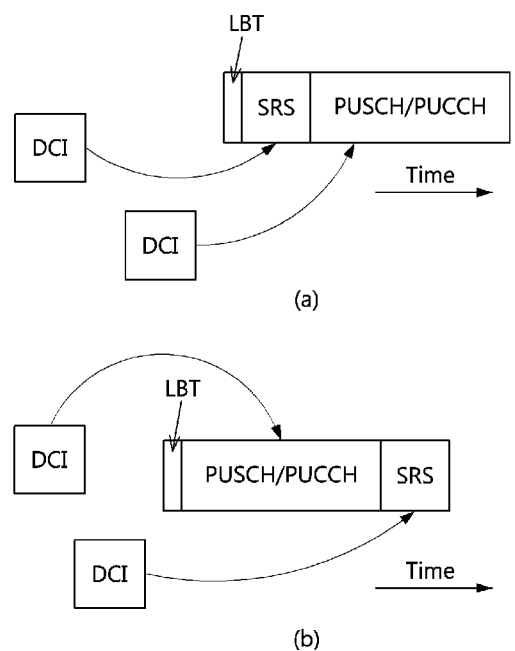
Figure 53:
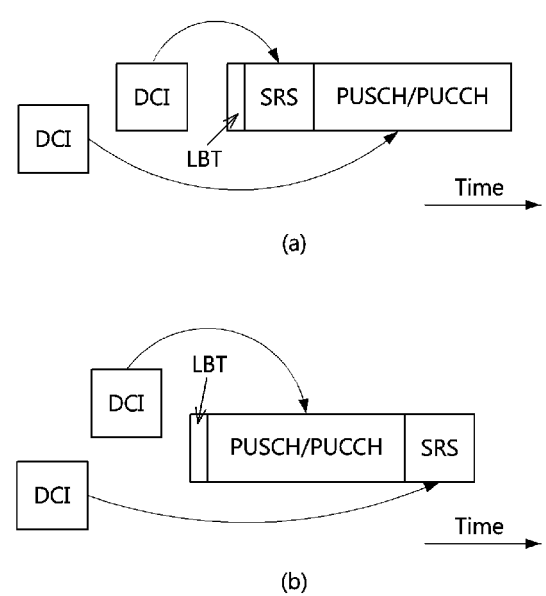

FIGS. 51 to 53 are conceptual diagrams for describing a method of allocating an SRS and a PUSCH/PUCCH in consecutive uplink transmissions according to an exemplary embodiment of the present disclosure.

Referring to FIG. 51, according to configuration of the base station, a slot in which an SRS is triggered and a slot in which a PUSCH/PUCCH is transmitted may be the same. In this case, one DCI may allocate both the SRS and PUSCH/PUCCH belonging to consecutive uplink transmissions.

In addition, the terminal may receive two DCIs including DCI for triggering the SRS and DCI for allocating the PUSCH/PUCCH. A case in which time resources allocated by the two DCIs are consecutive (i.e., when they are consecutively located with a smaller interval than a predetermined time) may be interpreted as consecutive uplink transmissions. FIG. 52 shows a case in which an order in which the two DCIs are transmitted is the same as an order in which the SRS and PUSCH/PUCCH are transmitted, and FIG. 53 shows a case in which the order in which the two DCIs are transmitted is different from the order in which the SRS and PUSCH/PUCCH are transmitted.

In this case, a scheme of LBT procedure (i.e., channel access scheme, CP extension, and/or CAPC) applied to the consecutive uplink transmissions may be indicated by the DCI received by the terminal. In order to apply this, the methods described below may be considered.

(Method H.2-6): A scheme of the LBT procedure applied to consecutive uplink transmissions may be indicated by scheduling DCI allocating a PUSCH/PUCCH of the consecutive uplink transmissions.

In a case (a) of FIG. 51, a case (a) of FIG. 52, and a case (a) of FIG. 53, an LBT procedure performed by the terminal to transmit an SRS may follow a scheme indicated by DCI allocating a PUSCH/PUCCH. In a case (b) of FIG. 51, a case (b) of FIG. 52, and a case (b) of FIG. 53, an LBT procedure performed by the terminal to transmit a PUSCH/PUCCH may follow a scheme indicated by DCI allocating a PUSCH/PUCCH.

The DCI triggering the SRS may allocate not only the SRS but also a PUSCH/PUCCH. In this case, an LBT scheme indicated by the DCI triggering the SRS may be suitable for the PUSCH/PUCCH, not an SRS resource. Accordingly, the terminal may receive, from another DCI, an indication of a scheme of LBT procedure for transmitting the SRS.

(Method H.2-7): When applying (Method H.2-6), if a time between DCI allocating a PUCCH/PUSCH and a first symbol of consecutive uplink transmissions is indicated to be shorter than a predetermined processing time, in case that the consecutive uplink transmissions start with an SRS, the terminal may use a type 1 channel access or an LBT scheme indicated by DCI triggering the SRS in an LBT procedure for transmission of the SRS.

When the base station indicates the terminal to transmit a PUCCH/PUSCH, the terminal may be given a predetermined processing time determined by higher layer signaling and/or processing capability of the terminal. The terminal may transmit the PUSCH/PUCCH after the predetermined processing time elapses. When the SRS is first located in consecutive uplink transmissions, a time for applying (Method H.2-6) (i.e., time for identifying an LBT scheme to be applied to the consecutive uplink transmissions by processing DCI allocating the PUSCH/PUCCH) may be insufficient, and thus it may be difficult for the terminal to identify the LBT scheme to be applied to the SRS resource. In this case, the terminal may apply (Method H.2-7) to transmit the SRS. The terminal may perform a type 1 channel access by assuming that only the SRS is transmitted. Alternatively, the terminal may assume that the scheme for LBT procedure for the SRS resource is indicated through another scheme (i.e., DCI triggering the SRS).

The base station may assume that the scheme of LBT procedure for the SRS resource and PUCCH/PUSCH configured to the terminal is not changed by another DCI. In this case, each DCI for consecutive uplink transmissions may be used only to determine a scheme of LBT procedure for a corresponding UL channel/signal. More specifically, if some uplink transmissions in consecutive uplink transmissions are not performed according to a result of the LBT procedure, a scheme of LBT procedure applied to the subsequent uplink transmission may be indicated by DCI corresponding to the corresponding uplink transmission.

(Method H.2-8): An indication of the base station for an LBT scheme applied to an uplink signal/channel to be transmitted first by the terminal among uplink signals/channels that have not yet failed in LBT procedures while belonging to consecutive uplink transmissions may follow DCI for allocating the corresponding uplink signal/channel.

For example, in consecutive uplink transmissions, an SRS resource and a PUSCH/PUCCH are sequentially allocated, and a time interval between them may be allocated to be a predetermined value or less. When (Method H.2-8) is applied, an LBT scheme for transmitting the SRS resource is determined according to DCI that triggered the SRS resource. If an LBT procedure performed by the terminal is successful, the terminal may transmit an SRS and then transmit the PUSCH/PUCCH without performing an additional LBT procedure. If the LBT procedure performed by the terminal fails, the terminal may not transmit the SRS and derives a LBT scheme from the DCI allocating the PUSCH/PUCCH. The terminal may perform an LBT procedure and may or may not transmit the PUSCH/PUCCH according to a result of the LBT procedure.

This may be equally applied even when the PUSCH/PUCCH and the SRS resource are sequentially allocated in consecutive uplink transmissions. The terminal performs an LBT procedure before performing transmission of the PUSCH/PUCCH. If the LBT procedure is successful, the terminal transmits both the PUSCH/PUCCH and SRS belonging to the consecutive uplink transmissions, but if the LBT procedure fails, only the PUSCH/PUCCH may not be transmitted. The terminal transmits or does not transmit the SRS by performing an LBT procedure for the SRS resource remaining in the consecutive uplink transmissions. Here, the LBT scheme for the PUSCH/PUCCH or SRS resource is determined according to DCI allocating each.

When (Method H.2-8) is applied, an uplink signal/channel that fails the LBT procedure among the uplink signals/channels constituting the consecutive uplink transmissions may not be transmitted. A subsequent uplink signal/channel may still be regarded as belonging to the consecutive uplink transmissions, and according to (Method H.2-8), the terminal may perform channel access by applying a scheme of LBT procedure indicated by the DCI allocating the uplink signal/channel to be transmitted. In this case, CP extension may not be applied to a subsequent uplink signal/channel other than the first uplink signal/channel of the consecutive uplink transmissions.

When (Method H.2-8) is applied, it may be difficult for the base station to indicate a type 2/2A/2B/2C channel access to the terminal. The reason is that in order to perform a type 2/2A/2B/2C channel access, it is necessary to predict a COT of the base station, but in general, this prediction is not accurate. Therefore, it is preferable that the scheme of LBT procedure can be changed in the future.

To solve this problem, for two or more DCIs that allocate consecutive uplink transmissions, the base station may transmit new DCI that changes the scheme of LBT procedure indicated by the previously transmitted DCI. The new DCI may not change the trigger of the SRS or resource allocation of the PUSCH/PUCCH, but may change the scheme of LBT procedure.

(Method H.2-9): A scheme of an LBT procedure applied to consecutive uplink transmissions may follow a lastly received DCI.

For consecutive uplink transmissions, an SRS may be allocated first and then a PUSCH/PUCCH may be allocated, or a PUSCH/PUCCH may be allocated first and then an SRS may be allocated. However, an reception order of the respective Das allocating them may be different. When (Method H.2-9) is applied, schemes of LBT procedures applied to the consecutive uplink transmissions may be determined by the DCIs in the reverse order of reception orders of the DCIs. When (Method H.2-9) is applied when consecutive uplink transmissions are performed using DCI allocating the SRS and DCI allocating the PUSCH/PUCCH, the scheme of the LBT procedure for transmission of the SRS may be indicated by the DCI allocating the PUSCH/PUCCH. Similarly, the scheme of the LBT procedure for transmission of the PUSCH/PUCCH may be indicated by the DCI triggering the SRS.

(Method H.2-10): In case of applying (Method H.2-9), when a time between DCI allocating a PUCCH/PUSCH and a first symbol of consecutive uplink transmissions is indicated to be shorter than a predetermined processing time, and the consecutive uplink transmission start with an SRS, the terminal may use a type 1 channel access in an LBT procedure, or may applying a scheme of LBT procedure indicated by DCI triggering an SRS.

Since the terminal can decode DCI and transmit a PUCCH/PUSCH using a predetermined processing time, (Method H.2-10), as in (Method H.2-7), needs to define an operation taking into account a processing time of the terminal. That is, when an SRS resource is located first in consecutive uplink transmissions, the time for applying (Method H.2-9) (i.e., time for identifying the LBT scheme to be applied to the consecutive uplink transmission by processing DCI allocating the PUSCH/PUCCH) may be insufficient, and thus it may be difficult for the terminal to identify the LBT scheme to be applied to the SRS resource. In this case, in order for the terminal to transmit the SRS, (Method H.2-10) may be applied. The terminal may perform a type 1 channel access by assuming that only the SRS is transmitted. Alternatively, the terminal may assume that the scheme of LBT procedure for the SRS resource is indicated through another scheme (i.e., DCI triggering the SRS).

(3) Methods of Indicating Application of CP Extension to SRS Resource in DCI

The scheme of LBT procedure applied to the SRS resource may be indicated to the terminal through DCI. If a type 2 channel access is indicated for the SRS resource, the type 2 channel access may be applied from a first symbol of the SRS resource. However, when the SRS resource is composed of two or more symbols, and the terminal fails the LBT procedure in the first symbol of the SRS resource, the scheme of LBT procedure indicated by the DCI may not be applied as it is. In this case, another scheme of type 2 channel access may be applied. When the LBT procedure according to a type 2B channel access or type 2C channel access indicated by DCI fails, the terminal may perform a type 2A channel access for the second or subsequent SRS symbol(s).

The case in which the SRS is transmitted first in consecutive uplink transmissions (i.e., case (a) of FIG. 51, case (a) of FIG. 52, case (a) of FIG. 53) is considered. However, consecutive uplink transmissions are not necessarily assumed, and the following methods (methods for the case in which the SRS is located first) may be applied even when only the SRS is transmitted.

(Method H.2-11): If an LBT procedure fails in a first symbol of an SRS resource, the terminal may not transmit an entire SRS and a PUSCH/PUCCH.

By interpreting consecutive uplink transmissions as one uplink transmission, the terminal may or may not transmit all of the consecutive uplink transmissions. According to (Method H.2-11), depending on the result of the LBT procedure, the terminal may not allow a kind of puncturing for the consecutive uplink transmissions.

However, when the SRS resource is composed of two or more symbols, some SRS symbol(s) may be transmitted according to the result of the LBT procedure. In this case, (Method H.2-12) may be applied.

(Method H.2-12): If an LBT procedure performed in a first symbol of an SRS resource fails, the terminal may perform an LBT procedure (e.g., type 1, type 2, or type 2A channel access) in the remaining symbol(s) of the SRS resource, transmit the SRS in an SRS symbol in which the LBT procedure is successful and SRS symbol(s) after that, and transmit the PUSCH/PUCCH.

Meanwhile, the case in which the PUSCH/PUCCH is transmitted first in consecutive uplink transmissions (i.e., case (b) of FIG. 51, case (b) of FIG. 52, case (b) of FIG. 53) is considered.

(Method H.2-13): If an LBT procedure performed in a first symbol of a PUSCH/PUCCH fails, the terminal may not transmit the PUSCH/PUCCH, and may perform an LBT procedure (i.e., type 1 or type 2/2A/2B/2C channel access) in a first symbol of an SRS resource. If the LBT procedure fails, the terminal does not transmit the entire SRS.

(Method H.2-14): If an LBT procedure performed in a first symbol of a PUSCH/PUCCH fails, the terminal may not transmit the PUSCH/PUCCH, and may perform an LBT procedure (i.e., type 1 or type 2/2A/2B/2C channel access). If the LBT procedure fails, the terminal may perform an LBT procedure (i.e., type 1 channel access or type 2A channel access) again to transmit the SRS in an SRS symbol in which the LBT procedure is successful and SRS symbol(s) after that.

When application of CP extension to the SRS resource is indicated, the terminal may extend the CP of the first SRS symbol to be transmitted in the SRS resource. The DCI may indicate the length of the extended CP as one of a plurality of values.

Figure 54:
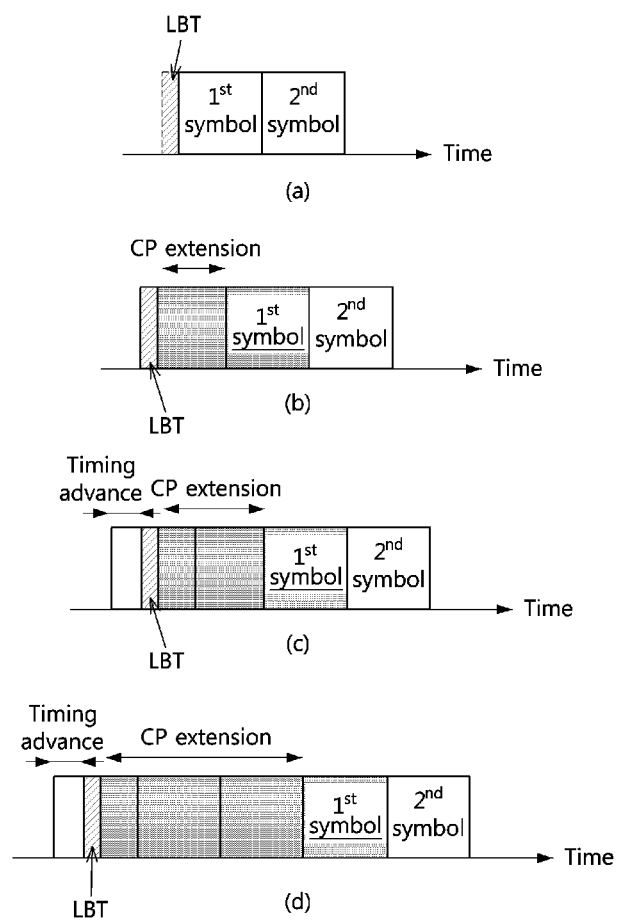
FIG. 54 is a conceptual diagram illustrating SRS symbols to which CP extension is applied according to an exemplary embodiment of the present disclosure.

FIG. 54 is a conceptual diagram illustrating SRS symbols to which CP extension is applied according to an exemplary embodiment of the present disclosure.

In FIG. 54, an example of an SRS resource composed of two symbols is shown. When an SRS is transmitted from the second SRS symbol of the SRS resource or the SRS symbol thereafter, the CP may not be extended and the SRS may be transmitted at the position of the symbol(s) included in the SRS resource.

A case (a) shows a case where CP extension is not performed. The case (a) may correspond to a case where it can be assumed that the terminal does not perform the LBT procedure to transmit the SRS, or that a previous symbol is not occupied by another base station, terminal, or node. This is because a channel is sensed in a previous symbol period in order to match a time at which the LBT procedure ends to a symbol boundary.

In a case (b), the terminal may apply CP extension. The terminal may transmit a CP derived from the first SRS symbol in C1 symbol(s) located in front of the SRS resource. The value of C1 is defined by the technical specification, and the value of C1 may be defined as 1 when a subcarrier spacing of the SRS resource is 15 kHz, and may be defined as 2 when the subcarrier spacing of the SRS resource is 30 kHz. In the case (b) of FIG. 54, a case where C1 is given as 1 is shown.

In a case (c), the terminal may apply CP extension. The terminal may transmit a CP derived from the first SRS symbol in C2 symbol(s) located in front of the SRS resource. The value of C2 may be indicated to the terminal through higher layer signaling. In the case (c) of FIG. 54, a case where C2 is given as 2 is shown.

In a case (d), the terminal may apply CP extension. The terminal may transmit a CP derived from the first SRS symbol in C3 symbol(s) located in front of the SRS resource. The value of C3 may be indicated to the terminal through higher layer signaling. In the case (d) of FIG. 54, a case where C3 is given as 3 is shown.

FIG. 55 is another conceptual diagram illustrating SRS symbols to which CP extension is applied according to an exemplary embodiment of the present disclosure.

In FIG. 55, for convenience of description, an example of an SRS resource composed of two symbols is shown. When (Method H.2-12) is applied, a time at which channel access is performed is shown. Cases (a), (b), (c), and (d) of FIG. 55 correspond to the cases (a), (b), (c), and (d) of FIG. 54, respectively. If channel access is not successful in the first symbol of the SRS resource, the first symbol of the SRS resource is not transmitted. Thereafter, the terminal performs channel access at a time for transmitting the next symbol of the SRS resource. If the channel access is successful, the terminal may transmit the SRS in the remaining symbols of the SRS resource. The terminal may repeat this and transmit the SRS in all or part of the symbol(s) of the SRS resource.

For convenience of description, timing advances of the cases (b), (c), and (d) of FIG. 54 and the cases (b), (c), and (d) of FIG. 55 may determine a time length of the first symbol in the CP extension. FIGS. 54 and 55 represent time from the base station perspective, so that the terminal may perform an LBT procedure on a symbol of the SRS resource at a boundary of the symbol. If the LBT is successful, the terminal transmits the SRS, and the transmitted SRS is received by the base station after a time corresponding to the timing advance elapses. Therefore, since the terminal performs channel access immediately before transmitting a symbol belonging to the SRS resource, it may be interpreted, from the terminal perspective, as performing the LBT procedure at or immediately before the boundary of the symbol.

CP extension may not be applied to an SRS that is periodically or semi-statically transmitted by higher layer signaling other than DCI. This case corresponds to the case (a) of FIG. 54 and the case (a) of FIG. 55, and channel access may be performed for each SRS symbol. Accordingly, the terminal may transmit the entire SRS or a part of the SRS.

(3) Methods for the Terminal to Transmit an SRS Resource at a Boundary of a COT of the Base Station When the SRS is transmitted irrespective of a time (e.g., gNB COT) secured by the base station, a type 1 channel access may be indicated to the terminal. However, the terminal receiving a COT indicator from the base station may change the channel access scheme for uplink transmission belonging to the COT of the base station from the indicated type 1 channel access to a type 2, type 2A, type 2B, or type 2C channel access. However, if some symbol(s) of uplink transmission do not belong to the COT of the base station, the terminal may perform only the type 1 channel access.

When uplink transmissions are consecutively performed and all uplink transmissions belong to the COT of the base station, the channel access scheme may be changed. That is, if a type 2, type 2A, type 2B, or type 2C channel access for a certain uplink transmission fails, the remaining uplink transmission may be performed through a type 2A channel access. That is, a sensing period of the LBT procedure may become longer. For example, the sensing period of the LBT procedure may be changed from 0 us or 16 us to 25 us.

(Method H.3-1): When it is determined that uplink transmission includes at least an SRS, and all SRS resources belong to at least within a COT of the base station, a channel access scheme for the SRS resource is allowed to be changed.

The SRS to be transmitted by the terminal may be composed of two or more symbols, some symbol(s) may belong to the COT of the base station, and the remaining symbol(s) may not belong to the COT of the base station. In this case, the terminal may apply the following methods to transmit the SRS.

(Method H.3-2): If there is SRS symbol(s) that do not belong to the COT of the base station, the terminal does not transmit the entire SRS.

The terminal may interpret the SRS resource as one unit, and may perform channel access only when all symbols of the SRS resource are included in the COT of the base station. Here, (Method H.2-11) or (Method (H.2-12) may be combined and performed.

Even when some of the SRS symbol(s) of the SRS resource do not belong to the COT of the base station, it may be preferable to transmit the remaining SRS symbol(s). For this, (Method H.3-3) or (Method H.3-4) may be applied, and additionally (Method H.2-11) or (Method H.2-12) may be applied. Transmission of the SRS symbol(s) may not be allowed outside the COT of the base station, but the terminal may transmit the SRS symbol(s) by performing channel access again.

(Method H.3-3): Only SRS symbol(s) belonging to the COT of the base station are transmitted through channel access, and the remaining SRS symbol(s) are not transmitted.

A COT is shared by the base station with the terminal, and the terminal regards that only SRS symbol(s) belonging to the shared COT can be transmitted. Accordingly, the terminal may perform a type 2, 2A, 2B, or 2C channel access to transmit SRS symbol(s) belonging to the shared COT. In addition, the terminal may not perform channel access for SRS symbol(s) that do not belong to the COT.

Figure 56:
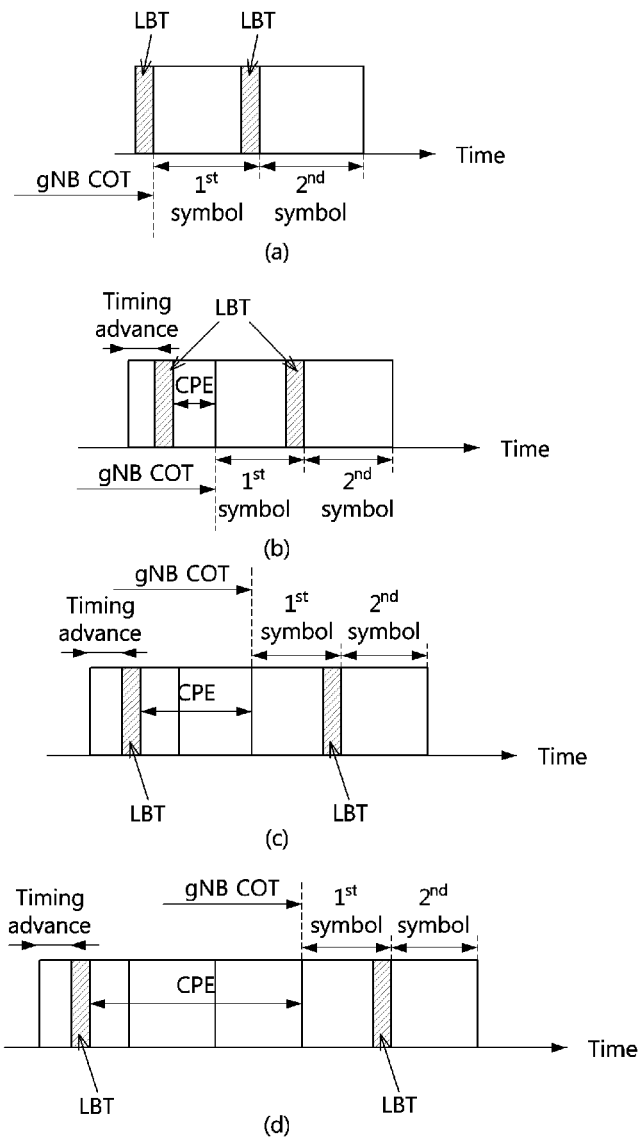
FIG. 56 is another conceptual diagram illustrating SRS symbols to which CP extension is applied according to an exemplary embodiment of the present disclosure.

FIG. 56 is another conceptual diagram illustrating SRS symbols to which CP extension is applied according to an exemplary embodiment of the present disclosure.

In FIG. 56, for convenience of description, an example of an SRS resource composed of two symbols is shown. If a COT of the base station lasts only up to a first symbol of the SRS resource or a symbol to which CP extension of the first symbol is applied, a second symbol of the SRS resource does not belong to the COT of the base station. Therefore, according to (Method H.3-3), all symbols of the SRS resource may not be transmitted.

On the other hand, some of the SRS resource may be allowed to be transmitted.

(Method H.3-4): Channel access for SRS symbols belonging to a COT of the base station and channel access for SRS symbols not belonging to the COT are distinguished, and some of the SRS symbols may be transmitted according to the channel access.

The channel access for symbols belonging to the SRS resource belonging to the COT of the base station may be changed. That is, the terminal may perform a channel access scheme for the symbols belonging to the SRS resource belonging to the COT from a type 1 channel access to a type 2, 2A, 2B, or 2C channel access, perform channel access according to the changed scheme, and then transmit the symbols belonging to the SRS resource belonging to the COT. Thereafter, when the COT of the base station ends, in order to transmit the subsequent SRS symbol(s), the terminal needs to perform a new channel access. That is, the remaining SRS symbols should belong to a COT of the terminal. Accordingly, at least one SRS symbol that starts immediately after the COT of the base station ends may not be transmitted. This is because the terminal needs a time to newly perform channel access after the COT or the base station ends.

In a case (a), the COT of the base station continues until immediately before the first symbol of the SRS resource. Accordingly, the terminal performs channel access, but the channel access scheme is not changed because the SRS resource is outside the COT of the base station. Since an LBT procedure for a CPE symbol (or region) obtained from the first symbol is performed within the COT of the base station, the terminal needs a time to perform a type 1 channel access in order to transmit the remaining SRS resource. If the base station or another terminal is already transmitting, the type 1 channel access performed by the terminal may fail, and depending on a result of the type 1 channel access, the terminal may transmit the second symbol of the SRS resource (outside the COT of the base station).

In cases (b), (c), and (d), the COT of the base station continues until a CPE symbol into which the first symbol of the SRS resource is extended. Therefore, an LBT procedure for the first symbol of the SRS resource may fail because it is performed in a type 1 channel access scheme within the COT of the base station. Depending on a result of a type 1 channel access for the second symbol, the terminal may transmit the corresponding symbol (outside the COT of the base station).

When CPE is applied to the first symbol of the SRS resource, the same SRS sequence may be transmitted in two or more symbols. This is also shown in FIGS. 54, 55, and 56. In this case, it may be interpreted that the corresponding SRS sequence is repeatedly transmitted in two or more symbols. Accordingly, when the same SRS sequence is transmitted, symbol(s) belonging to the COT of the base station and symbol(s) not belonging thereto may further be distinguished.

(Method H.3-5): In (Method H.3-3) or (Method H.3-4), only a portion of a CPE region generated from a first symbol of an SRS resource may be transmitted using a COT of the base station.

In the case (b), a period to which the CPE is applied is shorter than one symbol. However, in the cases (c) and (d), the period to which the CPE is applied is longer than one symbol. Therefore, when a symbol belonging to the COT of the base station includes the CPE, it may include one or more complete SRS symbols, which have the same sequence as the first symbol of the SRS resource. That is, if a symbol in front of the SRS resource includes the CPE, the SRS may also be transmitted in the corresponding symbol. In this case, according to (Method H.3-5), the entire CPE portion or a part of the CPE portion of the SRS symbol belonging to the COT of the base station may be transmitted. In this case, the terminal should succeed by performing a type 2, 2A, 2B, or 2C channel access to transmit the entire CPE portion or a part of the CPE portion of the SRS symbol belonging to the COT of the base station. SRS symbol(s) that do not belong to the COT of the base station are not transmitted. That is, the first symbol of the SRS resource and a part of the CPE portion are not transmitted. However, the second symbol of the SRS resource may be transmitted according to a result of type 1 channel access.

(4) Methods of Dynamically Indicating SRS Resource

The base station may indicate using DCI so that the terminal transmits an SRS. A time resource and frequency resource required to transmit the SRS may be indicated by the DCI. The following methods may be applied in a licensed or unlicensed band.

(Method H.4-1): A time and frequency resource indicated by UL-DCI may represent a resource through which an SRS is transmitted.

In UL-DCI, the terminal may identify the indicated SRS resource by combining a field indicating a time and frequency resource, an SRS trigger field, and a field indicating presence or absence of a UL-SCH.

If the UL-DCI indicates that a PUSCH includes a TB and the SRS trigger field indicates one index, the terminal transmits an SRS in an SRS resource corresponding to the indicated index. Here, the time and frequency resource is not determined by the DCI. On the other hand, if the UL-DCI indicates that the PUSCH does not include a TB and the SRS trigger field indicates one index, the terminal transmits the SRS in the SRS resource corresponding to the indicated index, but the time and frequency resource may be determined by the DCI.

The frequency resource indicated by the UL-DCI may be composed of consecutive PRBs, and the number of consecutive PRBs may be a multiple of 2 or a multiple of 4, not a common multiple of 2, 3, and 5. In addition, an SLIV indicated by the UL-DCI may indicate symbols through which the SRS is transmitted. The SLIV is divided into S and L, and S denotes a first symbol through which the SRS is transmitted.

According to another method, a TB may not be allocated to the terminal by the UL-DCI, and only SRS transmission may be triggered by the UL-DCI. Here, it may be implicitly indicated by the UL-DCI that a TB is not allocated.

(Method H.4-2): UL-DCI may represent at least a time resource through which an SRS is transmitted.

(Method H.4-3): In (Method H.4-2), an index of a frequency resource expressed by UL-DCI may be assigned as an index implying that the size of a TB is 0.

If the index representing a frequency resource has a specific value and the SRS trigger field indicates one index, the terminal does not transmit a TB and transmits an SRS resource corresponding to the indicated index. Here, a time resource may be determined by the DCI.

I. Methods of Supporting Scheduling PDCCH (1) Methods of Receiving Out-of-Order Scheduling and Overlapped Data Channel The terminal may support traffics having two or more levels of importance. When a PDSCH/PUSCH is allocated, importance of traffic is indicated to the terminal using a field of RRC signaling or DCI as a priority index. The base station may transmit two PDCCHs to the terminal, and the PDCCHs may allocate PDSCHs (and PUCCHs including HARQ-ACK) or PUSCHs having different priority indices. Here, a time interval between the PDCCH and the PDSCH may be given by K0 slot(s), and a time interval between the PDCCH and the PUSCH may be given by K2 slot(s).

A plurality of TRPs connected by a backhaul may be considered. When a delay occurs in the backhaul, even if the TRPs belong to one base station, it may be difficult to dynamically perform scheduling cooperation. In some cases, scheduling allocated by one TRP and scheduling allocated by another TRP may be independently indicated. This may be described by a combination of FIG. 57, FIG. 58, or a combination of FIGS. 57 and 58, which will be described later.

Figure 57:
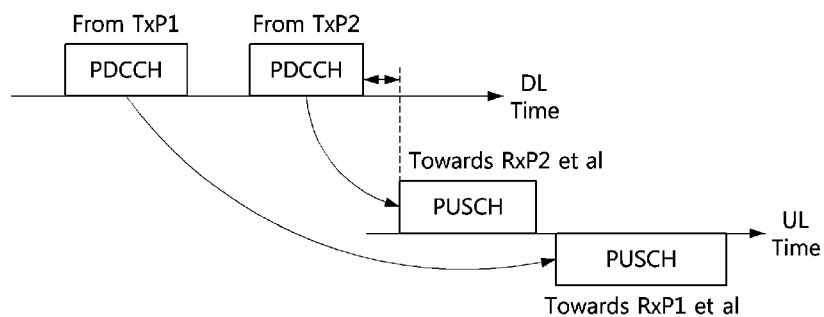
FIGS. 57 to 59 are conceptual diagrams illustrating cases in which scheduling for a plurality of TRPs is performed according to an exemplary embodiment of the present disclosure.
Figure 58:
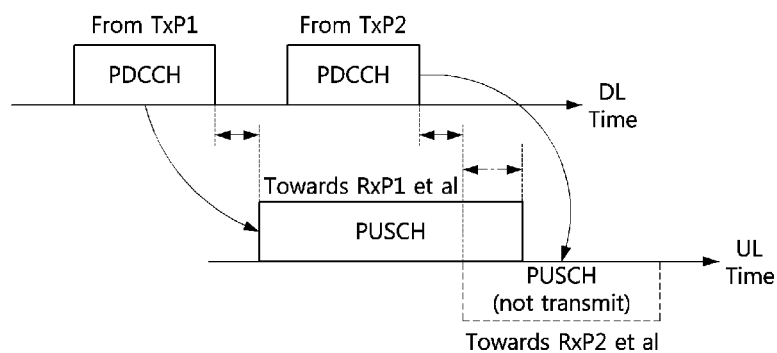
Figure 59:
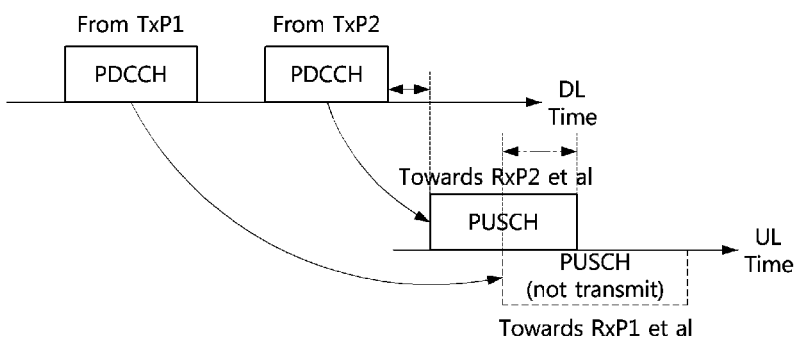

FIGS. 57 to 59 are conceptual diagrams illustrating cases in which scheduling for a plurality of TRPs is performed according to an exemplary embodiment of the present disclosure.

If a priority index for a PUSCH allocated to the terminal is given through DCI or RRC signaling, this may be interpreted as a priority of traffic. If the priority index is not given, it may be interpreted that a priority of the corresponding traffic is low. The terminal may receive a PDCCH and perform a preparation operation (i.e., a procedure for decoding DCI and encoding a TB) for transmitting a PUSCH using a predetermined time.

Before transmitting two PUSCHs, the terminal may identify whether time resources of the PUSCHs overlap with each other. If the PUSCHs overlap each other in time, the terminal may select and transmit only one PUSCH. Here, it is assumed that the PDCCH is received at a sufficiently early time, and a sufficient processing time is secured by the terminal.

(Method I.1-1): The terminal may select and transmit a PUSCH having the highest priority among PUSCHs, and may not transmit an unselected PUSCH.

When the PUSCHs have the same priority, a time at which DCI corresponding to each PUSCH is received or a symbol of each PUSCH may be used as a reference for selecting one PUSCH. The time at which the DCI is received is further specified, and may be a time of DCI received earlier or a time of DCI received later.

(Method I.1-2): For PUSCH(s) allocated through different scheduling DCIs, the terminal may select and transmit a PUSCH corresponding to scheduling DCI received from a CORESET having an earlier first symbol.

When a plurality of CORESET pools are configured, (Method I.1-2) may be performed only based on first symbols of CORESETs regardless of the CORESET pools. If scheduling DCIs are detected in CORESETs starting from the same first symbol while belonging to different CORESET pools, a PUSCH indicated by scheduling DCI included in a CORESET belonging to a CORESET pool indicated through higher layer signaling or the technical specification may be selected. According to (Method I.1-2), the terminal performs a preparation operation for transmitting the PUSCH in the order in which the scheduling DCI is received, and may not be disturbed by the later received scheduling DCI. Therefore, there is an advantage of being easy to implement.

(Method I.1-3): For PUSCH(s) allocated through different scheduling DCIs, the terminal may select and transmit a PUSCH corresponding to scheduling DCI received in a CORESET having a later ending symbol.

Meanwhile, when there are a plurality of scheduling DCIs, the terminal may select a PUSCH based on first symbols in which PUSCHs are transmitted. That the terminal may receive scheduling DCIs from a plurality of TRPs means that the terminal has capability to receive or transmit a plurality of TBs. In this case, the PUSCH need not be selected only in the order in which the DCI is received. Therefore, it is preferable that a method other than (Method I.1-2) and (Method I.1-3) is applied.

(Method I.1-4): The terminal may select a PUSCH having an earlier first symbol.

The terminal may decode DCIs in a plurality of CORESETs (and/or CORESET pools) and compare time resources of PUSCHs. If the PUSCHs have the same priority, the terminal may select a PUSCH indicated to be transmitted earlier. In this case, while the terminal performs a preparation operation for transmitting a PUSCH according to scheduling DCI received earlier, the terminal may cancel the prepared transmission of the PUSCH due to the scheduling DCI received later.

The proposed methods are described with reference to FIGS. 57, 58, and 59.

Referring to FIG. 57, scheduling DCIs are respectively received in two CORESET pools, but first symbols of PUSCHs allocated by the scheduling DCIs have an order different from an order of the scheduling DCIs. According to (Method I.1-4), scheduling in which the order of receptions of scheduling DCIs and the order of transmissions of PUSCHs are reversed may be allowed. Referring to FIG. 58, scheduling DCIs are respectively received in two CORESET pools, and time resources of PUSCHs partially overlap. In this case, the terminal selects and transmits a PUSCH allocated to be transmitted first, and does not transmit another PUSCH. In FIG. 58, since the reception order of DCIs and the transmission order of PUSCHs are the same, (Method I.1-2) may be applied. However, if the reception order of DCIs and the transmission order of PUSCHs are different, (Method I.1-4) may be applied when time resources of PUSCHs partially overlap (FIG. 59).

J. Methods of Supporting GC-PDCCH in Multiple TRPs (1) Methods for a Plurality of TRPs to Support GC-PDCCH Group-common (GC) PDCCH includes information transmitted to a plurality of terminals. For example, in case of the NR system, DCI 20 indicates an SFI or a COT, DCI 21 indicates a DLPI, DCI 22 indicates a TPC PUSCH/PUCCH, DCI 23 indicates a TPC SRS, and DCI 24 indicates ULCI. In GC-DCI included in the GC PDCCH, information on multiple terminals or multiple serving cells is configured as information bits, and undergoes a common encoding procedure. Accordingly, information useful for a specific terminal corresponds to a portion of the information bits, and the terminal is indicated by RRC signaling as to which position of the information bits is useful.

In a scenario where a plurality of TRPs are used, a delay may occur in communication through a backhaul. When the terminal receives GC-DCI in a CORESET belonging to one TRP, it may urgently indicate transmission/reception of the terminal for another TRP in which the GC-DCI is not received, or an appropriate delay time may be allowed. For example, when it is necessary to transmit URLLC traffic, there may be information urgently requiring cooperation for a ULCI or DLPI. For example, in case of a TPC PUSCH/PUCCH/SRS, a TPC command determined by relatively slow cooperation between the TRPs may be included in the GC-DCI.

(Method J.1-1): GC-DCI may be configured only in one CORESET pool.

In the technical specification, one CORESET pool may be fixedly indicated or one CORESET pool may be indicated by RRC signaling. In one CORESET pool, a type 3 PDCCH CSS may be configured to the terminal through RRC signaling. In this case, the terminal may not receive GC-DCIs having conflicting information from TRPs. However, it is preferable that some GC-DCI can be transmitted per TRP.

(Method J.1-2): GC-DCI may be configured for each CORESET pool.

For each CORESET pool, a type 3 PDCCH CSS may be configured to the terminal through RRC signaling.

GC-DCI transmitted on a GC-PDCCH may include information on only one TRP. Alternatively, it may be allowed that GC-DCI transmitted on a GC-PDCCH includes information on two or more TRPs.

(Method J.1-3): In GC-DCI, the terminal may read information for one serving cell at only one position.

GC-DCI may include only information on one TRP, or even if it does not include information on a TRP, it may be known to the terminal for which TRP information of the GC-DCI is. The terminal may obtain information on only one TRP (or CORESET pool) at one position in a payload of the GC-DCI.

Although one or more CORESET pool(s) are configured to the terminal, it may be interpreted that a CORESET belonging to each CORESET pool is mapped to only information on a corresponding TRP. Alternatively, if a CORESET pool is not configured, the terminal may not distinguish between TRPs. Alternatively, the terminal may use one fixed CORESET pool. Therefore, the terminal may have to search for CORESET(s) belonging to other CORESET pool(s) in order to receive GC-DCI.

When considering a PDSCH/PUSCH/PUCCH/SRS to which GC-DCI is applied, a TRP (or CORESET and/or CORESET pool including the GC-DCI) that transmitted the GC-DCI and a TRP transmitting and receiving the PDSCH/PUSCH/PUCCH/SRS with the terminal may always be the same. Alternatively, the terminal may apply the GC-DCI to a PDSCH/PUSCH/PUCCH/SRS for any TRP regardless of the CORESET and/or CORESET pool including the GC-DCI.

(Method J.1-4): The terminal may read information for one serving cell at two or more positions in GC-DCI.

GC-DCI may include information on two or more TRPs. The terminal may receive information on two or more positions in the GC-DCI through RRC signaling. According to (Method J.1-4), the terminal may receive an indication of a starting point where information for each TRP is located.

Figure 60:
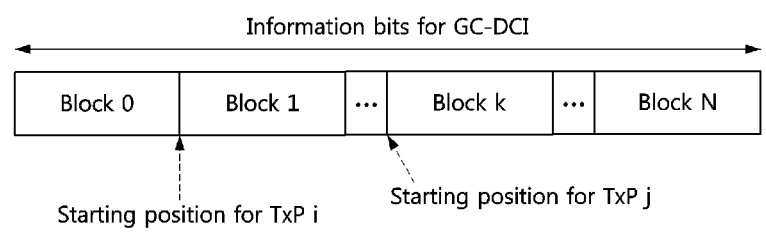
FIG. 60 is a conceptual diagram illustrating a configuration example of information bits of GC-DCI according to an exemplary embodiment of the present disclosure.

FIG. 60 is a conceptual diagram illustrating a configuration example of information bits of GC-DCI according to an exemplary embodiment of the present disclosure.

Referring to FIG. 60, the terminal may receive an indication of a starting point at which information for each of a TRP i and a TRP j is located by RRC signaling. In an example, the terminal may additionally receive an indication of such a starting point as a separate RRC parameter.

(2) Methods of Interpreting ULCI (and/or DLPI)

A CORESET pool may be indicated by RRC signaling so that the terminal supports multiple TRPs (e.g., two TRPs). The methods described below may be applied equally to ULCI as well as DLPI, but for convenience of description, the methods described below are described as being applied to ULCI.

According to (Method J.1-3), the terminal may receive a separate GC-PDCCH for each TRP (or CORESET pool). ULCI may be delivered to the terminal by applying one starting point to the GC-PDCCH. The terminal may identify each ULCI by receiving a GC-PDCCH from each of the two CORESET pools.

According to (Method J.1-4), a bitmap included in ULCI may be expressed differently for each TRP, but may be included in one GC-PDCCH (i.e., one CORESET pool). The terminal may obtain ULCI for each TRP at two or more positions of the given GC-DCI by using the bitmap.

In an example, a bitmap included in ULCI may be applied to a PDSCH/PUSCH/SRS scheduled by a CORESET belonging to each CORESET pool. Accordingly, the terminal may not apply a GC-DCI i received in a CORESET pool i to a PDSCH/PUSCH/SRS allocated by scheduling DCI j received in a CORESET pool j (i, j∈{0, 1}, i≠j).

In an example, a bitmap included in ULCI may be applied to a PDSCH/PUSCH/SRS regardless of from which CORESET pool it is received. Therefore, when a bit corresponding to a unit UL resource is expressed as 1 in the bitmap of the ULCI, regardless of the CORESET pool including the ULCI and a CORESET pool including scheduling DCI, the terminal may not transmit the PDSCH/PUSCH/SRS in the corresponding unit UL resource.

The terminal may receive contradicting ULCIs for the same unit UL resource. In this case, if a bit corresponding to the unit UL resource is expressed as 1 in any one ULCI, the terminal may not transmit the PDSCH/PUSCH/SRS in the corresponding unit UL resource.

(3) Methods of Interpreting TPCs

A CORESET pool may be indicated by RRC signaling so that the terminal can support multiple TRPs. When indicating a TPC PUSCH/PUCCH/SRS to the terminal, if it is difficult for the TRPs to cooperate dynamically, different TPC commands for the same PUSCH (or PUCCH or SRS) may be indicated to the terminal through GC-PDCCHs belonging to different CORESET pools. For example, for one PUSCH/PUCCH/SRS, a GC-DCI i received by the terminal in a CORESET pool i may increase a transmission power, and a GC-DCI j received by the terminal in a CORESET pool j may decrease the transmission power (i, j=0, 1, i≠j). When they are received in the same slot, the terminal should not simply accumulate the TPC commands.

According to (Method J.1-1), the terminal may receive a TPC command only in one CORESET pool. When (Method J.1-4) is additionally applied, each predetermined position of received GC-DCI may indicate each TRP. The terminal may independently accumulate a TPC command received at a predetermined position, and may apply it when the terminal performs transmission to each TRP.

According to (Method J.1-2), the terminal may receive a TPC command for each CORESET pool. The terminal may regard that a CORESET pool and a TRP correspond to each other in one-to-one manner, may independently accumulate the TPC command for each CORESET pool, and apply it when performing transmission to each TRP.

K. Methods of Supporting ULCI (1) Methods of Supporting ULCI in a Licensed Band

DCI 24 (i.e., DCI format 2_4) may include ULCI information for a plurality of serving cells and SUL carriers. ULCI required for the terminal is received at a specific position in GC-DCI, and the specific position is indicated to the terminal by RRC signaling.

Figure 61:
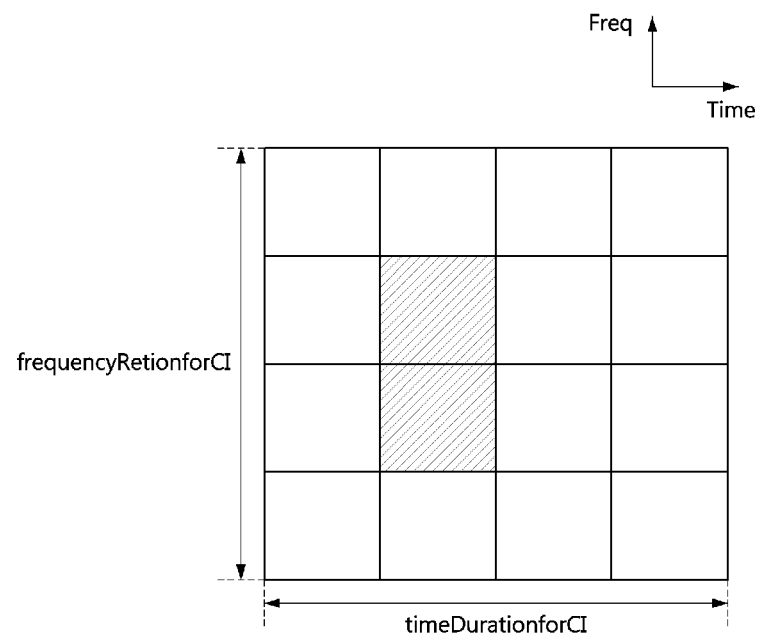
FIG. 61 is a conceptual diagram illustrating an example configuration of ULCI according to an exemplary embodiment of the present disclosure.

FIG. 61 is a conceptual diagram illustrating an example configuration of ULCI according to an exemplary embodiment of the present disclosure.

Referring to FIG. 61, a reference uplink resource is divided into 4 time groups and 4 frequency groups, but is not limited thereto. One time group may be composed of several consecutive symbols, and one frequency group may be composed of several consecutive PRBs. One unit UL resource is composed of one time group and one frequency group. In FIG. 61, information for canceling PUSCH transmission in two unit UL resources may be expressed as a bit string.

The reference UL resource is composed of time and frequency resources, and is indicated to the terminal through RRC signaling. The reference UL resource is divided into several unit UL resources, and one unit UL resource corresponds to one bit in a bitmap. That is, one unit UL resource corresponds to 0 or 1 in the bitmap. For a unit UL resource belonging to a resource for transmitting a PUSCH/SRS, if a corresponding bit is 1, the terminal may cancel transmission of the corresponding PUSCH/SRS. In case of a PUSCH, transmission of the entire PUSCH (or a corresponding PUSCH instance in case of repetitive transmission) may be canceled. In case of an SRS, only SRS transmission in SRS symbol(s) overlapping with the unit UL resource may be canceled.

In a scenario supporting URLLC traffic and eMBB traffic, the reference UL resource and the unit UL resource may be used to suppress transmission of eMBB traffic in order to reduce interference with URLLC traffic.

ULCI (or GC-DCI associated therewith) may be periodically transmitted to the terminal. However, the terminal may not necessarily periodically observe ULCI. It is preferable that the terminal observes ULCI only when transmitting a PUSCH (e.g., a CG PUSCH or a DG PUSCH by a UL grant). In this case, if the terminal detects that a bit for a unit UL resource corresponding to the CG PUSCH is set to 1 in any one GC-DCI before transmitting the CG PUSCH, the terminal may transmit the PUSCH in the corresponding unit UL resource.

(2) Methods of Supporting ULCI in an Unlicensed Band

In an unlicensed band, a frequency resource of a PUSCH may be expressed differently. In order to properly distribute a transmission power while complying with frequency regulations, the PUSCH may occupy PRBs in form of interlace(s) (i.e., type 2 or T2 FDRA). Therefore, if the PUSCH includes URLLC traffic, bits corresponding to all frequency groups in ULCI may be set to 1. According to this, a PUSCH intended to transmit eMBB traffic may not be transmitted. In order to express the resource of the PUSCH allocated by a T2 FDRA, it is necessary to improve a method of expressing a reference UL resource in ULCI.

(Method K.2-1): A frequency band of a reference UL resource may be expressed as interlace(s)

The number of interlaces may vary according to a subcarrier spacing. For example, in case of a 15 kHz subcarrier spacing, a 6-bit long bitmap may be used. In case of a 30 kHz subcarrier spacing, a 5-bit long bitmap may be used.

(Method K.2-2): In (Method K.2-1), an RB set (or LBT subband) may also be expressed additionally.

An active BWP may be composed of one or more RB set(s) (or LBT subband(s)), and a frequency resource of a PUSCH may be indicated from the base station by a combination of an RB set(s) and an interlace(s). Similarly, since a reference UL resource may include one or more RB set(s), a frequency band of the reference UL resource may also represent RB set(s) together.

An index of an RB set is indicated to the terminal by RRC signaling. The terminal may identify, by using ULCI, for which RB set among the already indicated RB set(s) a frequency resource is. The index of the RB set may be indicated separately from DCI 20. Alternatively, the RB set indicated by DCI 20 may be reused and utilized by the ULCI.

Figure 62:
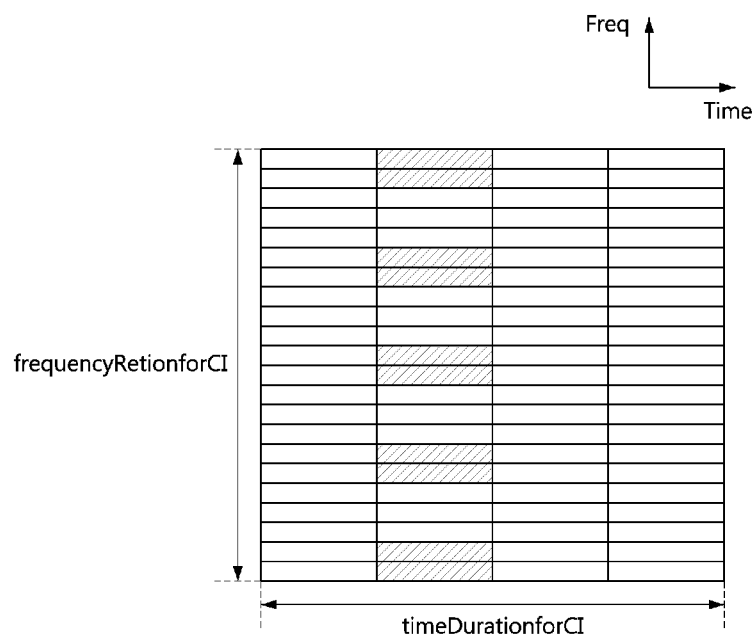
FIG. 62 is a conceptual diagram illustrating another configuration example of ULCI according to an exemplary embodiment of the present disclosure.

FIG. 62 is a conceptual diagram illustrating another configuration example of ULCI according to an exemplary embodiment of the present disclosure.

In FIG. 62, an example in which (Method K.2-1) and/or (Method K.2-2) is applied is shown. In FIG. 62, a reference UL resource is divided into four time groups in the time domain, and divided into one RB set and five frequency groups in the frequency domain, but is not limited thereto. One time group may be composed of several consecutive symbols, and one frequency group may be composed of one or more interlace(s). One unit UL resource is composed of one time group and one frequency group. In FIG. 62, one frequency group is represented as one interlace. In FIG. 62, information for canceling transmission of a PUSCH in two unit UL resources may be expressed as a bit string.

(Method K.2-3): One method of interpreting a reference UL resource by RRC signaling may be indicated to the terminal.

When an indication value of the RRC signaling is set to a specific value, a frequency of the reference UL resource may be interpreted as consecutive PRBs (RBG scheme). When an indication value of the RRC signaling is set to a specific value, the frequency of the reference UL resource may be interpreted as interlace(s) (interlace scheme).

(Method K.2-4): In (Method K.2-3), even when the terminal is configured with only a T2 FDRA through RRC signaling, the terminal may observe a reference UL resource according to both interpretation schemes.

The terminal may receive ULCIs at two positions in the same GC-DCI. According to (Method K.2-4), interpretation schemes for the ULCIs may be different. The terminal may observe a bitmap given in the RBG scheme in the ULCI and a bitmap given in the interlace scheme in the ULCI. If it is indicated not to transmit a PUSCH by any one ULCI (i.e., if a unit UL resource indicated by 1 and an allocated frequency resource of the PUSCH overlap), the terminal may not transmit the PUSCH.

(3) Method of Determining Uplink Transmission Power

Figure 63:
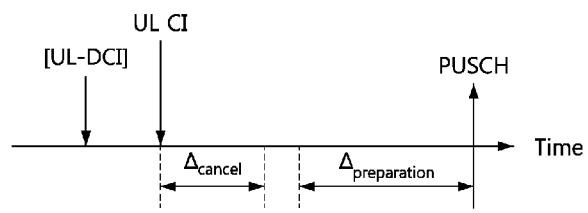
FIG. 63 is a conceptual diagram illustrating a relationship between PUSCH transmission of a terminal and ULCI according to an exemplary embodiment of the present disclosure.

FIG. 63 is a conceptual diagram illustrating a relationship between PUSCH transmission of a terminal and ULCI according to an exemplary embodiment of the present disclosure.

Referring to FIG. 63, when the terminal is allocated a PUSCH through UL-DCI or higher layer signaling, a PUSCH preparation time $\Delta_{preparation}$ should be secured. The terminal may cancel PUSCH transmission in a time and frequency resource indicated by ULCI, and in this case, a PUSCH cancellation time $\Delta_{cancel}$ should be secured. If $\Delta_{preparation}$ is not secured, the terminal may transmit the PUSCH as it is. In general, ($\Delta_{preparation} \geq \Delta_{cancel}$) may be assumed.

In case of uplink carrier aggregation or when one serving cell has two or more uplink carriers, the terminal may be indicated to transmit two or more PUSCHs at the same time. Here, the terminal may be allocated PUSCHs through UL-DCI or higher layer signaling. When a search space set for receiving ULCI is configured to the terminal, a region of a time/frequency resource indicated by the ULCI may partially overlap with one or more PUSCH(s). In this case, the terminal may be indicated by higher layer signaling not to transmit a PUSCH or to cancel a PUSCH during transmission thereof when it overlaps the resource indicated by the ULCI.

Figure 64:
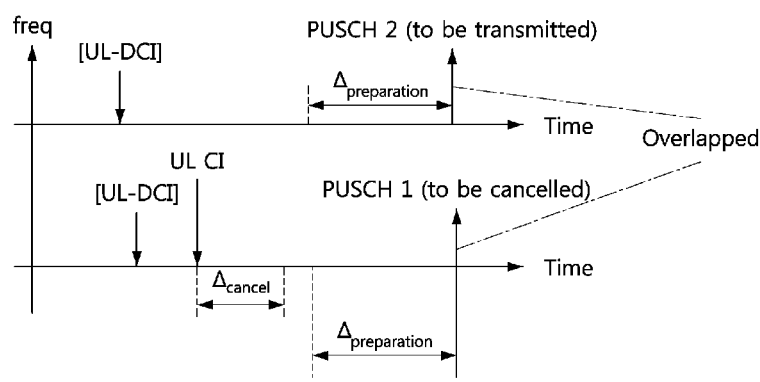
FIG. 64 is a conceptual diagram illustrating an operation according to ULCI when two or more PUSCHs are allocated to a terminal according to an exemplary embodiment of the present disclosure.

FIG. 64 is a conceptual diagram illustrating an operation according to ULCI when two or more PUSCHs are allocated to a terminal according to an exemplary embodiment of the present disclosure.

Referring to FIG. 64, two or more UL-DCIs may allocate PUSCHs to the terminal so that they overlap at least partially in different uplink carriers. For example, a case where two PUSCHs overlap is shown in FIG. 62. However, the following descriptions may be equally extended and applied even when three or more PUSCHs overlap.

The terminal may allocate a power $P_1$ to a PUSCH 1 and allocate a power $P_2$ to a PUSCH 2 ($P_1+P_2=P$). When the PUSCH 1 and PUSCH 2 are transmitted at different times, it may be assumed that the terminal allocates a power $\tilde{P}_1$ and a power $\tilde{P}_2$ to the PUSCH 1 and PUSCH 2, respectively. When the terminal is indicated to dynamically share a power while simultaneously transmitting the PUSCHs, a smaller power may be allocated to each of the PUSCHs (i.e., $P_i \leq \tilde{P}_i$, i=1, 2, $P_1+P_2=P$). When a higher priority is given to the PUSCH 1, a power $P_1=\tilde{P}$ may be allocated to the PUSCH 1, and the remaining power may be allocated to the PUSCH 2 ($P_2=P-P_1 \leq \tilde{P}_2$). On the other hand, a power $P_2=\tilde{P}_2$ and a power $P_1=P-P_{SL} \leq \tilde{P}_2$ may be allocated to the PUSCH 2 and PUSCH 1, respectively.

In the case of FIG. 64, when ULCI is reflected, the PUSCH 2 is transmitted, but the PUSCH 1 may be canceled or only some symbol(s) of the PUSCH 1 may be transmitted. When the terminal cancels the PUSCH 1, since a power that can be allocated to the PUSCH 2 increases, the terminal may reconsider the power for the PUSCH 2.

The terminal may change the power of the PUSCH 2 to a different value, but an additional processing time may be required for this. In this case, the terminal may maintain the power of the PUSCH 2 as it is (i.e., $P_2=P-P_1$). When the PUSCH 2 is a CG PUSCH, the terminal may receive TPC-GC-DCI and calculate the power of the PUSCH 2.

(Method K.3-1): The terminal may not use ULCI to determine the power of the PUSCH 2.

If the terminal does not need an additional processing time or if the ULCI is received early enough, the terminal may readjust the power of the PUSCH 2. Since only the power of the PUSCH is adjusted while UCI or a TB mapped to the PUSCH is maintained as it is, the terminal may not need an additional processing time. In this case, at least the step of determining the power of the PUSCH 2 is performed after applying the ULCI to the PUSCH 1, and a power $P_2=\tilde{P}_2$ may be allocated to the PUSCH 2.

(Method K.3-2): The power of the PUSCH 2 may be recalculated based on PUSCH(s) actually transmitted after applying ULCI.

In addition, an additional processing time for allocating a power may be defined in the technical specification.

(Method K.3-3): If a sufficient processing time (e.g., processing time defined by $N_2$, $d_{2,1}$, $d_2$, $d_{2,2}$) is not secured for the terminal, even when (Method K.3-2) is applied, the terminal may not readjust the power of the PUSCH 2.

In more detail about the sufficient processing time, $\Delta_{preparation}$ and $\Delta_{cancel}$ may be given by a function of $N_2$, $d_{2,1}$, $d_{2,2}$. $\Delta_{preparation}$ may be determined as a larger value among a time corresponding to $N_2+d_{2,1}$ and a time corresponding to $d_{2,2}$. Here, $N_2$ may be determined in the technical specification according to a subcarrier spacing of a BWP. $N_2$ may have a smaller value or a larger value according to a processing capability of the terminal. $d_{2,1}$ may be determined based on a form of a PUSCH DM-RS, and $d_{2,2}$ may be determined based on a time required for BWP switching. $\Delta_{cancel}$ may be determined as a larger value among a time corresponding to $N_2+d_{2,1}$ and a time corresponding to $d_{2,2}$. Here, the value of $d_{2,1}$ for determining $\Delta_{cancel}$ may be determined differently from the value of $d_{2,1}$ for determining $\Delta_{preparation}$. That is, in this case, $d_{2,1}$ may be determined with a function of a subcarrier spacing of a BWP in which the ULCI is received, a subcarrier spacing of a BWP in which the PUSCH is transmitted/cancelled, and a value(s) given by RRC signaling.

When a sufficient time is secured by the terminal, the terminal may receive and decode the ULCI, recognize that PUSCH 1 is canceled through this, and reflect a change in power according to the cancellation of PUSCH 1 to PUSCH 2. In this case, since a time for generating a PUSCH should be considered in order for the terminal to transmit a CG PUSCH or DG PUSCH, the ULCI should be received by the terminal at a time earlier than a first symbol of the PUSCH by at least $\Delta_{preparation}$.

(3.1) Exemplary Embodiment 1: Dual Connectivity

A method of considering ULCI when determining a transmission power for uplink transmission to E-UTRA in a dual connectivity scenario is proposed. When the terminal intends to perform uplink transmissions in two or more serving cells, the terminal may prepare uplink transmissions by applying power controls already indicated to the terminal. Thereafter, one uplink transmission may be canceled by ULCI. In this case, a power of uplink transmission actually performed by the terminal may be changed by the cancellation of one of the uplink transmissions or may be determined irrespective of the reception of the ULCI (i.e., the power determined without receiving ULCI is maintained as it is).

When the terminal has an ability to dynamically share a power and the terminal performs uplink transmissions to a master cell group (MCG) and a secondary cell group (SCG), the terminal may reduce a power for one uplink transmission, and may secure an enough power for another uplink transmission.

In case of EN-DC, since the terminal is indicated by higher layer signaling to use E-UTRA cells as a MCG and NR cells as a SCG, the terminal may reduce a power for uplink transmission to the SCG or may not perform the uplink transmission to the SCG in order to secure a sufficient power for uplink transmission to the MCG. In case of NE-DC, since the terminal is indicated by higher layer signaling to use NR cells as an MCG and E-UTRA cells as a SCG, the terminal may reduce a power for uplink transmission to the MCG or may not perform the uplink transmission to the MCG in order to secure a sufficient power of uplink transmission to the SCG.

In case of NR-DC, the base station may indicate static power sharing (e.g., semi-static-model or semi-static-mode2) or dynamic power sharing to the terminal using higher layer signaling (e.g., nrdc-PCmode-FR1 or nrdc-PCmode-FR2). The terminal may secure a sufficient power for uplink transmission to the MCG, reduce a power for uplink transmission to the SCG, or may not perform the uplink transmission to the SCG.

When static power sharing is indicated, power control may be performed irrespective of the reception of the ULCI at the terminal. On the other hand, when dynamic power sharing is indicated, a power may be determined irrespective of the ULCI according to (Method K.3-1). Accordingly, the terminal may allocate a low power to uplink transmission to the SCG even though the transmission power of the uplink transmission to the SCG can be further increased. On the other hand, according to (Method K.3-2), the terminal may further increase the transmission power of uplink transmission to the SCG by applying the ULCI. In this case, the terminal should perform a procedure of re-allocating the power or determining the power after receiving the ULCI. If a sufficient processing time (e.g., processing time defined by $N_2$, $d_{2,1}$, $d_2$, $d_{2,2}$) is not given to the terminal, even when (Method K.3-2) is applied, the terminal may not change the power for the uplink transmission to the SCG.

(4) Methods for Determining a Power for SL Transmission when Performing the SL Transmission and UL Transmission at the Same Time The terminal may simultaneously support sidelink (SL) and uplink. The terminal may be (pre)configured with a resource pool. When the terminal is controlled by the base station, the base station may reconfigure a resource pool to the terminal. There are two types of resource allocation schemes supported by the resource pool. In a first mode (i.e., resource allocation mode 1), the terminal receives SL-DCI from the base station, transmits a PSCCH and a PSSCH to a target terminal based on the SL-DCI, receives a PSFCH from the target terminal, and transmits a PUCCH (or PUSCH) to the base station. In a second mode (i.e., resource allocation mode 2), without involvement of the base station, the terminal may measure interference in an adjacent region and perform sidelink transmission when the interference is less than a threshold value.

When the terminal supports both sidelink and uplink, since the terminal is controlled by the base station, the base station configures a search space set(s) to the terminal so that the terminal receives SL-DCI and UL-DCI. In addition, a case in which the base station is serving eMBB traffic and URLLC traffic may be considered. If the terminal supports both eMBB traffic and URLLC traffic, a priority threshold of sidelink transmission (i.e., SL-SS, PSBCH, PSCCH, PSSCH, PSFCH) may be indicated to the terminal by higher layer signaling. A priority of uplink transmission may be indicated by higher layer signaling or UL-DCI. A priority value included in the SL-DCI, PSCCH, and/or sidelink control information (SCI) is compared with the threshold, and according to the comparison result, traffic allocated by the SL-DCI and/or PSCCH may be regarded as more important traffic (i.e., URLLC) or less important traffic (i.e. eMBB). These importances of the traffic are first applied to selection between sidelink transmission and sidelink reception, and then also applied when determining a priority between it and uplink transmission.

If multiple uplink transmissions or uplink receptions occur in the terminal, the terminal may select sidelink transmission(s) or sidelink reception(s) according to their priorities.

If the terminal does not have the ability to perform sidelink transmission or sidelink reception and uplink transmission at the same time, when time resources of sidelink transmission or sidelink reception and uplink transmission overlap each other in some symbols, the terminal may select one of sidelink transmission or sidelink reception and uplink transmission by applying priorities. Since the base station transmits UL-DCI or SL-DCI to the terminal, the base station may know the selection of the terminal in advance. When the terminal can perform sidelink transmission and uplink transmission at the same time, the terminal may allocate a sufficient transmission power for transmission with a higher priority, and allocate the remaining transmission power for transmission with a lower priority.

A case in which a search space set for receiving ULCI is configured in the terminal is considered.

Figure 65:
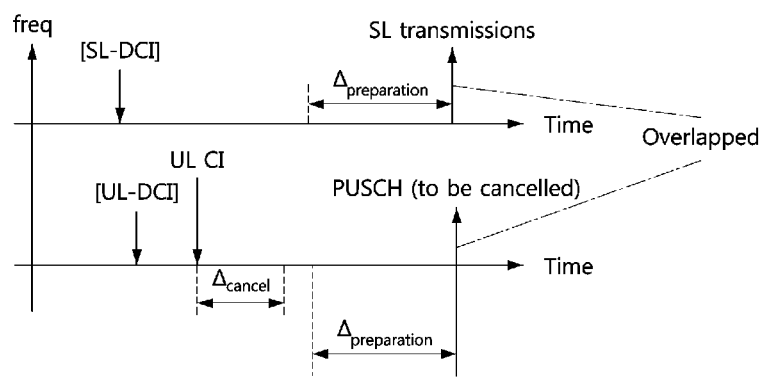
FIG. 65 is a conceptual diagram illustrating an operation according to ULCI when sidelink transmission and PUSCH are allocated to a terminal according to an exemplary embodiment of the present disclosure.

FIG. 65 is a conceptual diagram illustrating an operation according to ULCI when sidelink transmission and PUSCH are allocated to a terminal according to an exemplary embodiment of the present disclosure.

When ULCI is received, the terminal may cancel transmission of a PUSCH. When ULCI is not received, uplink transmission and sidelink transmission may occur in the terminal at the same time, and the terminal may dynamically share a power to perform both the uplink transmission and the sidelink transmission. On the other hand, if the uplink transmission is canceled by the ULCI, the terminal may consider only the sidelink transmission.

A case in which the terminal selects one of sidelink transmission and uplink transmission is considered. The terminal may perform power control to allocate a sufficient power to a sidelink channel or an uplink channel having a higher priority. If sidelink transmission is selected, a power for the sidelink transmission may be determined regardless of ULCI.

Meanwhile, even when a priority of uplink transmission is higher, the terminal may perform sidelink transmission according to a time at which ULCI is applied. For example, after the ULCI is first applied and uplink transmission is canceled, the terminal may consider sidelink transmission. In this case, the terminal may allocate a sufficient power for the sidelink transmission. For example, before ULCI is received and/or applied, the terminal may compare priorities of uplink and sidelink, and according to the comparison result, the terminal may cancel the sidelink transmission and perform (or cancel) the uplink transmission. Thereafter, by applying the ULCI, the terminal may cancel the uplink transmission that has already been selected. In this case, the terminal may not transmit anything as a result.

(Method K.4-1): ULCI is applied first, and selection between sidelink transmission and uplink transmission may be performed later.

The terminal may first determine whether uplink transmission is valid or invalid by using ULCI, and may perform sidelink transmission thereafter, thereby increasing a throughput.

In order to perform sidelink transmission and uplink transmission, the terminal should wait for a time until receiving and processing ULCI. This means that the terminal may not be able to prepare sidelink transmission or uplink transmission in advance because it depends on the result of receiving the ULCI. In addition, when the terminal is not configured to receive ULCI, since sidelink transmission or uplink transmission can be prepared in advance, the implementation of the terminal may vary depending on whether or not ULCI is configured. Therefore, as a simpler method, ULCI may be applied after selection between sidelink transmission and uplink transmission.

(Method K.4-2): ULCI may be applied after selection between sidelink transmission and uplink transmission is performed.

A case in which the terminal simultaneously performs sidelink transmission and uplink transmission is considered. The terminal may dynamically share a power. Sidelink transmission and uplink transmission may be performed in different carriers. In the following, one sidelink transmission and one uplink transmission are considered, but the following description may be extended and applied even when one or more sidelink transmission(s) and one or more uplink transmission(s) are simultaneously performed.

The terminal may allocate a power $P_{UL}$ for uplink transmission and allocate a power $P_{SL}$ for sidelink transmission ($P_{UL}+P_{SL}=P$). When uplink transmission and sidelink transmission are respectively transmitted at different times, the terminal may assume that the power $P_{UL}$ and the power $P_{SL}$ are applied to the uplink transmission and the sidelink transmission, respectively. When the terminal is indicated to dynamically share a power while simultaneously performing uplink transmission and sidelink transmission, a smaller power may be allocated to each of the uplink transmission and sidelink transmission (i.e., $P_i \leq \tilde{P}_i$, i=UL, SL, $P_{UL}+P_{SL}$ P). When a higher priority is given to uplink transmission, a power $P_{UL}=\tilde{P}_{UL}$ may be allocated to the uplink transmission, and the remaining power may be allocated to the sidelink transmission $P_{SL}=P-P_{UL} \leq \tilde{P}_{SL}$). On the other hand, the power $P_{SL}=\tilde{P}_{SL}$ and the power $P_{UL}=P-P_{SL} \leq \tilde{P}_{UL}$ may be allocated to the sidelink transmission and the uplink transmission, respectively.

When uplink transmission is configured to be canceled according to reception of the ULCI, the terminal may consider an order of a time of preparing for simultaneous transmission of the sidelink transmission and the uplink transmission and a time of applying the ULCI. If the ULCI is applied first, the terminal may perform only the sidelink transmission. However, if the ULCI is applied later, the terminal may prepare all or part of the uplink transmission and the sidelink transmission, and then apply the ULCI.

(Method K.4-3): The terminal prepares for simultaneous transmission of uplink transmission and sidelink transmission, and may also determine transmission powers ($P_{UL}$, $P_{SL}$). The transmission powers do not change even after ULCI is applied.

The terminal may perform encoding of UCI, SCI, or TB for uplink transmission and sidelink transmission, and determine transmission powers of the uplink transmission and the sidelink transmission. Thereafter, the terminal may cancel the uplink transmission by applying ULCI. In this case, according to (Method K.4-3), a power $P_{SL}$ (i.e., $P_{SL}=\tilde{P}_{SL}$ or $P_{SL}=P-P_{UL}$ according to the priority) may be allocated to the sidelink transmission. Since the terminal does not rely on the ULCI to perform sidelink transmission, the sidelink transmission may be determined only by SL-DCI, a PSCCH, or higher layer signaling for scheduling of a CG PSSCH. The base station may configure the terminal not to receive ULCI, and a procedure for determining $P_{UL}$ and $P_{SL}$ according to the terminal (Method K.4-3) may be the same as the procedure when the terminal is configured not to receive the ULCI.

(Method K.4-4): The terminal prepares for simultaneous transmission of uplink transmission and sidelink transmission, and after applying ULCI, transmission powers ($P_{UL}$, $P_{SL}$) may be determined (again).

The terminal may perform encoding of UCI, SCI, or TB for uplink transmission and sidelink transmission, but may not determine transmission powers of the uplink transmission and the sidelink transmission. Alternatively, even when the transmission powers are determined, the transmission powers may be set to temporary values, and changed after the ULCI is applied. When the ULCI is applied and the terminal cancels the uplink transmission, the terminal may perform only the sidelink transmission. Accordingly, the terminal may determine the power for the sidelink transmission as $P_{SL}=\tilde{P}_{SL}$.

(5) Fields of SL-DCI

SL-DCI (e.g., DCI format 3_0, format 3_1) may include information required for the terminal to perform sidelink transmission and include an HARQ-ACK therefor in a PUCCH. The SC-DCI may include a PUCCH resource Indicator (PRI). The base station may receive PUCCHs from a plurality of different terminals. Depending on formats of the PUCCHs, the PUCCHs may be received in a CDMA or OFDMA scheme. Accordingly, the base station may adjust a PUCCH transmission power of the terminal by using fields (i.e., TPC PUCCH fields) of scheduling DCI. In this case, a TPC PUCCH field may have a size of 2 bits, and include an index indicating to the terminal an increase (e.g., +1 dB or +3 dB), maintain (e.g., 0 dB), or decrease (e.g., −1 dB) of a power level of the PUCCH.

(Method K.4-5): A field for controlling a transmission power of a PUCCH may be additionally included in SL-DCI.

In case of the NR system, a DCI format 3_0 for controlling the NR sidelink may include both a PRI field and a TPC PUCCH field. On the other hand, a DCI format 3_1 for controlling the LTE sidelink does not support unicast traffic, and therefore does not include a PRI field for transmission and reception of HARQ-ACK and a TPC PUCCH field.

(6) Methods of Reporting a Power Headroom

A power headroom indicates the amount of power that the terminal can further allocate to uplink, and the terminal may report the power headroom to the base station. This may include periodic reporting, reporting by indication, or triggering by expiration of a timer. The power headroom may be derived from one or more carriers configured in the terminal, and may be received by the base station as being included in the same PUSCH.

There are three types of a power headroom reporting. A type 1 refers to reporting of a difference between a value of a power when a UL-SCH is transmitted, which is estimated (or indicated) for each activated serving cell, and a maximum power that can be utilized by the terminal. A type 2 refers to reporting of a difference between an estimated (or, indicated) value of a power for a UL-SCH and a PUCCH transmitted to an activated serving cell and the maximum power that can be utilized by the terminal. For example, for a MAC entity other than NR (i.e., E-UTRA MAC entity in case of EN-DC, NE-DC, and NGEN-DC), it may be used in an SpCell. A type 3 refers to reporting of a difference between a value of a power when an SRS is transmitted, which is estimated (or indicated) for each activated serving cell, and the maximum power that can be utilized by the terminal.

When performing the type 1 reporting, a power headroom derived by the terminal may be for a carrier and/or a BWP in which a PUSCH is not transmitted, or a carrier and/or a BWP through which a PUSCH is transmitted. If a power headroom is derived for a carrier and/or a BWP in which a PUSCH is transmitted, it may be expressed as derived for an actual PUSCH. Here, a PUSCH for which a power headroom is derived and a PUSCH including information on the power headroom may be different from each other. If a power headroom is derived for a carrier and/or a BWP in which a PUSCH is not transmitted, the power headroom may be expressed as derived for a reference PUSCH based on assumption that a PUSCH is transmitted as being conforming to a format determined in the technical specification.

ULCI may be received by the terminal before or after a predetermined time (e.g., $\Delta_{preparation}$) from the start of the PUSCH 2. When ULCI is received before the predetermined time from the start of the PUSCH2, the terminal may not only adjust the transmission power for the PUSCH 2, but also process a TB. Therefore, a power headroom report (PHR) may be additionally considered.

When a PUSCH is transmitted, a PHR may be a quantized value of a power headroom for the actually transmitted PUSCH. Alternatively, when a PUSCH is not transmitted, a PHR may be a quantized value of a power headroom for a reference PUSCH. When the PUSCH 1 is canceled by ULCI, a case in which the PUSCH 2 includes a PHR and the PHR is a quantized value of an actual power headroom for the PUSCH 1 may be considered.

Figure 66:
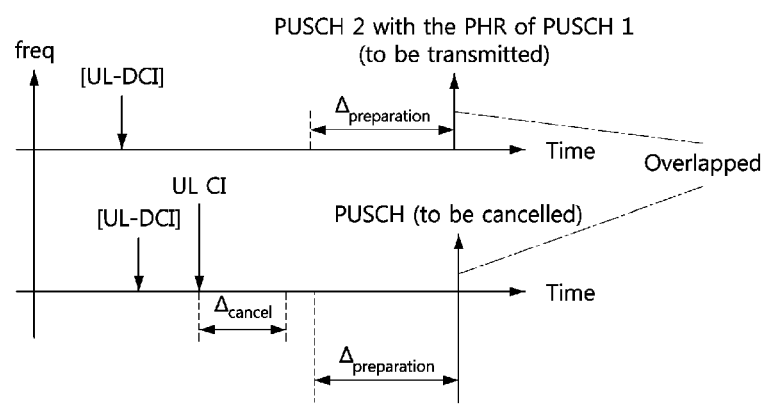
FIG. 66 is a conceptual diagram illustrating a PHR operation when two PUSCHs are allocated to a terminal according to an exemplary embodiment of the present disclosure.

FIG. 66 is a conceptual diagram illustrating a PHR operation when two PUSCHs are allocated to a terminal according to an exemplary embodiment of the present disclosure.

Referring to FIG. 66, a PHR for PUSCH 1 is transmitted on a PUSCH 2, but PUSCH 1 may be canceled by ULCI. In FIG. 66, although PUSCHs are allocated by UL-DCIs, the following descriptions may be applied to both a CG PUSCH and a DG PUSCH.

Regardless of the ULCI, UCI and a TB of the PUSCH 2 may be encoded. The base station cannot confirm whether the terminal has successfully received the ULCI. In addition, even when a search space set for ULCI is configured to the terminal and the terminal has received ULCI, the terminal may not reflect the received ULCI in a process of encoding the UCI and TB of the PUSCH 2. This means that a PHR is generated based on assumption that the PUSCH 1 is transmitted.

(Method K.5-1): The terminal generates a PHR based on assumption that no PUSCH has been dropped irrespective of ULCI reception.

Meanwhile, if transmission of the PUSCH 1 is canceled by the ULCI, the PHR may no longer be based on whether the PUSCH 1 is actually transmitted. If the ULCI is received by the terminal at a sufficiently early time, the terminal may know that transmission of the PUSCH 1 is canceled by applying the ULCI, which may affect the process of generating the UCI and TB of the PUSCH 2. Therefore, the PHR may be generated based on a reference PUSCH by reflecting that the transmission of the PUSCH 1 is canceled, and the PHR may be included in the TB belonging to the PUSCH 2.

(Method K.5 2): The terminal generates a PHR based on an actual PUSCH or a reference PUSCH according to reception of ULCI.

ULCI may be received by the terminal without a sufficient time (e.g., time defined as $N_2$, $d_{2,1}$, $d_{2,2}$) for the ULCI to be applied. In this case, if (Method K.5-2) is applied, a PHR to which the ULCI is not applied may be included in the TB included in the PUSCH 2.

In more detail about the sufficient processing time, $\Delta_{preparation}$ and $\Delta_{cancel}$ may be given with a function of $N_2$, $d_{2,1}$, $d_{2,2}$. $\Delta_{preparation}$ may be determined as a larger value among a time corresponding to $N_2+d_{2,1}$ and a time corresponding to $d_{2,2}$. Here, $N_2$ may be determined in the technical specification according to a subcarrier spacing of a BWP. $N_2$ may have a smaller value or a larger value according to a processing capability of the terminal. $d_{2,1}$ may be determined based on a form of a PUSCH DM-RS, and $d_{2,2}$ may be determined based on a time required for BWP switching. $\Delta_{cancel}$ may be determined as a larger value among a time corresponding to $N_2+d_{2,1}$ and a time corresponding to $d_{2,2}$. Here, the value of $d_{2,1}$ for determining $\Delta_{cancel}$ may be determined differently from the value of $d_{2,1}$ for determining $\Delta_{preparation}$. That is, in this case, $d_{2,1}$ may be determined with a function of a subcarrier spacing of a BWP in which the ULCI is received, a subcarrier spacing of a BWP in which the PUSCH is transmitted/cancelled, and a value(s) given by RRC signaling.

When a sufficient time is secured by the terminal, the terminal may receive and decode the ULCI, recognize that the PUSCH 1 is canceled through this, and reflect a change in power according to the cancellation of the PUSCH 1 to the PUSCH 2. In this case, since a time for generating a PUSCH should be considered in order for the terminal to transmit a CG PUSCH or DG PUSCH, the ULCI should be received by the terminal at a time earlier than a first symbol of the PUSCH by at least $\Delta_{preparation}$.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An uplink transmission method performed by a terminal, the uplink transmission method comprising:
    receiving, from a base station, at least one downlink control information (DCI) for allocating first uplink transmission and second uplink transmission;
    performing a first listen-before-talk (LBT) procedure for the first uplink transmission according to a scheme of the first LBT procedure indicated by the at least one DCI, and performing the first uplink transmission when the first LBT procedure is successful; and
    determining a gap between the first uplink transmission and the second uplink transmission;
    in response to determining that the gap is greater than or equal to a predetermined value, performing the second uplink transmission after applying cyclic prefix (CP) extension for the second uplink transmission; and
    in response to determining that the gap is smaller than the predetermined value, performing the second uplink transmission without applying CP extension for the second uplink transmission,
    wherein the at least one DCI is one DCI for allocating both the first uplink transmission and the second uplink transmission, the first uplink transmission is transmission of a PUSCH or PUCCH, and the second uplink transmission is transmission of a sounding reference signal (SRS).

2. The uplink transmission method according to claim 1, wherein the scheme of the first LBT procedure is a type 1 channel access scheme or a type 2/2A/2B/2C channel access scheme.

3. The uplink transmission method according to claim 1, wherein the at least one DCI further includes information on a length value of the CP extension, and/or a channel access priority class of the first uplink transmission.

4. The uplink transmission method according to claim 1, wherein the at least one DCI does not indicate a scheme of the second LBT procedure for the second uplink transmission.

5. The uplink transmission method according to claim 1, wherein the second LBT procedure is performed only on a first symbol of a resource for transmitting the SRS.

6. The uplink transmission method according to claim 1, wherein when the second uplink transmission is present within a channel occupancy time (COT) secured by the base station, the second LBT procedure is performed by a type 2/2A channel access scheme, and when the second uplink transmission is present outside the COT secured by the base station, the second LBT procedure is performed by a type 1 channel access scheme.

7. The uplink transmission method according to claim 1, wherein when the second LBT procedure fails, the entire SRS is not transmitted.

* * * * *